(12) United States Patent
Osaka et al.

(10) Patent No.: US 12,441,734 B2
(45) Date of Patent: Oct. 14, 2025

(54) FERROPTOSIS INHIBITOR AND USE THEREFOR

(71) Applicant: JICHI MEDICAL UNIVERSITY, Tokyo (JP)

(72) Inventors: Hitoshi Osaka, Shimotsuke (JP); Akihiko Miyauchi, Shimotsuke (JP); Eriko Jimbo, Shimotsuke (JP); Mizuki Kobayashi, Shimotsuke (JP)

(73) Assignee: JICHI MEDICAL UNIVERSITY, Tokyo (JP)

(*) Notice: Subject to any disclaimer, the term of this patent is extended or adjusted under 35 U.S.C. 154(b) by 21 days.

(21) Appl. No.: 18/710,113

(22) PCT Filed: Nov. 14, 2022

(86) PCT No.: PCT/JP2022/042198
§ 371 (c)(1),
(2) Date: May 14, 2024

(87) PCT Pub. No.: WO2023/085420
PCT Pub. Date: May 19, 2023

(65) Prior Publication Data
US 2024/0327420 A1     Oct. 3, 2024

(30) Foreign Application Priority Data
Nov. 15, 2021   (JP) ................. 2021-185384

(51) Int. Cl.
| | |
|---|---|
| *C07D 491/06* | (2006.01) |
| *A61K 31/473* | (2006.01) |
| *A61K 31/4741* | (2006.01) |
| *C07D 221/18* | (2006.01) |

(52) U.S. Cl.
CPC .......... *C07D 491/06* (2013.01); *A61K 31/473* (2013.01); *A61K 31/4741* (2013.01); *C07D 221/18* (2013.01)

(58) Field of Classification Search
None
See application file for complete search history.

(56) References Cited

U.S. PATENT DOCUMENTS

| | | | |
|---|---|---|---|
| 11,369,615 B2 * | 6/2022 | Osaka ................. | A61K 31/551 |
| 2020/0330475 A1 | 10/2020 | Osaka et al. | |

FOREIGN PATENT DOCUMENTS

| | | |
|---|---|---|
| CN | 101407520 B | 2/2011 |
| CN | 101966228 A | 2/2011 |
| CN | 110772517 A | 2/2020 |
| CN | 112494491 A | 3/2021 |
| DE | 489 185 C | 1/1930 |
| EP | 2526947 A1 | 11/2012 |
| JP | 2013-517301 A | 5/2013 |

(Continued)

OTHER PUBLICATIONS

American Chemical Society, Chemical Abstract Service, RN: 1056903-42-4. First made available to the public Oct. 3, 2008 (Year: 2008).*

(Continued)

*Primary Examiner* — Jeffrey T. Palenik
*Assistant Examiner* — Gillian A Hutter
(74) *Attorney, Agent, or Firm* — Lucas & Mercanti, LLP

(57) ABSTRACT

The present invention provides a means whereby it is possible to clarify the mechanism of manifestation of symptoms, an illness, or dysfunction caused by mitochondrial dysfunction and prevent or treat symptoms, an illness, or dysfunction relating to the same mechanism of manifestation. One embodiment of the present invention relates to a ferroptosis inhibitor containing a compound represented by formula (I), a pharmaceutically acceptable salt thereof, or a pharmaceutically acceptable solvate thereof as an active ingredient. Another embodiment of the present invention relates to a medicine that contains the ferroptosis inhibitor as an active ingredient and is for use in the prevention or treatment of symptoms, an illness, or dysfunction relating to ferroptosis. Yet another embodiment of the present invention relates to a compound represented by formula (I-1), a salt thereof, or a solvate thereof.

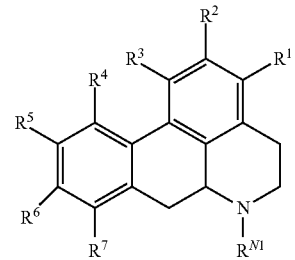

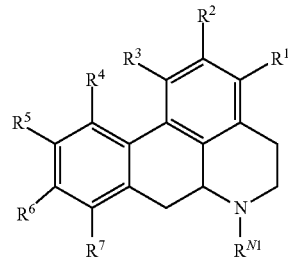

13 Claims, 35 Drawing Sheets

(56) References Cited

FOREIGN PATENT DOCUMENTS

| WO | 2007/134485 A1 | 11/2007 |
|---|---|---|
| WO | 2015/015248 A1 | 2/2015 |
| WO | 2019/093379 A1 | 5/2019 |

OTHER PUBLICATIONS

American Chemical Society, Chemical Abstract Service, RN: 641-36-1. First made available to the public Nov. 16, 1984 (Year: 1984).*
International Search Report mailed Jan. 31, 2023, issued for the corresponding International patent application No. PCT/JP2022/042198, with English translation, 9 pages.
Gueven N., "Idebenone for Leber's hereditary optic neuropathy.", Drugs Today (Barc), vol. 52 (3), p. 173-181, Mar. 2016.
Cannon, J.G. et al., "Centrally acting emetics. 5. Preparation and pharmacology of 10-hydroxy-11-methoxyaporphine (Isoapocodeine). In vitro enzymatic methylation of apomorphine", Journal of Medicinal Chemistry, 1972, vol. 15, No. 3, pp. 273-276.
Danyu, L. et al., "Nuciferine protects against folic acid-induced acute kidney injury by inhibiting ferroptosis", British Journal of Pharmacology, Mar. 2021, vol. 178, No. 5, pp. 1182-1199.
Wang, Hong-mei et al., "Effect of isocorydine on arrhythmia in rats induced by myocardial ischemia/reperfusion injury", Chinese Pharmacological Bulletin, 2016, vol. 32, No. 9, pp. 1268-1272, abstract.
Tang, Deping et al., "Dicranostiga leptopodu (Maxim.) Fedde extracts attenuated CCl4-induced acute liver damage in mice through increasing anti-oxidative enzyme activity to improve mitochondrial function", Biomedicine & Pharmacotherapy, 2017, pp. 763-771.
Jang, Yoon Young et al., "Protective effect of boldine on oxidative mitochondrial damage in streptozotocin-induced diabetic rats", Pharmacological Research, 2000, vol. 42, No. 4, pp. 361-371.
Chang, Wei-Luen et al., "Attenuation of post-ischemia reperfusion injury by thaliporphine and morphine in rat hearts", Journal of Biomedical Science, 2005, vol. 12, No. 4, pp. 611-619.
Lee, A.S. et al., "Thaliporphine preserves cardiac function of endotoxemic rabbits by both directly and indirectly attenuating NFκB signaling pathway", PLoS One, 2012, vol. 7, Issue 6, e39174 (10 pages).
Dajas-Bailador, Federico A. et al., "Dopaminergic pharmacology and antioxidant properties of pukateine, a natural product lead for the design of agents increasing dopamine neurotransmission", General Pharmacology, 1999, vol. 32, No. 3, pp. 373-379.
He, Xiaochun et al., "Prolonged modulation of FGF-2 expression in astrocytic cultures induced by O,O'-diacetyl-apomorphine", Biochemical and Biophysical Research Communications, 2008, vol. 369, No. 3, pp. 824-829.
Soriano-Castell, David et al., "Defining a pharmacological inhibitor fingerprint for oxytosis/ferroptosis", Free Radical Biology and Medicine, May 16, 2021, vol. 171, pp. 219-231.
Hedberg, Martin H., "10-Substituted 11-Oxygenated (R)-Aporphines: Synthesis, Pharmacology, and Modeling of 5-HT1A Receptor Interactions", Journal of Medicinal Chemistry, 1996, vol. 39, No. 18, pp. 3491-3502.
Miyauchi, Akihiko et al., "Supplemental mitochondrial therapies using anti-ferroptosis interactions". Journal of the The Japan Pediatric Society, Feb. 1, 2022, vol. 126, No. 2, p. 231, with English translation.
Miyauchi, Akihiko et al., "Mitochondrial therapies using apomorphine ferroptosis". Program and abstracts of the 20th Annual Meeting of the Japanese Society of Mitochondrial Research and Medicine, Jul. 29, 2022 (retrieved date), S2-2-T2-2, with English translation.
Supplementary European Search Report for the related European patent application No. 22892918.8, mailed Feb. 17, 2025, 6 pages.

* cited by examiner

A

B

A

B

A

B

A

B

A

B

A

B

A

B

A

B

FERROPTOSIS INHIBITOR AND USE THEREFOR

CROSS-REFERENCE TO RELATED APPLICATIONS

This application is a 371 of PCT/JP2022/042198, filed Nov. 14, 2022, which claims the benefit of Japanese Patent Application No. 2021-185384, filed Nov. 15, 2021.

TECHNICAL FIELD

The present invention relates to a ferroptosis inhibitor and use therefor.

BACKGROUND ART

Mitochondria are major organs for energy production in cells of eukaryotes. If mitochondria fall into dysfunction, various diseases or symptoms are caused.

Mitochondrial diseases are typical diseases caused by mitochondrial dysfunction. The mitochondrial diseases are relatively highly frequent inherited metabolic diseases which develop at a frequency of one out of 500 people. The mitochondrial diseases are capable of affecting any organ and, in particular, are capable of manifesting marked symptoms in the brain, the central nervous system, and muscle having a high demand for energy. Examples of the symptom in the central nervous system can include irreversible deterioration of intellectual faculties, spasm, stroke-like episodes, and cerebellar ataxia.

Clinicals types of the mitochondrial diseases are usually classified into 10 or more types. Among them, Leigh syndrome and mitochondrial encephalopathy, lactic acidosis, and stroke-like episodes (hereinafter, also referred to as "MELAS") are regarded as two major types in the pediatric field. Leigh syndrome causes symptoms such as psychomotor retardation and regression from infancy. MELAS causes symptoms such as repeated stroke-like episodes resulting from the impairment of a mitochondrial function such as ATP production.

As for the treatment of a disease or a symptom caused by mitochondrial dysfunction, for example, Patent Literature 1 describes a mitochondrial dysfunction improving agent comprising apomorphine known as a therapeutic drug for Parkinson's disease, or the like as an active ingredient. This literature states that apomorphine has an effect of improving mitochondrial dysfunction and can be used in the prevention or treatment of a disease or a symptom caused by mitochondrial dysfunction, for example, a mitochondrial disease.

Non Patent Literature 1 states that a coenzyme $Q_{10}$ (hereinafter, also referred to as "$CoQ_{10}$") analog idebenone has been approved as a therapeutic drug for Leber's hereditary optic neuropathy, one of the clinical types of mitochondrial diseases, in the Europe.

CITATION LIST

Patent Literature

Patent Literature 1: International Publication No. WO 2019/093379

Non Patent Literature

Non Patent Literature 1: Gueven N., Idebenone for Leber's hereditary optic neuropathy., Drugs Today (Barc), Vol. 52 (3), p. 173-181, March 2016

SUMMARY OF INVENTION

Technical Problem

As described above, apomorphine is known to have an effect of improving mitochondrial dysfunction. Although mitochondrial dysfunction is known to be responsible for various symptoms, diseases, or disorders including mitochondrial diseases, a mechanism of manifestation of a symptom, a disease, or a disorder caused by mitochondrial dysfunction has not been revealed.

Hence, an object of the present invention is to reveal a mechanism of manifestation of a symptom, a disease, or a disorder caused by mitochondrial dysfunction and to provide an approach capable of preventing or treating a symptom, a disease, or a disorder related to the same or similar mechanism of manifestation.

Solution to Problem

The present inventors have conducted various studies on an approach for attaining the object. The present inventors have found that cell death related to mitochondrial dysfunction is mainly induced via ferroptosis. The present inventors have also found that the cell death that is induced via ferroptosis is suppressed by apomorphine. The present inventors have further developed apomorphine derivatives with apomorphine as a lead compound and found that some apomorphine derivatives have a high ferroptosis inhibitory effect. The present inventors have completed the present invention on the basis of these findings.

Specifically, the present invention encompasses the following aspects and embodiments.

(1) A ferroptosis inhibitor comprising a compound represented by the formula (I):

[Formula 1]

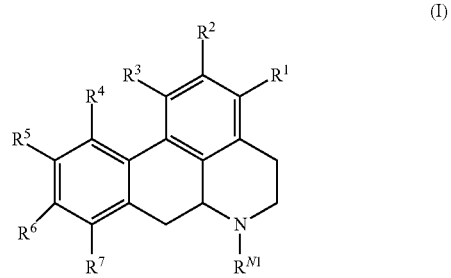

wherein
$R^{N1}$ is methyl,
$R^1$ is hydrogen, halogen (fluorine, chlorine, bromine, or iodine), cyano, nitro, hydroxyl, substituted or unsubstituted alkyl, substituted or unsubstituted alkenyl, substituted or unsubstituted alkynyl, substituted or unsubstituted cycloalkyl, substituted or unsubstituted cycloalkenyl, substituted or unsubstituted cycloalkynyl, substituted or unsubstituted heterocycloalkyl, substituted or unsubstituted cycloalkylalkyl, substituted or unsubstituted heterocycloalkylalkyl, substituted or unsubstituted aryl, substituted or unsubstituted arylalkyl, substituted or unsubstituted heteroaryl, substituted or unsubstituted heteroarylalkyl, substituted or unsubstituted alkoxy, substituted or unsubstituted cycloalkoxy, substituted or unsubstituted heterocycloalkoxy, substituted or unsubstituted aryloxy, substituted or unsubstituted arylalkyloxy, substituted or unsubstituted arylalkenyloxy, substituted or unsubstituted heteroaryloxy, substituted or unsubstituted heteroarylalkyloxy, substituted or unsubstituted alkoxycarbonyl, substituted or unsubstituted cycloalkoxycarbonyl, substituted or unsubstituted acyl, substituted or unsubstituted alkylcarbonyloxy, substituted or unsubstituted arylcarbonyloxy, substituted or unsubstituted carbamoyl, substituted or unsubstituted alkylsulfonyl, substituted or unsubstituted arylsulfonyl, substituted or unsubstituted alkylsulfanyl, substituted or unsubstituted arylsulfanyl, or substituted or unsubstituted amino, $R^2$ and $R^3$ are each independently hydrogen, halogen (fluorine, chlorine, bromine, or iodine), cyano, nitro, hydroxyl, substituted or unsubstituted alkyl, substituted or unsubstituted alkenyl, substituted or unsubstituted alkynyl, substituted or unsubstituted cycloalkyl, substituted or unsubstituted cycloalkenyl, substituted or unsubstituted cycloalkynyl, substituted or unsubstituted heterocycloalkyl, substituted or unsubstituted cycloalkylalkyl, substituted or unsubstituted heterocycloalkylalkyl, substituted or unsubstituted aryl, substituted or unsubstituted arylalkyl, substituted or unsubstituted heteroaryl, substituted or unsubstituted heteroarylalkyl, substituted or unsubstituted alkoxy, substituted or unsubstituted cycloalkoxy, substituted or unsubstituted heterocycloalkoxy, substituted or unsubstituted aryloxy, substituted or unsubstituted arylalkyloxy, substituted or unsubstituted arylalkenyloxy, substituted or unsubstituted heteroaryloxy, substituted or unsubstituted heteroarylalkyloxy, substituted or unsubstituted alkoxycarbonyl, substituted or unsubstituted cycloalkoxycarbonyl, substituted or unsubstituted acyl, substituted or unsubstituted alkylcarbonyloxy, substituted or unsubstituted arylcarbonyloxy, substituted or unsubstituted carbamoyl, substituted or unsubstituted alkylsulfonyl, substituted or unsubstituted arylsulfonyl, substituted or unsubstituted alkylsulfanyl, substituted or unsubstituted arylsulfanyl, or substituted or unsubstituted amino, or $R^2$ and $R^3$ together form —O—CH$_2$—O—, $R^4$ and $R^5$ are each independently hydrogen, halogen (fluorine, chlorine, bromine, or iodine), cyano, nitro, hydroxyl, substituted or unsubstituted alkyl, substituted or unsubstituted alkenyl, substituted or unsubstituted alkynyl, substituted or unsubstituted cycloalkyl, substituted or unsubstituted cycloalkenyl, substituted or unsubstituted cycloalkynyl, substituted or unsubstituted heterocycloalkyl, substituted or unsubstituted cycloalkylalkyl, substituted or unsubstituted heterocycloalkylalkyl, substituted or unsubstituted aryl, substituted or unsubstituted arylalkyl, substituted or unsubstituted heteroaryl, substituted or unsubstituted heteroarylalkyl, substituted or unsubstituted alkoxy, substituted or unsubstituted cycloalkoxy, substituted or unsubstituted heterocycloalkoxy, substituted or unsubstituted aryloxy, substituted or unsubstituted arylalkyloxy, substituted or unsubstituted arylalkenyloxy, substituted or unsubstituted heteroaryloxy, substituted or unsubstituted heteroarylalkyloxy, substituted or unsubstituted alkoxycarbonyl, substituted or unsubstituted cycloalkoxycarbonyl, substituted or unsubstituted acyl, substituted or unsubstituted alkylcarbonyloxy, substituted or unsubstituted arylcarbonyloxy, substituted or unsubstituted carbamoyl, substituted or unsubstituted alkylsulfonyl, substituted or unsubstituted arylsulfonyl, substituted or unsubstituted alkylsulfanyl, substituted or unsubstituted arylsulfanyl, or substituted or unsubstituted amino, or $R^4$ and $R^5$ together form —O—CH$_2$—O—, and $R^6$ and $R^7$ are each independently hydrogen, halogen (fluorine, chlorine, bromine, or iodine), cyano, nitro, hydroxyl, substituted or unsubstituted alkyl, substituted or unsubstituted alkenyl, substituted or unsubstituted alkynyl, substituted or unsubstituted cycloalkyl, substituted or unsubstituted cycloalkenyl, substituted or unsubstituted cycloalkynyl, substituted or unsubstituted heterocycloalkyl, substituted or unsubstituted cycloalkylalkyl, substituted or unsubstituted heterocycloalkylalkyl, substituted or unsubstituted aryl, substituted or unsubstituted arylalkyl, substituted or unsubstituted heteroaryl, substituted or unsubstituted heteroarylalkyl, substituted or unsubstituted alkoxy, substituted or unsubstituted cycloalkoxy, substituted or unsubstituted heterocycloalkoxy, substituted or unsubstituted aryloxy, substituted or unsubstituted arylalkyloxy, substituted or unsubstituted arylalkenyloxy, substituted or unsubstituted heteroaryloxy, substituted or unsubstituted heteroarylalkyloxy, substituted or unsubstituted alkoxycarbonyl, substituted or unsubstituted cycloalkoxycarbonyl, substituted or unsubstituted acyl, substituted or unsubstituted alkylcarbonyloxy, substituted or unsubstituted arylcarbonyloxy, substituted or unsubstituted carbamoyl, substituted or unsubstituted alkylsulfonyl, substituted or unsubstituted arylsulfonyl, substituted or unsubstituted alkylsulfanyl, substituted or unsubstituted arylsulfanyl, or substituted or unsubstituted amino, or $R^6$ and $R^7$ together form —O—CH$_2$—O—, except for the case where $R^{N1}$ is methyl, each of $R^1$, $R^2$, and $R^3$ is hydrogen, each of $R^4$ and $R^5$ is hydroxyl, and each of $R^6$ and $R^7$ is hydrogen, or a pharmaceutically acceptable salt thereof, or a pharmaceutically acceptable solvate of the compound or the salt as an active ingredient.

(2) The ferroptosis inhibitor according to the embodiment (1), wherein $R^1$ is hydrogen, or unsubstituted $C_1$ to $C_9$ alkoxy or $C_1$ to $C_9$ alkoxy substituted by at least one monovalent group selected from the group consisting of halogen (fluorine, chlorine, bromine, or iodine), hydroxyl, and carboxyl.

(3) The ferroptosis inhibitor according to the embodiment (1) or (2), wherein $R^2$ and $R^3$ are each independently hydrogen, hydroxyl, unsubstituted $C_1$ to $C_9$ alkoxy or $C_1$ to $C_9$ alkoxy substituted by at least one monovalent group selected from the group consisting of halogen (fluorine, chlorine, bromine, or iodine), hydroxyl, and carboxyl, or unsubstituted $C_7$ to $C_{20}$ arylalkyloxy or $C_7$ to $C_{20}$ arylalkyloxy substituted by at least one monovalent group selected from the group consisting of halogen (fluorine, chlorine, bromine, or iodine), hydroxyl, and carboxyl, or $R^2$ and $R^3$ together form —O—CH$_2$—O—, $R^4$ and $R^5$ are each independently hydrogen, hydroxyl, unsubstituted $C_6$ to $C_{18}$ aryl or $C_6$ to $C_{18}$ aryl substituted by at least one monovalent group selected from the group consisting of halogen (fluorine, chlorine, bromine, or iodine), hydroxyl, and carboxyl, unsubstituted $C_1$ to $C_9$ alkoxy or $C_1$ to $C_9$ alkoxy substituted by at least one monovalent group selected from the group consisting of halogen (fluorine, chlorine, bromine, or iodine), hydroxyl, and carboxyl, or unsubstituted $C_7$ to $C_{20}$ arylalkyloxy or $C_7$ to $C_{20}$ arylalkyloxy substituted by at least one monovalent group selected from the group consisting of halogen (fluorine, chlorine, bromine, or iodine), hydroxyl, and carboxyl, or $R^4$ and $R^5$ together form —O—$CH_2$—O—, and $R^6$ and $R^7$ are each independently hydrogen, hydroxyl, unsubstituted $C_1$ to $C_9$ alkoxy or $C_1$ to $C_9$ alkoxy substituted by at least one monovalent group selected from the group consisting of halogen (fluorine, chlorine, bromine, or iodine), hydroxyl, and carboxyl, or unsubstituted $C_7$ to $C_{20}$ arylalkyloxy or $C_7$ to $C_{20}$ arylalkyloxy substituted by at least one monovalent group selected from the group consisting of halogen (fluorine, chlorine, bromine, or iodine), hydroxyl, and carboxyl, or $R^6$ and $R^7$ together form —O—$CH_2$—O—.

(4) The ferroptosis inhibitor according to any of the embodiments (1) to (3), wherein $R^2$ and $R^3$ together form —O—$CH_2$—O—.

(5) The ferroptosis inhibitor according to any of the embodiments (1) to (3), wherein $R^2$ and $R^3$ are each independently hydroxyl, or unsubstituted $C_1$ to $C_9$ alkoxy or $C_1$ to $C_9$ alkoxy substituted by at least one monovalent group selected from the group consisting of halogen (fluorine, chlorine, bromine, or iodine), hydroxyl, and carboxyl.

(6) The ferroptosis inhibitor according to any of the embodiments (1) to (3), wherein both $R^2$ and $R^3$ are hydrogen.

(7) The ferroptosis inhibitor according to any of the embodiments (1) to (3) and (6), wherein $R^{N1}$ is methyl;
$R^1$ is hydrogen;
both $R^2$ and $R^3$ are hydrogen;
$R^4$ is hydroxyl;
$R^5$ is phenyl, ethoxy, n-butyloxy, phenylmethoxy (i.e., benzyloxy), 2-phenylethoxy, 3-phenylpropyloxy, 4-phenylbutyloxy, 3,3-biphenylpropyloxy, 3-hydroxylpropyloxy, 3-chloropropyloxy, n-propyloxy, n-nonyloxy, 4-trifluorobutyloxy, isopropyloxy, 2-methylpropyloxy, 1-methylpropyloxy, chloromethoxy, 2-chloroethoxy, 2-trifluoroethoxy, or 3-trifluoropropyloxy; and
both $R^6$ and $R^7$ are hydrogen.

(8) The ferroptosis inhibitor according to any of the embodiments (1) to (7), wherein $R^{N1}$ is methyl, $R^1$ is hydrogen, $R^2$ and $R^3$ together form —O—$CH_2$—O—, both $R^4$ and $R^5$ are hydrogen, and both $R^6$ and $R^7$ are methoxy; or $R^{N1}$ is methyl, $R^1$ is hydrogen, $R^2$ and $R^3$ together form —O—$CH_2$—O—, both $R^4$ and $R^5$ are hydrogen, $R^6$ is hydrogen, and $R^7$ is methoxy; or $R^{N1}$ is methyl, $R^1$ is hydrogen, $R^2$ and $R^3$ together form —O—$CH_2$—O—, $R^4$ is hydroxyl, $R^5$ is hydrogen, $R^6$ is methoxy, and $R^7$ is hydrogen; or $R^{N1}$ is methyl, $R^1$ is hydrogen, $R^2$ and $R^3$ together form —O—$CH_2$—O—, both $R^4$ and $R^5$ are hydrogen, and both $R^6$ and $R^7$ are hydrogen; or $R^{N1}$ is methyl, $R^1$ is methoxy, $R^2$ and $R^3$ together form —O—$CH_2$—O—, $R^4$ is hydrogen, $R^5$ is methoxy, $R^6$ is methoxy, and $R^7$ is hydrogen; or $R^{N1}$ is methyl, $R^1$ is hydrogen, $R^2$ is methoxy, $R^3$ is hydroxyl, both $R^4$ and $R^5$ are methoxy, and both $R^6$ and $R^7$ are hydrogen; or $R^{N1}$ is methyl, $R^1$ is hydrogen, both $R^2$ and $R^3$ are hydrogen, $R^4$ is hydroxyl, $R^5$ is n-butyloxy, and both $R^6$ and $R^7$ are hydrogen; or $R^{N1}$ is methyl, $R^1$ is hydrogen, both $R^2$ and $R^3$ are hydrogen, $R^4$ is hydroxyl, $R^5$ is 3-phenylpropyloxy, and both $R^6$ and $R^7$ are hydrogen; or $R^{N1}$ is methyl, $R^1$ is hydrogen, both $R^2$ and $R^3$ are hydrogen, $R^4$ is hydroxyl, $R^5$ is 3-hydroxylpropyloxy, and both $R^6$ and $R^7$ are hydrogen; or $R^{N1}$ is methyl, $R^1$ is hydrogen, both $R^2$ and $R^3$ are hydrogen, $R^4$ is hydroxyl, $R^5$ is 3-chloropropyloxy, and both $R^6$ and $R^7$ are hydrogen; or $R^{N1}$ is methyl, $R^1$ is hydrogen, both $R^2$ and $R^3$ are hydrogen, $R^4$ is hydroxyl, $R^5$ is n-propyloxy, and both $R^6$ and $R^7$ are hydrogen; or $R^{N1}$ is methyl, $R^1$ is hydrogen, both $R^2$ and $R^3$ are hydrogen, $R^4$ is hydroxyl, $R^5$ is n-nonyloxy, and both $R^6$ and $R^7$ are hydrogen; or $R^{N1}$ is methyl, $R^1$ is hydrogen, both $R^2$ and $R^3$ are hydrogen, $R^4$ is hydroxyl, $R^5$ is 4-trifluorobutyloxy, and both $R^6$ and $R^7$ are hydrogen; or $R^{N1}$ is methyl, $R^1$ is hydrogen, both $R^2$ and $R^3$ are methoxy, $R^4$ is hydroxyl, $R^5$ is methoxy, and both $R^6$ and $R^7$ are hydrogen; or $R^{N1}$ is methyl, $R^1$ is hydrogen, both $R^2$ and $R^3$ are hydrogen, $R^4$ is hydroxyl, $R^5$ is phenyl, and both $R^6$ and $R^7$ are hydrogen; or $R^{N1}$ is methyl, $R^1$ is hydrogen, both $R^2$ and $R^3$ are hydrogen, $R^4$ is hydroxyl, $R^5$ is phenylmethyloxy (i.e., benzyloxy), and both $R^6$ and $R^7$ are hydrogen; or $R^{N1}$ is methyl, $R^1$ is hydrogen, both $R^2$ and $R^3$ are hydrogen, $R^4$ is hydroxyl, $R^5$ is 2-phenylethyloxy, and both $R^6$ and $R^7$ are hydrogen; or $R^{N1}$ is methyl, $R^1$ is hydrogen, both $R^2$ and $R^3$ are hydrogen, $R^4$ is hydroxyl, $R^5$ is 4-phenylbutyloxy, and both $R^6$ and $R^7$ are hydrogen; or $R^{N1}$ is methyl, $R^1$ is hydrogen, both $R^2$ and $R^3$ are hydrogen, $R^4$ is hydroxyl, $R^5$ is 3,3-biphenylpropyloxy, and both $R^6$ and $R^7$ are hydrogen; or $R^{N1}$ is methyl, $R^1$ is hydrogen, both $R^2$ and $R^3$ are hydrogen, $R^4$ is hydroxyl, $R^5$ is ethyloxy, and both $R^6$ and $R^7$ are hydrogen.

(9) A medicament for use in the prevention or treatment of a symptom, a disease, or a disorder related to ferroptosis, comprising a ferroptosis inhibitor according to any of the embodiments (1) to (8) as an active ingredient.

(10) The medicament according to the embodiment (9), wherein the symptom, the disease, or the disorder related to ferroptosis is a primary mitochondrial disease, a disease caused by reductive stress, a neurodegenerative disease, a metabolic disease, or hepatic dysfunction.

(11) The medicament according to the embodiment (9) or (10), wherein the symptom, the disease, or the disorder related to ferroptosis is one or more symptoms, diseases, or disorders selected from the group consisting of Leigh syndrome, a mitochondrial disease which is mitochondrial encephalopathy, lactic acidosis, and stroke-like episodes (MELAS) or Leber's disease, mitochondrial cardiomyopathy, mitochondrial hepatopathy, chronic progressive external ophthalmoplegia (CPEO), Parkinson's disease, Alzheimer's disease, Huntington's disease, amyotrophic lateral sclerosis, angina, myocardial infarction, acute heart failure, chronic heart failure, cardiomyopathy, diabetic cardiomyopathy, cardiomegaly, ischemia-reperfusion injury, hemorrhagic stroke, diabetes mellitus, cerebral infarction, kidney damage, acute renal failure, non-alcoholic steatohepatitis or liver damage, hepatic fibrosis, chronic obstructive pulmonary disease, urinary tract infection, polycystic kidney disease, sepsis-induced cardiac injury, and sepsis.

(12) A compound represented by the formula (I-1):

[Formula 2]

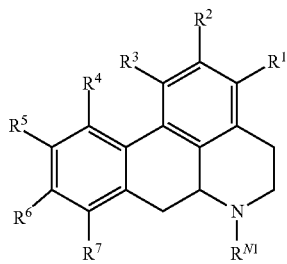

(I-1)

wherein
R$^{N1}$ is methyl,
R$^1$ is hydrogen,
both R$^2$ and R$^3$ are hydrogen,
R$^4$ is hydroxyl,
R$^5$ is unsubstituted C$_1$ to C$_9$ alkoxy or C$_1$ to C$_9$ alkoxy substituted by at least one monovalent group selected from the group consisting of halogen (fluorine, chlorine, bromine, or iodine), hydroxyl, and carboxyl, or unsubstituted C$_7$ to C$_{20}$ arylalkyloxy or C$_7$ to C$_{20}$ arylalkyloxy substituted by at least one monovalent group selected from the group consisting of halogen (fluorine, chlorine, bromine, or iodine), hydroxyl, and carboxyl, and
both R$^6$ and R$^7$ are hydrogen, or a salt thereof, or a solvate of the compound or the salt.

(13) The compound according to the embodiment (12) or a salt thereof, or a solvate of the compound or the salt, wherein R$^5$ is ethoxy, n-butyloxy, 2-phenylethoxy, 3-phenylpropyloxy, 4-phenylbutyloxy, 3,3-biphenylpropyloxy, 3-hydroxylpropyloxy, 3-chloropropyloxy, n-propyloxy, n-nonyloxy, or 4-trifluorobutyloxy.

(14) A pharmaceutical composition comprising a ferroptosis inhibitor according to any of the embodiments (1) to (8), or a compound represented by the formula (I) or (I-1) or a pharmaceutically acceptable salt thereof, or a pharmaceutically acceptable solvate of the compound or the salt as an active ingredient.

(15) The pharmaceutical composition according to the embodiment (14) for use in the prevention or treatment of a symptom, a disease, or a disorder related to ferroptosis which is a primary mitochondrial disease, a disease caused by reductive stress, a neurodegenerative disease, a metabolic disease, or hepatic dysfunction.

(16) The pharmaceutical composition according to the embodiment (15), wherein the symptom, the disease, or the disorder related to ferroptosis is one or more symptoms, diseases, or disorders selected from the group consisting of Leigh syndrome, a mitochondrial disease which is mitochondrial encephalopathy, lactic acidosis, and stroke-like episodes (MELAS) or Leber's disease, mitochondrial cardiomyopathy, mitochondrial hepatopathy, chronic progressive external ophthalmoplegia (CPEO), Parkinson's disease, Alzheimer's disease, Huntington's disease, amyotrophic lateral sclerosis, angina, myocardial infarction, acute heart failure, chronic heart failure, cardiomyopathy, diabetic cardiomyopathy, cardiomegaly, ischemia-reperfusion injury, hemorrhagic stroke, diabetes mellitus, cerebral infarction, kidney damage, acute renal failure, non-alcoholic steatohepatitis or liver damage, hepatic fibrosis, chronic obstructive pulmonary disease, urinary tract infection, polycystic kidney disease, sepsis-induced cardiac injury, and sepsis.

(17) A method for preventing or treating a symptom, a disease, and/or a disorder related to ferroptosis, comprising administering an effective amount of a ferroptosis inhibitor according to any of the embodiments (1) to (8), or a compound represented by the formula (I) or (I-1) or a pharmaceutically acceptable salt thereof, or a pharmaceutically acceptable solvate of the compound or the salt to a subject in need of prevention or treatment of the symptom, the disease, and/or the disorder.

(18) The method according to the embodiment (17), wherein the symptom, the disease, or the disorder related to ferroptosis is a primary mitochondrial disease, a disease caused by reductive stress, a neurodegenerative disease, a metabolic disease, or hepatic dysfunction.

(19) The method according to the embodiment (17) or (18), wherein the symptom, the disease, or the disorder related to ferroptosis is one or more symptoms, diseases, or disorders selected from the group consisting of Leigh syndrome, a mitochondrial disease which is mitochondrial encephalopathy, lactic acidosis, and stroke-like episodes (MELAS) or Leber's disease, mitochondrial cardiomyopathy, mitochondrial hepatopathy, chronic progressive external ophthalmoplegia (CPEO), Parkinson's disease, Alzheimer's disease, Huntington's disease, amyotrophic lateral sclerosis, angina, myocardial infarction, acute heart failure, chronic heart failure, cardiomyopathy, diabetic cardiomyopathy, cardiomegaly, ischemia-reperfusion injury, hemorrhagic stroke, diabetes mellitus, cerebral infarction, kidney damage, acute renal failure, non-alcoholic steatohepatitis or liver damage, hepatic fibrosis, chronic obstructive pulmonary disease, urinary tract infection, polycystic kidney disease, sepsis-induced cardiac injury, and sepsis.

(20) A ferroptosis inhibitor according to any of the embodiments (1) to (8), or a compound represented by the formula (I) or (I-1) or a pharmaceutically acceptable salt thereof, or a pharmaceutically acceptable solvate of the compound or the salt for use in the prevention or treatment of a symptom, a disease, and/or disorder related to ferroptosis.

(21) The ferroptosis inhibitor, or the compound or the pharmaceutically acceptable salt thereof, or the pharmaceutically acceptable solvate of the compound or the salt according to the embodiment (20), wherein the symptom, the disease, or the disorder related to ferroptosis is a primary mitochondrial disease, a disease caused by reductive stress, a neurodegenerative disease, a metabolic disease, or hepatic dysfunction.

(22) The ferroptosis inhibitor, or the compound or the pharmaceutically acceptable salt thereof, or the pharmaceutically acceptable solvate of the compound or the salt according to the embodiment (20) or (21), wherein the symptom, the disease, or the disorder related to ferroptosis is one or more symptoms, diseases, or disorders selected from the group consisting of Leigh syndrome, a mitochondrial disease which is mitochondrial encephalopathy, lactic acidosis, and stroke-like episodes (MELAS) or Leber's disease, mitochondrial cardiomyopathy, mitochondrial hepatopathy, chronic progressive external ophthalmoplegia (CPEO), Parkinson's disease, Alzheimer's disease, Huntington's disease, amyotrophic lateral sclerosis, angina, myocardial infarction, acute heart failure, chronic heart failure, cardiomyopathy, diabetic cardiomyopathy, cardiomegaly, ischemia-reperfusion injury, hemorrhagic stroke, diabetes mellitus, cerebral infarction, kidney damage, acute renal failure, non-alcoholic steatohepatitis or liver damage, hepatic fibrosis, chronic obstructive pulmonary disease, urinary tract infection, polycystic kidney disease, sepsis-induced cardiac injury, and sepsis.

(23) Use of a ferroptosis inhibitor according to any of the embodiments (1) to (8), or a compound represented by the formula (I) or (I-1) or a pharmaceutically acceptable salt thereof, or a pharmaceutically acceptable solvate of the compound or the salt in the manufacture of a medicament for the prevention or treatment of a symptom, a disease, and/or a disorder related to ferroptosis.

(24) Use of a ferroptosis inhibitor according to any of the embodiments (1) to (8), or a compound represented by the formula (I) or (I-1) or a pharmaceutically acceptable salt thereof, or a pharmaceutically acceptable solvate of the compound or the salt for the prevention or treatment of a symptom, a disease, and/or a disorder related to ferroptosis.

(25) The use according to the embodiment (23) or (24), wherein the symptom, the disease, or the disorder related to ferroptosis is a primary mitochondrial disease, a disease caused by reductive stress, a neurodegenerative disease, a metabolic disease, or hepatic dysfunction.

(26) The use according to any of the embodiments (23) to (25), wherein the symptom, the disease, or the disorder related to ferroptosis is one or more symptoms, diseases, or disorders selected from the group consisting of Leigh syndrome, a mitochondrial disease which is mitochondrial encephalopathy, lactic acidosis, and stroke-like episodes (MELAS) or Leber's disease, mitochondrial cardiomyopathy, mitochondrial hepatopathy, chronic progressive external ophthalmoplegia (CPEO), Parkinson's disease, Alzheimer's disease, Huntington's disease, amyotrophic lateral sclerosis, angina, myocardial infarction, acute heart failure, chronic heart failure, cardiomyopathy, diabetic cardiomyopathy, cardiomegaly, ischemia-reperfusion injury, hemorrhagic stroke, diabetes mellitus, cerebral infarction, kidney damage, acute renal failure, non-alcoholic steatohepatitis or liver damage, hepatic fibrosis, chronic obstructive pulmonary disease, urinary tract infection, polycystic kidney disease, sepsis-induced cardiac injury, and sepsis.

Advantageous Effects of Invention

The present invention reveals that a mechanism of manifestation of a symptom, a disease, or a disorder caused by mitochondrial dysfunction is ferroptosis, and can provide an approach capable of preventing or treating a symptom, a disease, or a disorder related to the same or similar mechanism of manifestation.

The present specification encompasses the contents described in the specification and/or drawings of Japanese Patent Application No. 2021-185384 on which the priority of the present application is based.

DESCRIPTION OF EMBODIMENTS

<1. Ferroptosis Inhibitor>

Figure 1:
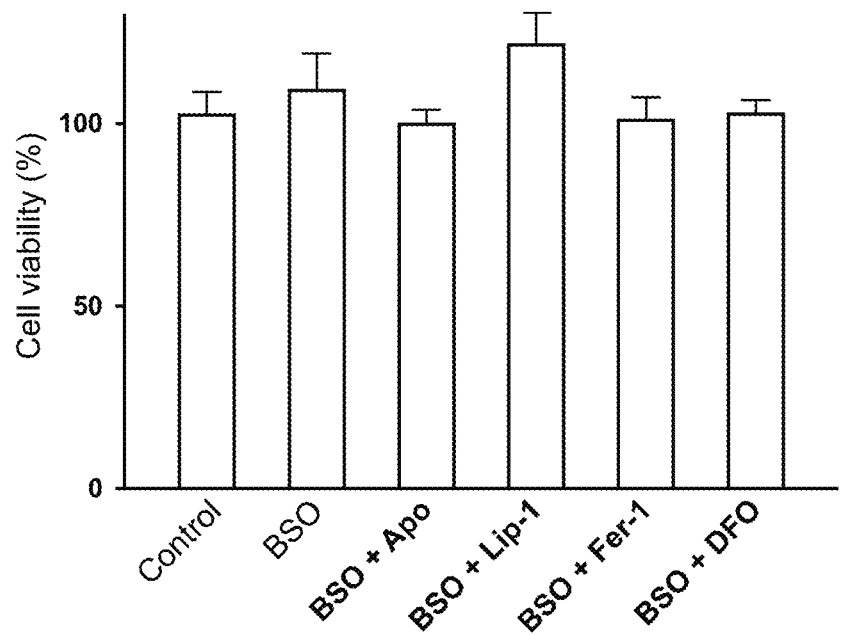
FIG. 1 is a graph showing results of Test I in which a ferroptosis inducer BSO and various ferroptosis inhibitors were coadded to normal cells (Promo1 cells) or Leigh syndrome patient cells ($LS^{ND3}$) and evaluated for a suppressive effect on cell death induced by BSO. In the drawing, A depicts the results about normal cells (Promo1 cells), and B depicts the results about Leigh syndrome patient cells ($LS^{ND3}$). In the drawing, the abscissa depicts test compounds, and the ordinate depicts the cell viability (%) of each treated plot when the number of live cells in a control non-supplemented with BSO is defined as 100%. The values in the drawing represent mean±standard deviation.
Figure 1:
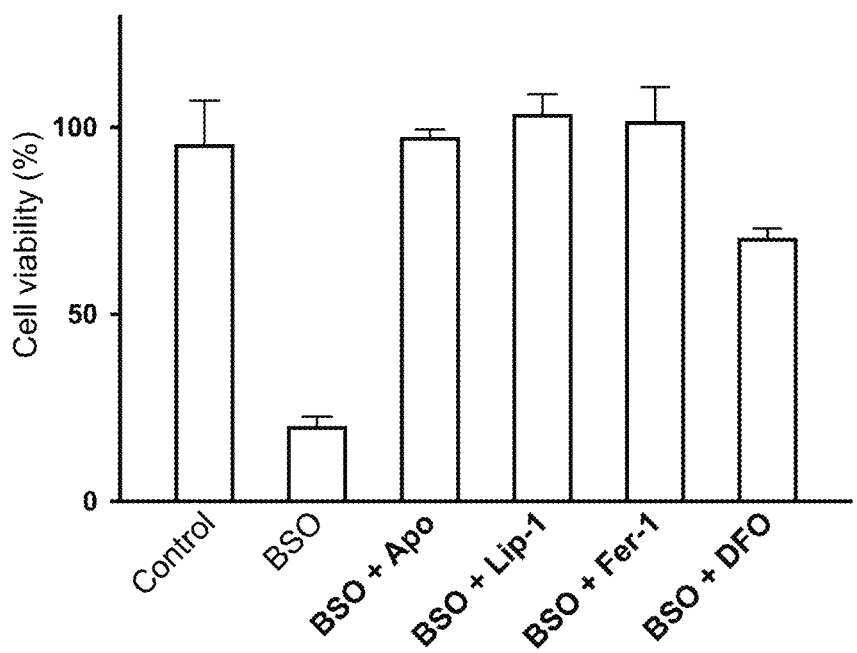

In the present specification, the "mitochondrion" means an organelle responsible for energy production in cells of eukaryotes. Various diseases or symptoms are known as diseases or symptoms caused by mitochondrial dysfunction. However, a fundamental treatment method has not been established for any of these diseases or symptoms caused by mitochondrial dysfunction. There has not existed a drug that has proven efficacy of prevention or treatment and has been approved by a regulatory authority, particularly, for Leigh syndrome and MELAS, two major types in the pediatric field, among the diseases or symptoms caused by mitochondrial dysfunction.

Apomorphine known as a therapeutic drug for Parkinson's disease has an effect of improving mitochondrial dysfunction and can be used in the prevention or treatment of a disease or a symptom caused by mitochondrial dysfunction, for example, mitochondrial disease (International Publication No. WO 2019/093379; Patent Literature 1). However, a target of apomorphine in the effect of improving mitochondrial dysfunction has not been revealed.

In mitochondrial dysfunction, for example, impaired ATP production and/or increased oxidative stress occurs, thereby causing cell death. Hence, individuals having mitochondrial dysfunction are reportedly vulnerable to oxidative stress as compared with normal individuals (Shrader W D et al., Bioorg Med Chem Lett., Jun. 15, 2011, Vol. 21 (12), p. 3693-8., doi:10.1016/j.bmcl.2011.04.085., e-published on Apr. 24, 2011, PubMed PMID: 21600768). Apoptosis, necrosis, and ferroptosis are known as cell death related to oxidative stress. For example, in ferroptosis, unsaturated fatty acids are oxidized so that lipid peroxides are accumulated. This accumulation of lipid peroxides is known to be suppressed by the glutathione (hereinafter, also referred to as "GSH")/glutathione peroxidase 4 (hereinafter, also referred to as "GPX4") system and the $CoQ_{10}$/ferroptosis suppressor protein 1 (hereinafter, also referred to as "FSP1") system (Doll et al. and Bersuker et al., Nature, 2019). However, it has not been clear which mechanism of manifestation described above causes cell death in individuals having mitochondrial dysfunction.

The present inventors have found that cell death related to mitochondrial dysfunction is mainly induced via ferroptosis. The present inventors have also found that the cell death that is induced via ferroptosis is suppressed by apomorphine. The present inventors have further developed apomorphine derivatives with apomorphine as a lead compound and found that some apomorphine derivatives have a high ferroptosis inhibitory effect. Hence, one aspect of the present invention relates to a ferroptosis inhibitor comprising a compound represented by the formula (I):

[Formula 3]

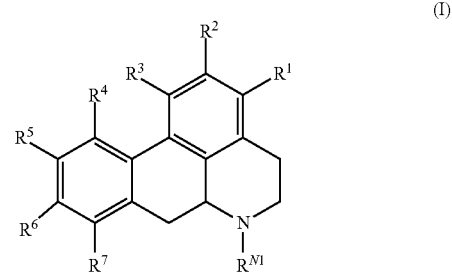

or a pharmaceutically acceptable salt thereof, or a pharmaceutically acceptable solvate of the compound or the salt as an active ingredient.

In the formula (I), $R^{N1}$ is methyl.

In the formula (I), $R^1$ is hydrogen, halogen (fluorine, chlorine, bromine, or iodine), cyano, nitro, hydroxyl, substituted or unsubstituted alkyl, substituted or unsubstituted alkenyl, substituted or unsubstituted alkynyl, substituted or unsubstituted cycloalkyl, substituted or unsubstituted cycloalkenyl, substituted or unsubstituted cycloalkynyl, substituted or unsubstituted heterocycloalkyl, substituted or unsubstituted cycloalkylalkyl, substituted or unsubstituted heterocycloalkylalkyl, substituted or unsubstituted aryl, substituted or unsubstituted arylalkyl, substituted or unsubstituted heteroaryl, substituted or unsubstituted heteroarylalkyl, substituted or unsubstituted alkoxy, substituted or unsubstituted cycloalkoxy, substituted or unsubstituted heterocycloalkoxy, substituted or unsubstituted aryloxy, substituted or unsubstituted arylalkyloxy, substituted or unsubstituted arylalkenyloxy, substituted or unsubstituted heteroaryloxy, substituted or unsubstituted heteroarylalkyloxy, substituted or unsubstituted alkoxycarbonyl, substituted or unsubstituted cycloalkoxycarbonyl, substituted or unsubstituted acyl, substituted or unsubstituted alkylcarbonyloxy, substituted or unsubstituted arylcarbonyloxy, substituted or unsubstituted carbamoyl, substituted or unsubstituted alkylsulfonyl, substituted or unsubstituted arylsulfonyl, substituted or unsubstituted alkylsulfanyl, substituted or unsubstituted arylsulfanyl, or substituted or unsubstituted amino.

$R^1$ is preferably hydrogen, halogen (fluorine, chlorine, bromine, or iodine), cyano, nitro, hydroxyl, substituted or unsubstituted $C_1$ to $C_9$ alkyl, substituted or unsubstituted $C_2$ to $C_9$ alkenyl, substituted or unsubstituted $C_2$ to $C_9$ alkynyl, substituted or unsubstituted $C_3$ to $C_6$ cycloalkyl, substituted or unsubstituted $C_3$ to $C_6$ cycloalkenyl, substituted or unsubstituted $C_3$ to $C_6$ cycloalkynyl, substituted or unsubstituted 3- to 6-membered heterocycloalkyl, substituted or unsubstituted $C_7$ to $C_{20}$ cycloalkylalkyl, substituted or unsubstituted 3- to 6-membered heterocycloalkyl-$C_1$ to $C_9$ alkyl, substituted or unsubstituted $C_6$ to $C_{18}$ aryl, substituted or unsubstituted $C_7$ to $C_{20}$ arylalkyl, substituted or unsubstituted 5- to 15-membered heteroaryl, substituted or unsubstituted 5- to 15-membered heteroaryl-$C_1$ to $C_9$ alkyl, substituted or unsubstituted $C_1$ to $C_9$ alkoxy, substituted or unsubstituted $C_3$ to $C_6$ cycloalkoxy, substituted or unsubstituted 3- to 6-membered heterocycloalkoxy, substituted or unsubstituted $C_6$ to $C_{18}$ aryloxy, substituted or unsubstituted $C_7$ to $C_{20}$ arylalkyloxy, substituted or unsubstituted $C_7$ to $C_{20}$ arylalkenyloxy, substituted or unsubstituted 5- to 15-membered heteroaryloxy, substituted or unsubstituted 5- to 15-membered heteroaryl-$C_1$ to $C_9$ alkyloxy, substituted or unsubstituted $C_1$ to $C_9$ alkoxycarbonyl, substituted or unsubstituted $C_3$ to $C_6$ cycloalkoxycarbonyl, substituted or unsubstituted $C_1$ to $C_{20}$ acyl, substituted or unsubstituted $C_1$ to $C_9$ alkylcarbonyloxy, substituted or unsubstituted $C_6$ to $C_{18}$ arylcarbonyloxy, substituted or unsubstituted carbamoyl, substituted or unsubstituted $C_1$ to $C_9$ alkylsulfonyl, substituted or unsubstituted $C_6$ to $C_{18}$ arylsulfonyl, substituted or unsubstituted $C_1$ to $C_9$ alkylsulfanyl, substituted or unsubstituted $C_6$ to $C_{18}$ arylsulfanyl, or substituted or unsubstituted amino;

more preferably hydrogen, or substituted or unsubstituted $C_1$ to $C_9$ alkoxy;

further preferably hydrogen, or unsubstituted $C_1$ to $C_9$ alkoxy or $C_1$ to $C_9$ alkoxy substituted by at least one monovalent group selected from the group consisting of halogen (fluorine, chlorine, bromine, or iodine), hydroxyl, and carboxyl;

particularly preferably hydrogen or methoxy.

In the formula (I), $R^2$ and $R^3$ are each independently hydrogen, halogen (fluorine, chlorine, bromine, or iodine), cyano, nitro, hydroxyl, substituted or unsubstituted alkyl, substituted or unsubstituted alkenyl, substituted or unsubstituted alkynyl, substituted or unsubstituted cycloalkyl, substituted or unsubstituted cycloalkenyl, substituted or unsubstituted cycloalkynyl, substituted or unsubstituted heterocycloalkyl, substituted or unsubstituted cycloalkylalkyl, substituted or unsubstituted heterocycloalkylalkyl, substituted or unsubstituted aryl, substituted or unsubstituted arylalkyl, substituted or unsubstituted heteroaryl, substituted or unsubstituted heteroarylalkyl, substituted or unsubstituted alkoxy, substituted or unsubstituted cycloalkoxy, substituted or unsubstituted heterocycloalkoxy, substituted or unsubstituted aryloxy, substituted or unsubstituted arylalkyloxy, substituted or unsubstituted arylalkenyloxy, substituted or unsubstituted heteroaryloxy, substituted or unsubstituted heteroarylalkyloxy, substituted or unsubstituted alkoxycarbonyl, substituted or unsubstituted cycloalkoxycarbonyl, substituted or unsubstituted acyl, substituted or unsubstituted alkylcarbonyloxy, substituted or unsubstituted arylcarbonyloxy, substituted or unsubstituted carbamoyl, substituted or unsubstituted alkylsulfonyl, substituted or unsubstituted arylsulfonyl, substituted or unsubstituted alkylsulfanyl, substituted or unsubstituted arylsulfanyl, or substituted or unsubstituted amino, or together form —O—$CH_2$—O—.

Preferably, $R^2$ and $R^3$ are each independently hydrogen, halogen (fluorine, chlorine, bromine, or iodine), cyano, nitro, hydroxyl, substituted or unsubstituted $C_1$ to $C_9$ alkyl, substituted or unsubstituted $C_2$ to $C_9$ alkenyl, substituted or unsubstituted $C_2$ to $C_9$ alkynyl, substituted or unsubstituted $C_3$ to $C_6$ cycloalkyl, substituted or unsubstituted $C_3$ to $C_6$ cycloalkenyl, substituted or unsubstituted $C_3$ to $C_6$ cycloalkynyl, substituted or unsubstituted 3-to 6-membered heterocycloalkyl, substituted or unsubstituted $C_7$ to $C_{20}$ cycloalkylalkyl, substituted or unsubstituted 3- to 6-membered heterocycloalkyl-$C_1$ to $C_9$ alkyl, substituted or unsubstituted $C_6$ to $C_{18}$ aryl, substituted or unsubstituted $C_7$ to $C_{20}$ arylalkyl, substituted or unsubstituted 5- to 15-membered heteroaryl, substituted or unsubstituted 5- to 15-membered heteroaryl-$C_1$ to $C_9$ alkyl, substituted or unsubstituted $C_1$ to $C_9$ alkoxy, substituted or unsubstituted $C_3$ to $C_6$ cycloalkoxy, substituted or unsubstituted 3- to 6-membered heterocycloalkoxy, substituted or unsubstituted $C_6$ to $C_{18}$ aryloxy, substituted or unsubstituted $C_7$ to $C_{20}$ arylalkyloxy, substituted or unsubstituted $C_7$ to $C_{20}$ arylalkenyloxy, substituted or unsubstituted 5- to 15-membered heteroaryloxy, substituted or unsubstituted 5- to 15-membered heteroaryl-$C_1$ to $C_9$ alkyloxy, substituted or unsubstituted $C_1$ to $C_9$ alkoxycarbonyl, substituted or unsubstituted $C_3$ to $C_6$ cycloalkoxycarbonyl, substituted or unsubstituted $C_1$ to $C_{20}$ acyl, substituted or unsubstituted $C_1$ to $C_9$ alkylcarbonyloxy, substituted or unsubstituted $C_6$ to $C_{18}$ arylcarbonyloxy, substituted or unsubstituted carbamoyl, substituted or unsubstituted $C_1$ to $C_9$ alkylsulfonyl, substituted or unsubstituted $C_6$ to $C_{18}$ arylsulfonyl, substituted or unsubstituted $C_1$ to $C_9$ alkylsulfanyl, substituted or unsubstituted $C_6$ to $C_{18}$ arylsulfanyl, or substituted or unsubstituted amino, or together form —O—$CH_2$—O—;

more preferably, $R^2$ and $R^3$ are each independently hydrogen, hydroxyl, unsubstituted $C_1$ to $C_9$ alkoxy or $C_1$ to $C_9$ alkoxy substituted by at least one monovalent group selected from the group consisting of halogen (fluorine, chlorine, bromine, or iodine), hydroxyl, and carboxyl, or unsubstituted $C_7$ to $C_{20}$ arylalkyloxy or $C_7$ to $C_{20}$ arylalkyloxy substituted by at least one monovalent group selected from the group consisting of halogen (fluorine, chlorine, bromine, or iodine), hydroxyl, and carboxyl, or together form —O—$CH_2$—O—;

further preferably, $R^2$ and $R^3$ are each independently hydrogen, hydroxyl, or unsubstituted $C_1$ to $C_9$ alkoxy or $C_1$ to $C_9$ alkoxy substituted by at least one monovalent group selected from the group consisting of halogen (fluorine, chlorine, bromine, or iodine), hydroxyl, and carboxyl, or together form —O—$CH_2$—O—;

particularly preferably, both $R^2$ and $R^3$ are hydrogen, both $R^2$ and $R^3$ are methoxy, or one of $R^2$ and $R^3$ is hydroxyl and the other is methoxy, or $R^2$ and $R^3$ together form —O—$CH_2$—O—.

In the formula (I), $R^4$ and $R^5$ are each independently hydrogen, halogen (fluorine, chlorine, bromine, or iodine), cyano, nitro, hydroxyl, substituted or unsubstituted alkyl, substituted or unsubstituted alkenyl, substituted or unsubstituted alkynyl, substituted or unsubstituted cycloalkyl, substituted or unsubstituted cycloalkenyl, substituted or unsubstituted cycloalkynyl, substituted or unsubstituted heterocycloalkyl, substituted or unsubstituted cycloalkylalkyl, substituted or unsubstituted heterocycloalkylalkyl, substituted or unsubstituted aryl, substituted or unsubstituted arylalkyl, substituted or unsubstituted heteroaryl, substituted or unsubstituted heteroarylalkyl, substituted or unsubstituted alkoxy, substituted or unsubstituted cycloalkoxy, substituted or unsubstituted heterocycloalkoxy, substituted or unsubstituted aryloxy, substituted or unsubstituted arylalkyloxy, substituted or unsubstituted arylalkenyloxy, substituted or unsubstituted heteroaryloxy, substituted or unsubstituted heteroarylalkyloxy, substituted or unsubstituted alkoxycarbonyl, substituted or unsubstituted cycloalkoxycarbonyl, substituted or unsubstituted acyl, substituted or unsubstituted alkylcarbonyloxy, substituted or unsubstituted arylcarbonyloxy, substituted or unsubstituted carbamoyl, substituted or unsubstituted alkylsulfonyl, substituted or unsubstituted arylsulfonyl, substituted or unsubstituted alkylsulfanyl, substituted or unsubstituted arylsulfanyl, or substituted or unsubstituted amino, or together form —O—$CH_2$—O—.

Preferably, $R^4$ and $R^5$ are each independently hydrogen, halogen (fluorine, chlorine, bromine, or iodine), cyano, nitro, hydroxyl, substituted or unsubstituted $C_1$ to $C_9$ alkyl, substituted or unsubstituted $C_2$ to $C_9$ alkenyl, substituted or unsubstituted $C_2$ to $C_9$ alkynyl, substituted or unsubstituted $C_3$ to $C_6$ cycloalkyl, substituted or unsubstituted $C_3$ to $C_6$ cycloalkenyl, substituted or unsubstituted $C_3$ to $C_6$ cycloalkynyl, substituted or unsubstituted 3-to 6-membered heterocycloalkyl, substituted or unsubstituted $C_7$ to $C_{20}$ cycloalkylalkyl, substituted or unsubstituted 3- to 6-membered heterocycloalkyl-$C_1$ to $C_9$ alkyl, substituted or unsubstituted $C_6$ to $C_{18}$ aryl, substituted or unsubstituted $C_7$ to $C_{20}$ arylalkyl, substituted or unsubstituted 5- to 15-membered heteroaryl, substituted or unsubstituted 5- to 15-membered heteroaryl-$C_1$ to $C_9$ alkyl, substituted or unsubstituted $C_1$ to $C_9$ alkoxy, substituted or unsubstituted $C_3$ to $C_6$ cycloalkoxy, substituted or unsubstituted 3- to 6-membered heterocycloalkoxy, substituted or unsubstituted $C_6$ to $C_{18}$ aryloxy, substituted or unsubstituted $C_7$ to $C_{20}$ arylalkyloxy, substituted or unsubstituted $C_7$ to $C_{20}$ arylalkenyloxy, substituted or unsubstituted 5- to 15-membered heteroaryloxy, substituted or unsubstituted 5- to 15-membered heteroaryl-$C_1$ to $C_9$ alkyloxy, substituted or unsubstituted $C_1$ to $C_9$ alkoxycarbonyl, substituted or unsubstituted $C_3$ to $C_6$ cycloalkoxycarbonyl, substituted or unsubstituted $C_1$ to $C_{20}$ acyl, substituted or unsubstituted $C_1$ to $C_9$ alkylcarbonyloxy, substituted or unsubstituted $C_6$ to $C_{18}$ arylcarbonyloxy, substituted or unsubstituted carbamoyl, substituted or unsubstituted $C_1$ to $C_9$ alkylsulfonyl, substituted or unsubstituted $C_6$ to $C_{18}$ arylsulfonyl, substituted or unsubstituted $C_1$ to $C_9$ alkylsulfanyl, substituted or unsubstituted $C_6$ to $C_{18}$ arylsulfanyl, or substituted or unsubstituted amino, or together form —O—CH$_2$—O—;

more preferably, $R^4$ and $R^5$ are each independently hydrogen, hydroxyl, unsubstituted $C_6$ to $C_{18}$ aryl or $C_6$ to $C_{18}$ aryl substituted by at least one monovalent group selected from the group consisting of halogen (fluorine, chlorine, bromine, or iodine), hydroxyl, and carboxyl, unsubstituted $C_1$ to $C_9$ alkoxy or $C_1$ to $C_9$ alkoxy substituted by at least one monovalent group selected from the group consisting of halogen (fluorine, chlorine, bromine, or iodine), hydroxyl, and carboxyl, or unsubstituted $C_7$ to $C_{20}$ arylalkyloxy or $C_7$ to $C_{20}$ arylalkyloxy substituted by at least one monovalent group selected from the group consisting of halogen (fluorine, chlorine, bromine, or iodine), hydroxyl, and carboxyl, or together form —O—CH$_2$—O—;

further preferably, $R^4$ and $R^5$ are each independently hydrogen, hydroxyl, phenyl, methoxy, ethoxy, n-butyloxy, phenylmethoxy (i.e., benzyloxy), 2-phenylethoxy, 3-phenylpropyloxy, 4-phenylbutyloxy, 3,3-biphenylpropyloxy, 3-hydroxylpropyloxy, 3-chloropropyloxy, n-propyloxy, n-nonyloxy, or 4-trifluorobutyloxy;

still further preferably, both $R^4$ and $R^5$ are hydrogen or methoxy, one of $R^4$ and $R^5$ is hydrogen and the other is hydroxyl or methoxy, or one of $R^4$ and $R^5$ is hydroxyl and the other is phenyl, methoxy, ethoxy, n-butyloxy, phenylmethoxy (i.e., benzyloxy), 2-phenylethoxy, 3-phenylpropyloxy, 4-phenylbutyloxy, 3,3-biphenylpropyloxy, 3-hydroxylpropyloxy, 3-chloropropyloxy, n-propyloxy, n-nonyloxy, 4-trifluorobutyloxy, isopropyloxy, 2-methylpropyloxy, 1-methylpropyloxy, chloromethoxy, 2-chloroethoxy, 2-trifluoroethoxy, or 3-trifluoropropyloxy;

particularly preferably, both $R^4$ and $R^5$ are hydrogen or methoxy, one of $R^4$ and $R^5$ is hydrogen and the other is hydroxyl or methoxy, or one of $R^4$ and $R^5$ is hydroxyl and the other is phenyl, methoxy, ethoxy, n-butyloxy, phenylmethoxy (i.e., benzyloxy), 2-phenylethoxy, 3-phenylpropyloxy, 4-phenylbutyloxy, 3,3-biphenylpropyloxy, 3-hydroxylpropyloxy, 3-chloropropyloxy, n-propyloxy, n-nonyloxy, or 4-trifluorobutyloxy.

In the formula (I), $R^6$ and $R^7$ are each independently hydrogen, halogen (fluorine, chlorine, bromine, or iodine), cyano, nitro, hydroxyl, substituted or unsubstituted alkyl, substituted or unsubstituted alkenyl, substituted or unsubstituted alkynyl, substituted or unsubstituted cycloalkyl, substituted or unsubstituted cycloalkenyl, substituted or unsubstituted cycloalkynyl, substituted or unsubstituted heterocycloalkyl, substituted or unsubstituted cycloalkylalkyl, substituted or unsubstituted heterocycloalkylalkyl, substituted or unsubstituted aryl, substituted or unsubstituted arylalkyl, substituted or unsubstituted heteroaryl, substituted or unsubstituted heteroarylalkyl, substituted or unsubstituted alkoxy, substituted or unsubstituted cycloalkoxy, substituted or unsubstituted heterocycloalkoxy, substituted or unsubstituted aryloxy, substituted or unsubstituted arylalkyloxy, substituted or unsubstituted arylalkenyloxy, substituted or unsubstituted heteroaryloxy, substituted or unsubstituted heteroarylalkyloxy, substituted or unsubstituted alkoxycarbonyl, substituted or unsubstituted cycloalkoxycarbonyl, substituted or unsubstituted acyl, substituted or unsubstituted alkylcarbonyloxy, substituted or unsubstituted arylcarbonyloxy, substituted or unsubstituted carbamoyl, substituted or unsubstituted alkylsulfonyl, substituted or unsubstituted arylsulfonyl, substituted or unsubstituted alkylsulfanyl, substituted or unsubstituted arylsulfanyl, or substituted or unsubstituted amino, or together form —O—CH$_2$—O—.

Preferably, $R^6$ and $R^7$ are each independently hydrogen, halogen (fluorine, chlorine, bromine, or iodine), cyano, nitro, hydroxyl, substituted or unsubstituted $C_1$ to $C_9$ alkyl, substituted or unsubstituted $C_2$ to $C_9$ alkenyl, substituted or unsubstituted $C_2$ to $C_9$ alkynyl, substituted or unsubstituted $C_3$ to $C_6$ cycloalkyl, substituted or unsubstituted $C_3$ to $C_6$ cycloalkenyl, substituted or unsubstituted $C_3$ to $C_6$ cycloalkynyl, substituted or unsubstituted 3-to 6-membered heterocycloalkyl, substituted or unsubstituted $C_7$ to $C_{20}$ cycloalkylalkyl, substituted or unsubstituted 3- to 6-membered heterocycloalkyl-$C_1$ to $C_9$ alkyl, substituted or unsubstituted $C_6$ to $C_{18}$ aryl, substituted or unsubstituted $C_7$ to $C_{20}$ arylalkyl, substituted or unsubstituted 5- to 15-membered heteroaryl, substituted or unsubstituted 5- to 15-membered heteroaryl-$C_1$ to $C_9$ alkyl, substituted or unsubstituted $C_1$ to $C_9$ alkoxy, substituted or unsubstituted $C_3$ to $C_6$ cycloalkoxy, substituted or unsubstituted 3- to 6-membered heterocycloalkoxy, substituted or unsubstituted $C_6$ to $C_{18}$ aryloxy, substituted or unsubstituted $C_7$ to $C_{20}$ arylalkyloxy, substituted or unsubstituted $C_7$ to $C_{20}$ arylalkenyloxy, substituted or unsubstituted 5- to 15-membered heteroaryloxy, substituted or unsubstituted 5- to 15-membered heteroaryl-$C_1$ to $C_9$ alkyloxy, substituted or unsubstituted $C_1$ to $C_9$ alkoxycarbonyl, substituted or unsubstituted $C_3$ to $C_6$ cycloalkoxycarbonyl, substituted or unsubstituted $C_1$ to $C_{20}$ acyl, substituted or unsubstituted $C_1$ to $C_9$ alkylcarbonyloxy, substituted or unsubstituted $C_6$ to $C_{18}$ arylcarbonyloxy, substituted or unsubstituted carbamoyl, substituted or unsubstituted $C_1$ to $C_9$ alkylsulfonyl, substituted or unsubstituted $C_6$ to $C_{18}$ arylsulfonyl, substituted or unsubstituted $C_1$ to $C_9$ alkylsulfanyl, substituted or unsubstituted $C_6$ to $C_{18}$ arylsulfanyl, or substituted or unsubstituted amino, or together form —O—CH$_2$—O—;

more preferably, $R^6$ and $R^7$ are each independently hydrogen, hydroxyl, unsubstituted $C_1$ to $C_9$ alkoxy or $C_1$ to $C_9$ alkoxy substituted by at least one monovalent group selected from the group consisting of halogen (fluorine, chlorine, bromine, or iodine), hydroxyl, and carboxyl, or unsubstituted $C_7$ to $C_{20}$ arylalkyloxy or $C_7$ to $C_{20}$ arylalkyloxy substituted by at least one monovalent group selected from the group consisting of halogen (fluorine, chlorine, bromine, or iodine), hydroxyl, and carboxyl, or together form —O—CH$_2$—O—;

further preferably, R$^6$ and R$^7$ are each independently hydrogen or methoxy;

particularly preferably, both R$^6$ and R$^7$ are hydrogen or methoxy, or one of R$^6$ and R$^7$ is hydrogen and the other is methoxy.

In the formula (I), when the groups are substituted, the substituents are each independently preferably at least one monovalent group or divalent group selected from the group consisting of halogen (fluorine, chlorine, bromine, or iodine), cyano, nitro, hydroxyl, substituted or unsubstituted alkyl, substituted or unsubstituted alkenyl, substituted or unsubstituted alkynyl, substituted or unsubstituted cycloalkyl, substituted or unsubstituted cycloalkenyl, substituted or unsubstituted cycloalkynyl, substituted or unsubstituted heterocycloalkyl, substituted or unsubstituted cycloalkylalkyl, substituted or unsubstituted heterocycloalkylalkyl, substituted or unsubstituted aryl, substituted or unsubstituted arylalkyl, substituted or unsubstituted heteroaryl, substituted or unsubstituted heteroarylalkyl, substituted or unsubstituted alkoxy, substituted or unsubstituted cycloalkoxy, substituted or unsubstituted heterocycloalkoxy, substituted or unsubstituted aryloxy, substituted or unsubstituted arylalkyloxy, substituted or unsubstituted heteroaryloxy, substituted or unsubstituted heteroarylalkyloxy, substituted or unsubstituted alkoxycarbonyl, substituted or unsubstituted cycloalkoxycarbonyl, substituted or unsubstituted acyl, substituted or unsubstituted acyloxy, substituted or unsubstituted amino, and oxo (C=O), more preferably at least one monovalent group or divalent group selected from the group consisting of halogen (fluorine, chlorine, bromine, or iodine), cyano, nitro, hydroxyl, substituted or unsubstituted C$_1$ to C$_6$ alkyl, substituted or unsubstituted C$_2$ to C$_6$ alkenyl, substituted or unsubstituted C$_2$ to C$_6$ alkynyl, substituted or unsubstituted C$_3$ to C$_6$ cycloalkyl, substituted or unsubstituted C$_4$ to C$_6$ cycloalkenyl, substituted or unsubstituted C$_4$ to C$_6$ cycloalkynyl, substituted or unsubstituted 3-to 6-membered heterocycloalkyl, substituted or unsubstituted C$_7$ to C$_{11}$ cycloalkylalkyl, substituted or unsubstituted 3- to 6-membered heterocycloalkyl-C$_1$ to C$_6$ alkyl, substituted or unsubstituted C$_6$ to C$_{18}$ aryl, substituted or unsubstituted C$_7$ to C$_{20}$ arylalkyl, substituted or unsubstituted 5- to 15-membered heteroaryl, substituted or unsubstituted 5- to 15-membered heteroaryl-C$_1$ to C$_6$ alkyl, substituted or unsubstituted C$_1$ to C$_6$ alkoxy, substituted or unsubstituted C$_3$ to C$_6$ cycloalkoxy, substituted or unsubstituted 3- to 6-membered heterocycloalkoxy, substituted or unsubstituted C$_6$ to C$_{18}$ aryloxy, substituted or unsubstituted C$_7$ to C$_{20}$ arylalkyloxy, substituted or unsubstituted 5- to 15-membered heteroaryloxy, substituted or unsubstituted 5- to 15-membered heteroaryl-C$_1$ to C$_6$ alkyloxy, substituted or unsubstituted C$_1$ to C$_6$ alkoxycarbonyl, substituted or unsubstituted C$_3$ to C$_6$ cycloalkoxycarbonyl, substituted or unsubstituted C$_1$ to C$_{20}$ acyl, substituted or unsubstituted C$_1$ to C$_{20}$ acyloxy, substituted or unsubstituted amino, and oxo (C=O), further preferably at least one monovalent group selected from the group consisting of hydroxyl, substituted or unsubstituted C$_1$ to C$_6$ alkoxy, substituted or unsubstituted C$_3$ to C$_6$ cycloalkoxy, substituted or unsubstituted 3- to 6-membered heterocycloalkoxy, substituted or unsubstituted C$_6$ to C$_{18}$ aryloxy, substituted or unsubstituted C$_7$ to C$_{20}$ arylalkyloxy, substituted or unsubstituted 5- to 15-membered heteroaryloxy, substituted or unsubstituted 5- to 15-membered heteroaryl-C$_1$ to C$_6$ alkyloxy, and substituted or unsubstituted C$_1$ to C$_{20}$ acyloxy, particularly preferably hydroxyl. When the monovalent groups are substituted, the substituents are preferably further selected from the monovalent groups or the divalent groups, more preferably further selected from the unsubstituted monovalent groups or divalent groups.

The compound represented by the formula (I) can encompass a compound defined by an arbitrary combination of R$^{N1}$, R$^1$, R$^2$, R$^3$, R$^4$, R$^5$, R$^6$, and R$^7$ listed above.

In one particular embodiment, the compound represented by the formula (I) encompasses a compound defined by an arbitrary combination of R$^{N1}$, R$^1$, R$^2$, R$^3$, R$^4$, R$^5$, R$^6$, and R$^7$ listed above except for the case where R$^{N1}$ is methyl, each of R$^1$, R$^2$, and R$^3$ is hydrogen, each of R$^4$ and R$^5$ is hydroxyl, and each of R$^6$ and R$^7$ is hydrogen. In the case of the combination described above, the compound represented by the formula (I) encompasses apomorphine. The compound represented by the formula (I) except for the case of the combination described above has been found to have substantially no dopamine receptor binding activity. Apomorphine serves as a dopamine receptor agonist and has been approved and clinically used as a therapeutic drug for off periods of Parkinson's disease. However, such a dopamine receptor agonist might be accompanied by adverse reactions such as emetic action caused by the dopamine receptor agonist activity. By contrast, the compound represented by the formula (I) except for the case of the combination described above has substantially no dopamine receptor binding activity and as such, can be used as an active ingredient for a medicament having few adverse reactions such as the emetic action.

When R$^{N1}$, R$^1$, R$^2$, R$^3$, R$^4$, R$^5$, R$^6$, and R$^7$ are the groups listed above, the compound represented by the formula (I) can exert a high ferroptosis inhibitory effect.

Preferably, in the compound represented by the formula (I),

R$^{N1}$ is methyl;

R$^1$ is hydrogen, halogen (fluorine, chlorine, bromine, or iodine), cyano, nitro, hydroxyl, substituted or unsubstituted C$_1$ to C$_9$ alkyl, substituted or unsubstituted C$_2$ to C$_9$ alkenyl, substituted or unsubstituted C$_2$ to C$_9$ alkynyl, substituted or unsubstituted C$_3$ to C$_6$ cycloalkyl, substituted or unsubstituted C$_3$ to C$_6$ cycloalkenyl, substituted or unsubstituted C$_3$ to C$_6$ cycloalkynyl, substituted or unsubstituted 3- to 6-membered heterocycloalkyl, substituted or unsubstituted C$_7$ to C$_{20}$ cycloalkylalkyl, substituted or unsubstituted 3- to 6-membered heterocycloalkyl-C$_1$ to C$_9$ alkyl, substituted or unsubstituted C$_6$ to C$_{18}$ aryl, substituted or unsubstituted C$_7$ to C$_{20}$ arylalkyl, substituted or unsubstituted 5- to 15-membered heteroaryl, substituted or unsubstituted 5- to 15-membered heteroaryl-C$_1$ to C$_9$ alkyl, substituted or unsubstituted C$_1$ to C$_9$ alkoxy, substituted or unsubstituted C$_3$ to C$_6$ cycloalkoxy, substituted or unsubstituted 3- to 6-membered heterocycloalkoxy, substituted or unsubstituted C$_6$ to C$_{18}$ aryloxy, substituted or unsubstituted C$_7$ to C$_{20}$ arylalkyloxy, substituted or unsubstituted C$_7$ to C$_{20}$ arylalkenyloxy, substituted or unsubstituted 5- to 15-membered heteroaryloxy, substituted or unsubstituted 5- to 15-membered heteroaryl-C$_1$ to C$_9$ alkyloxy, substituted or unsubstituted C$_1$ to C$_9$ alkoxycarbonyl, substituted or unsubstituted C$_3$ to C$_6$ cycloalkoxycarbonyl, substituted or unsubstituted C$_1$ to C$_{20}$ acyl, substituted or unsubstituted C$_1$ to C$_9$ alkylcarbonyloxy, substituted or unsubstituted C$_6$ to C$_{18}$ arylcarbonyloxy, substituted or unsubstituted carbamoyl, substituted or unsubstituted C$_1$ to C$_9$ alkylsulfonyl, substituted or unsubstituted C$_6$ to C$_{18}$ arylsulfonyl, substituted or unsubstituted $C_1$ to $C_9$ alkylsulfanyl, substituted or unsubstituted $C_6$ to $C_{18}$ arylsulfanyl, or substituted or unsubstituted amino;

$R^2$ and $R^3$ are each independently hydrogen, halogen (fluorine, chlorine, bromine, or iodine), cyano, nitro, hydroxyl, substituted or unsubstituted $C_1$ to $C_9$ alkyl, substituted or unsubstituted $C_2$ to $C_9$ alkenyl, substituted or unsubstituted $C_2$ to $C_9$ alkynyl, substituted or unsubstituted $C_3$ to $C_6$ cycloalkyl, substituted or unsubstituted $C_3$ to $C_6$ cycloalkenyl, substituted or unsubstituted $C_3$ to $C_6$ cycloalkynyl, substituted or unsubstituted 3- to 6-membered heterocycloalkyl, substituted or unsubstituted $C_7$ to $C_{20}$ cycloalkylalkyl, substituted or unsubstituted 3- to 6-membered heterocycloalkyl-$C_1$ to $C_9$ alkyl, substituted or unsubstituted $C_6$ to $C_{18}$ aryl, substituted or unsubstituted $C_7$ to $C_{20}$ arylalkyl, substituted or unsubstituted 5- to 15-membered heteroaryl, substituted or unsubstituted 5- to 15-membered heteroaryl-$C_1$ to $C_9$ alkyl, substituted or unsubstituted $C_1$ to $C_9$ alkoxy, substituted or unsubstituted $C_3$ to $C_6$ cycloalkoxy, substituted or unsubstituted 3- to 6-membered heterocycloalkoxy, substituted or unsubstituted $C_6$ to $C_{18}$ aryloxy, substituted or unsubstituted $C_7$ to $C_{20}$ arylalkyloxy, substituted or unsubstituted $C_7$ to $C_{20}$ arylalkenyloxy, substituted or unsubstituted 5- to 15-membered heteroaryloxy, substituted or unsubstituted 5- to 15-membered heteroaryl-$C_1$ to $C_9$ alkyloxy, substituted or unsubstituted $C_1$ to $C_9$ alkoxycarbonyl, substituted or unsubstituted $C_3$ to $C_6$ cycloalkoxycarbonyl, substituted or unsubstituted $C_1$ to $C_{20}$ acyl, substituted or unsubstituted $C_1$ to $C_9$ alkylcarbonyloxy, substituted or unsubstituted $C_6$ to $C_{18}$ arylcarbonyloxy, substituted or unsubstituted carbamoyl, substituted or unsubstituted $C_1$ to $C_9$ alkylsulfonyl, substituted or unsubstituted $C_6$ to $C_{18}$ arylsulfonyl, substituted or unsubstituted $C_1$ to $C_9$ alkylsulfanyl, substituted or unsubstituted $C_6$ to $C_{18}$ arylsulfanyl, or substituted or unsubstituted amino, or $R^2$ and $R^3$ together form —O—$CH_2$—O—;

$R^4$ and $R^5$ are each independently hydrogen, halogen (fluorine, chlorine, bromine, or iodine), cyano, nitro, hydroxyl, substituted or unsubstituted $C_1$ to $C_9$ alkyl, substituted or unsubstituted $C_2$ to $C_9$ alkenyl, substituted or unsubstituted $C_2$ to $C_9$ alkynyl, substituted or unsubstituted $C_3$ to $C_6$ cycloalkyl, substituted or unsubstituted $C_3$ to $C_6$ cycloalkenyl, substituted or unsubstituted $C_3$ to $C_6$ cycloalkynyl, substituted or unsubstituted 3- to 6-membered heterocycloalkyl, substituted or unsubstituted $C_7$ to $C_{20}$ cycloalkylalkyl, substituted or unsubstituted 3- to 6-membered heterocycloalkyl-$C_1$ to $C_9$ alkyl, substituted or unsubstituted $C_6$ to $C_{18}$ aryl, substituted or unsubstituted $C_7$ to $C_{20}$ arylalkyl, substituted or unsubstituted 5- to 15-membered heteroaryl, substituted or unsubstituted 5- to 15-membered heteroaryl-$C_1$ to $C_9$ alkyl, substituted or unsubstituted $C_1$ to $C_9$ alkoxy, substituted or unsubstituted $C_3$ to $C_6$ cycloalkoxy, substituted or unsubstituted 3- to 6-membered heterocycloalkoxy, substituted or unsubstituted $C_6$ to $C_{18}$ aryloxy, substituted or unsubstituted $C_7$ to $C_{20}$ arylalkyloxy, substituted or unsubstituted $C_7$ to $C_{20}$ arylalkenyloxy, substituted or unsubstituted 5- to 15-membered heteroaryloxy, substituted or unsubstituted 5- to 15-membered heteroaryl-$C_1$ to $C_9$ alkyloxy, substituted or unsubstituted $C_1$ to $C_9$ alkoxycarbonyl, substituted or unsubstituted $C_3$ to $C_6$ cycloalkoxycarbonyl, substituted or unsubstituted $C_1$ to $C_{20}$ acyl, substituted or unsubstituted $C_1$ to $C_9$ alkylcarbonyloxy, substituted or unsubstituted $C_6$ to $C_{18}$ arylcarbonyloxy, substituted or unsubstituted carbamoyl, substituted or unsubstituted $C_1$ to $C_9$ alkylsulfonyl, substituted or unsubstituted $C_6$ to $C_{18}$ arylsulfonyl, substituted or unsubstituted $C_1$ to $C_9$ alkylsulfanyl, substituted or unsubstituted $C_6$ to $C_{18}$ arylsulfanyl, or substituted or unsubstituted amino, or $R^4$ and $R^5$ together form —O—$CH_2$—O—; and $R^6$ and $R^7$ are each independently hydrogen, halogen (fluorine, chlorine, bromine, or iodine), cyano, nitro, hydroxyl, substituted or unsubstituted $C_1$ to $C_9$ alkyl, substituted or unsubstituted $C_2$ to $C_9$ alkenyl, substituted or unsubstituted $C_2$ to $C_9$ alkynyl, substituted or unsubstituted $C_3$ to $C_6$ cycloalkyl, substituted or unsubstituted $C_3$ to $C_6$ cycloalkenyl, substituted or unsubstituted $C_3$ to $C_6$ cycloalkynyl, substituted or unsubstituted 3- to 6-membered heterocycloalkyl, substituted or unsubstituted $C_7$ to $C_{20}$ cycloalkylalkyl, substituted or unsubstituted 3- to 6-membered heterocycloalkyl-$C_1$ to $C_9$ alkyl, substituted or unsubstituted $C_6$ to $C_{18}$ aryl, substituted or unsubstituted $C_7$ to $C_{20}$ arylalkyl, substituted or unsubstituted 5- to 15-membered heteroaryl, substituted or unsubstituted 5- to 15-membered heteroaryl-$C_1$ to $C_9$ alkyl, substituted or unsubstituted $C_1$ to $C_9$ alkoxy, substituted or unsubstituted $C_3$ to $C_6$ cycloalkoxy, substituted or unsubstituted 3- to 6-membered heterocycloalkoxy, substituted or unsubstituted $C_6$ to $C_{18}$ aryloxy, substituted or unsubstituted $C_7$ to $C_{20}$ arylalkyloxy, substituted or unsubstituted $C_7$ to $C_{20}$ arylalkenyloxy, substituted or unsubstituted 5- to 15-membered heteroaryloxy, substituted or unsubstituted 5- to 15-membered heteroaryl-$C_1$ to $C_9$ alkyloxy, substituted or unsubstituted $C_1$ to $C_9$ alkoxycarbonyl, substituted or unsubstituted $C_3$ to $C_6$ cycloalkoxycarbonyl, substituted or unsubstituted $C_1$ to $C_{20}$ acyl, substituted or unsubstituted $C_1$ to $C_9$ alkylcarbonyloxy, substituted or unsubstituted $C_6$ to $C_{18}$ arylcarbonyloxy, substituted or unsubstituted carbamoyl, substituted or unsubstituted $C_1$ to $C_9$ alkylsulfonyl, substituted or unsubstituted $C_6$ to $C_{18}$ arylsulfonyl, substituted or unsubstituted $C_1$ to $C_9$ alkylsulfanyl, substituted or unsubstituted $C_6$ to $C_{18}$ arylsulfanyl, or substituted or unsubstituted amino, or $R^6$ and $R^7$ together form —O—$CH_2$—O—, except for the case where $R^{N1}$ is methyl, each of $R^1$, $R^2$, and $R^3$ is hydrogen, each of $R^4$ and $R^5$ is hydroxyl, and each of $R^6$ and $R^7$ is hydrogen; and when the groups are substituted, the substituents are each independently at least one monovalent group or divalent group selected from the group consisting of halogen (fluorine, chlorine, bromine, or iodine), cyano, nitro, hydroxyl, substituted or unsubstituted $C_1$ to $C_6$ alkyl, substituted or unsubstituted $C_2$ to $C_6$ alkenyl, substituted or unsubstituted $C_2$ to $C_6$ alkynyl, substituted or unsubstituted $C_3$ to $C_6$ cycloalkyl, substituted or unsubstituted $C_4$ to $C_6$ cycloalkenyl, substituted or unsubstituted $C_4$ to $C_6$ cycloalkynyl, substituted or unsubstituted 3- to 6-membered heterocycloalkyl, substituted or unsubstituted $C_7$ to $C_{11}$ cycloalkylalkyl, substituted or unsubstituted 3- to 6-membered heterocycloalkyl-$C_1$ to $C_6$ alkyl, substituted or unsubstituted $C_6$ to $C_{18}$ aryl, substituted or unsubstituted $C_7$ to $C_{20}$ arylalkyl, substituted or unsubstituted 5- to 15-membered heteroaryl, substituted or unsubstituted 5- to 15-membered heteroaryl-$C_1$ to $C_6$ alkyl, substituted or unsubstituted $C_1$ to $C_6$ alkoxy, substituted or unsubstituted $C_3$ to $C_6$ cycloalkoxy, substituted or unsubstituted 3- to 6-membered heterocycloalkoxy, substituted or unsubstituted $C_6$ to $C_{18}$ aryloxy, substituted or unsubstituted $C_7$ to $C_{20}$ arylalkyloxy, substituted or unsubstituted 5- to 15-membered heteroaryloxy, substituted or unsubstituted 5- to 15-membered heteroaryl-$C_1$ to $C_6$ alkyloxy, substituted or unsubstituted $C_1$ to $C_6$ alkoxycarbonyl, substituted or unsubstituted $C_3$ to $C_6$ cycloalkoxycarbonyl, substituted or unsubstituted $C_1$ to $C_{20}$ acyl, substituted or unsubstituted $C_1$ to $C_{20}$ acyloxy, substituted or unsubstituted amino, and oxo (C=O).

More preferably, in the compound represented by the formula (I), $R^{N1}$ is methyl;

$R^1$ is hydrogen, or substituted or unsubstituted $C_1$ to $C_9$ alkoxy;

$R^2$ and $R^3$ are each independently hydrogen, hydroxyl, unsubstituted $C_1$ to $C_9$ alkoxy or $C_1$ to $C_9$ alkoxy substituted by at least one monovalent group selected from the group consisting of halogen (fluorine, chlorine, bromine, or iodine), hydroxyl, and carboxyl, or unsubstituted $C_7$ to $C_{20}$ arylalkyloxy or arylalkyloxy substituted by at least one monovalent group selected from the group consisting of halogen (fluorine, chlorine, bromine, or iodine), hydroxyl, and carboxyl, or $R^2$ and $R^3$ together form —O—CH$_2$—O—;

$R^4$ and $R^5$ are each independently hydrogen, hydroxyl, unsubstituted $C_6$ to $C_{18}$ aryl or $C_6$ to $C_{18}$ aryl substituted by at least one monovalent group selected from the group consisting of halogen (fluorine, chlorine, bromine, or iodine), hydroxyl, and carboxyl, unsubstituted $C_1$ to $C_9$ alkoxy or $C_1$ to $C_9$ alkoxy substituted by at least one monovalent group selected from the group consisting of halogen (fluorine, chlorine, bromine, or iodine), hydroxyl, and carboxyl, or unsubstituted $C_7$ to $C_{20}$ arylalkyloxy or $C_7$ to $C_{20}$ arylalkyloxy substituted by at least one monovalent group selected from the group consisting of halogen (fluorine, chlorine, bromine, or iodine), hydroxyl, and carboxyl, or $R^4$ and $R^5$ together form —O—CH$_2$—O—; and $R^6$ and $R^7$ are each independently hydrogen, hydroxyl, unsubstituted $C_1$ to $C_9$ alkoxy or $C_1$ to $C_9$ alkoxy substituted by at least one monovalent group selected from the group consisting of halogen (fluorine, chlorine, bromine, or iodine), hydroxyl, and carboxyl, or unsubstituted $C_7$ to $C_{20}$ arylalkyloxy or $C_7$ to $C_{20}$ arylalkyloxy substituted by at least one monovalent group selected from the group consisting of halogen (fluorine, chlorine, bromine, or iodine), hydroxyl, and carboxyl, or $R^6$ and $R^7$ together form —O—CH$_2$—O—;

except for the case where $R^{N1}$ is methyl, each of $R^1$, $R^2$, and $R^3$ is hydrogen, each of $R^4$ and $R^5$ is hydroxyl, and each of $R^6$ and $R^7$ is hydrogen; and when the groups are substituted, the substituents are each independently at least one monovalent group or divalent group selected from the group consisting of halogen (fluorine, chlorine, bromine, or iodine), cyano, nitro, hydroxyl, substituted or unsubstituted $C_1$ to $C_6$ alkyl, substituted or unsubstituted $C_2$ to $C_6$ alkenyl, substituted or unsubstituted $C_2$ to $C_6$ alkynyl, substituted or unsubstituted $C_3$ to $C_6$ cycloalkyl, substituted or unsubstituted $C_4$ to $C_6$ cycloalkenyl, substituted or unsubstituted $C_4$ to $C_6$ cycloalkynyl, substituted or unsubstituted 3-to 6-membered heterocycloalkyl, substituted or unsubstituted $C_7$ to $C_{11}$ cycloalkylalkyl, substituted or unsubstituted 3- to 6-membered heterocycloalkyl-$C_1$ to $C_6$ alkyl, substituted or unsubstituted $C_6$ to $C_{18}$ aryl, substituted or unsubstituted $C_7$ to $C_{20}$ arylalkyl, substituted or unsubstituted 5- to 15-membered heteroaryl, substituted or unsubstituted 5- to 15-membered heteroaryl-$C_1$ to $C_6$ alkyl, substituted or unsubstituted $C_1$ to $C_6$ alkoxy, substituted or unsubstituted $C_3$ to $C_6$ cycloalkoxy, substituted or unsubstituted 3- to 6-membered heterocycloalkoxy, substituted or unsubstituted $C_6$ to $C_{18}$ aryloxy, substituted or unsubstituted $C_7$ to $C_{20}$ arylalkyloxy, substituted or unsubstituted 5- to 15-membered heteroaryloxy, substituted or unsubstituted 5- to 15-membered heteroaryl-$C_1$ to $C_6$ alkyloxy, substituted or unsubstituted $C_1$ to $C_6$ alkoxycarbonyl, substituted or unsubstituted $C_3$ to $C_6$ cycloalkoxycarbonyl, substituted or unsubstituted $C_1$ to $C_{20}$ acyl, substituted or unsubstituted $C_1$ to $C_{20}$ acyloxy, substituted or unsubstituted amino, and oxo (C=O).

Further preferably, in the compound represented by the formula (I), $R^{N1}$ is methyl;

$R^1$ is hydrogen, or unsubstituted $C_1$ to $C_9$ alkoxy or $C_1$ to $C_9$ alkoxy substituted by at least one monovalent group selected from the group consisting of halogen (fluorine, chlorine, bromine, or iodine), hydroxyl, and carboxyl;

$R^2$ and $R^3$ are each independently hydrogen, hydroxyl, or unsubstituted $C_1$ to $C_9$ alkoxy or $C_1$ to $C_9$ alkoxy substituted by at least one monovalent group selected from the group consisting of halogen (fluorine, chlorine, bromine, or iodine), hydroxyl, and carboxyl, or $R^2$ and $R^3$ together form —O—CH$_2$—O—;

$R^4$ and $R^5$ are each independently hydrogen, hydroxyl, phenyl, methoxy, ethoxy, n-butyloxy, phenylmethoxy (i.e., benzyloxy), 2-phenylethoxy, 3-phenylpropyloxy, 4-phenylbutyloxy, 3,3-biphenylpropyloxy, 3-hydroxylpropyloxy, 3-chloropropyloxy, n-propyloxy, n-nonyloxy, or 4-trifluorobutyloxy; and $R^6$ and $R^7$ are each independently hydrogen or methoxy; except for the case where $R^{N1}$ is methyl, each of $R^1$, $R^2$, and $R^3$ is hydrogen, each of $R^4$ and $R^5$ is hydroxyl, and each of $R^6$ and $R^7$ is hydrogen.

Still further preferably, in the compound represented by the formula (I), $R^{N1}$ is methyl;

$R^1$ is hydrogen or methoxy;

both $R^2$ and $R^3$ are hydrogen, both $R^2$ and $R^3$ are methoxy, one of $R^2$ and $R^3$ is hydroxyl and the other is methoxy, or $R^2$ and $R^3$ together form —O—CH$_2$—O—;

both $R^4$ and $R^5$ are hydrogen or methoxy, one of $R^4$ and $R^5$ is hydrogen and the other is hydroxyl or methoxy, or one of $R^4$ and $R^5$ is hydroxyl and the other is phenyl, methoxy, ethoxy, n-butyloxy, phenylmethoxy (i.e., benzyloxy), 2-phenylethoxy, 3-phenylpropyloxy, 4-phenylbutyloxy, 3,3-biphenylpropyloxy, 3-hydroxylpropyloxy, 3-chloropropyloxy, n-propyloxy, n-nonyloxy, 4-trifluorobutyloxy, isopropyloxy, 2-methylpropyloxy, 1-methylpropyloxy, chloromethoxy, 2-chloroethoxy, 2-trifluoroethoxy, or 3-trifluoropropyloxy; and both $R^6$ and $R^7$ are hydrogen or methoxy, or one of $R^6$ and $R^7$ is hydrogen and the other is methoxy.

Alternatively, still further preferably, in the compound represented by the formula (I), $R^{N1}$ is methyl;

$R^1$ is hydrogen;

both $R^2$ and $R^3$ are hydrogen;

$R^4$ is hydroxyl;

$R^5$ is phenyl, ethoxy, n-butyloxy, phenylmethoxy (i.e., benzyloxy), 2-phenylethoxy, 3-phenylpropyloxy, 4-phenylbutyloxy, 3,3-biphenylpropyloxy, 3-hydroxylpropyloxy, 3-chloropropyloxy, n-propyloxy, n-nonyloxy, 4-trifluorobutyloxy, isopropyloxy, 2-methylpropyloxy, 1-methylpropyloxy, chloromethoxy, 2-chloroethoxy, 2-trifluoroethoxy, or 3-trifluoropropyloxy; and both $R^6$ and $R^7$ are hydrogen.

Particularly preferably, in the compound represented by the formula (I), $R^{N1}$ is methyl;

$R^1$ is hydrogen or methoxy;

both $R^2$ and $R^3$ are hydrogen, both $R^2$ and $R^3$ are methoxy, one of $R^2$ and $R^3$ is hydroxyl and the other is methoxy, or $R^2$ and $R^3$ together form —O—CH$_2$—O—;

both $R^4$ and $R^5$ are hydrogen or methoxy, one of $R^4$ and $R^5$ is hydrogen and the other is hydroxyl or methoxy, or one of $R^4$ and $R^5$ is hydroxyl and the other is phenyl, methoxy, ethoxy, n-butyloxy, phenylmethoxy (i.e., benzyloxy), 2-phenylethoxy, 3-phenylpropyloxy, 4-phenylbutyloxy, 3,3-biphenylpropyloxy, 3-hydroxylpropyloxy, 3-chloropropyloxy, n-propyloxy, n-nonyloxy, or 4-trifluorobutyloxy; and both $R^6$ and $R^7$ are hydrogen or methoxy, or one of $R^6$ and $R^7$ is hydrogen and the other is methoxy.

Alternatively, particularly preferably, in the compound represented by the formula (I), $R^{N1}$ is methyl;

$R^1$ is hydrogen;

both $R^2$ and $R^3$ are hydrogen;

$R^4$ is hydroxyl;

$R^5$ is phenyl, ethoxy, n-butyloxy, phenylmethoxy (i.e., benzyloxy), 2-phenylethoxy, 3-phenylpropyloxy, 4-phenylbutyloxy, 3,3-biphenylpropyloxy, 3-hydroxylpropyloxy, 3-chloropropyloxy, n-propyloxy, n-nonyloxy, or 4-trifluorobutyloxy; and both $R^6$ and $R^7$ are hydrogen.

More particularly preferably, in the compound represented by the formula (I), $R^{N1}$ is methyl, $R^1$ is hydrogen, $R^2$ and $R^3$ together form —O—CH$_2$—O—, both $R^4$ and $R^5$ are hydrogen, and both $R^6$ and $R^7$ are methoxy (compound D8);

$R^{N1}$ is methyl, $R^1$ is hydrogen, $R^2$ and $R^3$ together form —O—CH$_2$—O—, both $R^4$ and $R^5$ are hydrogen, $R^6$ is hydrogen, and $R^7$ is methoxy (compound D9);

$R^{N1}$ is methyl, $R^1$ is hydrogen, $R^2$ and $R^3$ together form —O—CH$_2$—O—, $R^4$ is hydroxyl, $R^5$ is hydrogen, $R^6$ is methoxy, and $R^7$ is hydrogen (compound D10);

$R^{N1}$ is methyl, $R^1$ is hydrogen, $R^2$ and $R^3$ together form —O—CH$_2$—O—, both $R^4$ and $R^5$ are hydrogen, and both $R^6$ and $R^7$ are hydrogen (compound D18);

$R^{N1}$ is methyl, $R^1$ is methoxy, $R^2$ and $R^3$ together form —O—CH$_2$—O—, $R^4$ is hydrogen, $R^5$ is methoxy, $R^6$ is methoxy, and $R^7$ is hydrogen (compound D20);

$R^{N1}$ is methyl, $R^1$ is hydrogen, $R^2$ is methoxy, $R^3$ is hydroxyl, both $R^4$ and $R^5$ are methoxy, and both $R^6$ and $R^7$ are hydrogen (compound D26);

$R^{N1}$ is methyl, $R^1$ is hydrogen, both $R^2$ and $R^3$ are hydrogen, $R^4$ is hydroxyl, $R^1$ is n-butyloxy, and both $R^6$ and $R^7$ are hydrogen (compound D36);

$R^{N1}$ is methyl, $R^1$ is hydrogen, both $R^2$ and $R^3$ are hydrogen, $R^4$ is hydroxyl, $R^1$ is 3-phenylpropyloxy, and both $R^6$ and $R^7$ are hydrogen (compound D37);

$R^{N1}$ is methyl, $R^1$ is hydrogen, both $R^2$ and $R^3$ are hydrogen, $R^4$ is hydroxyl, $R^1$ is 3-hydroxylpropyloxy, and both $R^6$ and $R^7$ are hydrogen (compound D38);

$R^{N1}$ is methyl, $R^1$ is hydrogen, both $R^2$ and $R^3$ are hydrogen, $R^4$ is hydroxyl, $R^1$ is 3-chloropropyloxy, and both $R^6$ and $R^7$ are hydrogen (compound D39);

$R^{N1}$ is methyl, $R^1$ is hydrogen, both $R^2$ and $R^3$ are hydrogen, $R^4$ is hydroxyl, $R^1$ is n-propyloxy, and both $R^6$ and $R^7$ are hydrogen (compound D40);

$R^{N1}$ is methyl, $R^1$ is hydrogen, both $R^2$ and $R^3$ are hydrogen, $R^4$ is hydroxyl, $R^1$ is n-nonyloxy, and both $R^6$ and $R^7$ are hydrogen (compound D41);

$R^{N1}$ is methyl, $R^1$ is hydrogen, both $R^2$ and $R^3$ are hydrogen, $R^4$ is hydroxyl, $R^1$ is 4-trifluorobutyloxy, and both $R^6$ and $R^7$ are hydrogen (compound D42);

$R^{N1}$ is methyl, $R^1$ is hydrogen, both $R^2$ and $R^3$ are methoxy, $R^4$ is hydroxyl, $R^1$ is methoxy, and both $R^6$ and $R^7$ are hydrogen (compound D43);

$R^{N1}$ is methyl, $R^1$ is hydrogen, both $R^2$ and $R^3$ are hydrogen, $R^4$ is hydroxyl, $R^1$ is phenyl, and both $R^6$ and $R^7$ are hydrogen (compound D45);

$R^{N1}$ is methyl, $R^1$ is hydrogen, both $R^2$ and $R^3$ are hydrogen, $R^4$ is hydroxyl, $R^5$ is phenylmethyloxy (i.e., benzyloxy), and both $R^6$ and $R^7$ are hydrogen (compound D47);

$R^{N1}$ is methyl, $R^1$ is hydrogen, both $R^2$ and $R^3$ are hydrogen, $R^4$ is hydroxyl, $R^5$ is 2-phenylethyloxy, and both $R^6$ and $R^7$ are hydrogen (compound D48);

$R^{N1}$ is methyl, $R^1$ is hydrogen, both $R^2$ and $R^3$ are hydrogen, $R^4$ is hydroxyl, $R^5$ is 4-phenylbutyloxy, and both $R^6$ and $R^7$ are hydrogen (compound D50);

$R^{N1}$ is methyl, $R^1$ is hydrogen, both $R^2$ and $R^3$ are hydrogen, $R^4$ is hydroxyl, $R^1$ is 3,3-biphenylpropyloxy, and both $R^6$ and $R^7$ are hydrogen (compound D54); or $R^{N1}$ is methyl, $R^1$ is hydrogen, both $R^2$ and $R^3$ are hydrogen, $R^4$ is hydroxyl, $R^5$ is ethyloxy, and both $R^6$ and $R^7$ are hydrogen (compound D55).

Still more particularly preferably, in the compound represented by the formula (I), $R^{N1}$ is methyl, $R^1$ is hydrogen, $R^2$ and $R^3$ together form —O—CH$_2$—O—, both $R^4$ and $R^5$ are hydrogen, and both $R^6$ and $R^7$ are methoxy (compound D8);

$R^{N1}$ is methyl, $R^1$ is hydrogen, both $R^2$ and $R^3$ are hydrogen, $R^4$ is hydroxyl, $R^5$ is n-butyloxy, and both $R^6$ and $R^7$ are hydrogen (compound D36);

$R^{N1}$ is methyl, $R^1$ is hydrogen, both $R^2$ and $R^3$ are hydrogen, $R^4$ is hydroxyl, $R^5$ is 3-phenylpropyloxy, and both $R^6$ and $R^7$ are hydrogen (compound D37);

$R^{N1}$ is methyl, $R^1$ is hydrogen, both $R^2$ and $R^3$ are hydrogen, $R^4$ is hydroxyl, $R^5$ is 3-hydroxylpropyloxy, and both $R^6$ and $R^7$ are hydrogen (compound D38);

$R^{N1}$ is methyl, $R^1$ is hydrogen, both $R^2$ and $R^3$ are hydrogen, $R^4$ is hydroxyl, $R^5$ is n-propyloxy, and both $R^6$ and $R^7$ are hydrogen (compound D40);

$R^{N1}$ is methyl, $R^1$ is hydrogen, both $R^2$ and $R^3$ are hydrogen, $R^4$ is hydroxyl, $R^5$ is 4-trifluorobutyloxy, and both $R^6$ and $R^7$ are hydrogen (compound D42);

$R^{N1}$ is methyl, $R^1$ is hydrogen, both $R^2$ and $R^3$ are hydrogen, $R^4$ is hydroxyl, $R^5$ is phenyl, and both $R^6$ and $R^7$ are hydrogen (compound D45);

$R^{N1}$ is methyl, $R^1$ is hydrogen, both $R^2$ and $R^3$ are hydrogen, $R^4$ is hydroxyl, $R^5$ is phenylmethoxy (i.e., benzyloxy), and both $R^6$ and $R^7$ are hydrogen (compound D47);

$R^{N1}$ is methyl, $R^1$ is hydrogen, both $R^2$ and $R^3$ are hydrogen, $R^4$ is hydroxyl, $R^5$ is 2-phenylethoxy, and both $R^6$ and $R^7$ are hydrogen (compound D48);

$R^{N1}$ is methyl, $R^1$ is hydrogen, both $R^2$ and $R^3$ are hydrogen, $R^4$ is hydroxyl, $R^5$ is 4-phenylbutyloxy, and both $R^6$ and $R^7$ are hydrogen (compound D50);

$R^{N1}$ is methyl, $R^1$ is hydrogen, both $R^2$ and $R^3$ are hydrogen, $R^4$ is hydroxyl, $R^5$ is 3,3-biphenylpropyloxy, and both $R^6$ and $R^7$ are hydrogen (compound D54); or $R^{N1}$ is methyl, $R^1$ is hydrogen, both $R^2$ and $R^3$ are hydrogen, $R^4$ is hydroxyl, $R^5$ is ethoxy, and both $R^6$ and $R^7$ are hydrogen (compound D55).

In one particular embodiment, the compound represented by the formula (I) encompasses a compound defined by an arbitrary combination of $R^{N1}$, $R^1$, $R^2$, $R^3$, $R^4$, $R^5$, $R^6$, and $R^7$ listed above except for the case where $R^{N1}$ is methyl, $R^1$ is hydrogen, both $R^2$ and $R^3$ are hydrogen, $R^4$ is hydroxyl, $R^5$ is methoxy, and both $R^6$ and $R^7$ are hydrogen.

When the compound represented by the formula (I) has the feature described above, this compound can exert a particularly high ferroptosis inhibitory effect.

The compound represented by the formula (I) serving as an active ingredient in the ferroptosis inhibitor of the present aspect encompasses not only the compound itself but a salt thereof. The salt of the compound represented by the formula (I) is not limited and is preferably, for example, a salt with a cation such as a sodium ion, a potassium ion, a calcium ion, a magnesium ion, or a substituted or unsubstituted ammonium ion, or a salt with an anion of an inorganic acid such as hydrochloric acid, hydrobromic acid, sulfuric acid, nitric acid, carbonic acid, or phosphoric acid, or an organic acid such as formic acid, acetic acid, maleic acid, fumaric acid, benzoic acid, ascorbic acid, succinic acid, bismethylenesalicylic acid, methanesulfonic acid, ethanedisulfonic acid, propionic acid, tartaric acid, salicylic acid, citric acid, gluconic acid, aspartic acid, stearic acid, palmitic acid, itaconic acid, glycolic acid, p-aminobenzoic acid, glutamic acid, benzenesulfonic acid, cyclohexylsulfamic acid, methanesulfonic acid, ethanesulfonic acid, isethionic acid, p-toluenesulfonic acid, or naphthalenesulfonic acid. The compound represented by the formula (I), even in the form of the salt described above, can exert a ferroptosis inhibitory effect.

The compound represented by the formula (I) serving as an active ingredient in the ferroptosis inhibitor of the present aspect encompasses not only the compound itself but a solvate of the compound or the salt thereof. A solvent capable of forming the solvate with the compound or the salt thereof is not limited and is preferably, for example, water or an organic solvent such as a lower alcohol (e.g., an alcohol having 1 to 6 carbon atoms, such as methanol, ethanol, or 2-propanol (isopropyl alcohol)), a higher alcohol (e.g., an alcohol having 7 or more carbon atoms, such as 1-heptanol or 1-octanol), dimethyl sulfoxide (DMSO), acetic acid, ethanolamine, or ethyl acetate. The compound represented by the formula (I) or the salt thereof, even in the form of the solvate with the solvent described above, can exert a ferroptosis inhibitory effect.

The compound represented by the formula (I) serving as an active ingredient in the ferroptosis inhibitor of the present aspect encompasses not only the compound itself but a protected form thereof. In the present specification, the "protected form" means a form in which a protective group is introduced in one or more functional groups (e.g., an amino group, a hydroxyl group, or a carboxylic acid group). In the present specification, the protected form of the compound represented by each formula is also referred to as a protected derivative of the compound represented by each formula. In the present specification, the "protective group" is a group that is introduced to a particular functional group in order to prevent the progression of undesirable reaction, and means a group that is quantitatively removed under particular reaction conditions and is substantially stable, i.e., reaction-inert, under other reaction conditions. The protective group capable of forming the protected form of the compound is not limited and is preferably, for example, t-butoxycarbonyl (Boc), 2-bromobenzyloxycarbonyl (BrZ), or 9-fluorenylmethoxycarbonyl (Fmoc) as a protective group for an amino group, silyl (e.g., t-butyldimethylsilyl (TBS), triisopropylsilyl (TIPS), or tert-butyldiphenylsilyl (TBDPS)) or alkoxy (e.g., methoxymethoxy (MOM) or methoxy (Me)) as a protective group for a hydroxyl group, and alkyl ester (e.g., methyl, ethyl, or isopropyl ester), arylalkyl ester (e.g., benzyl ester), or amide (e.g., amide with oxazolidinones) as a protective group for a carboxylic acid group. Protection with the protective group and deprotection can be appropriately carried by those skilled in the art on the basis of reaction conditions known in the art. The compound represented by the formula (I), even in the protected form with the protective group described above, may be able to be used without substantially reducing a ferroptosis inhibitory effect.

When the compound represented by the formula (I) serving as an active ingredient in the ferroptosis inhibitor of the present aspect has one or more tautomers, the compound also encompasses the forms of individual tautomers.

When the compound represented by the formula (I) serving as an active ingredient in the ferroptosis inhibitor of the present aspect has one or more stereocenters (chiral centers), the compound also encompasses individual enantiomers and diastereomers of the compound, and mixtures thereof such as racemates.

The compound represented by the formula (I) may be provided, for example, by purchasing a commercially available product, or may be provided by preparation per se on the basis of a literature known in the art.

By having the feature described above, the compound represented by the formula (I) serving as an active ingredient in the ferroptosis inhibitor of the present aspect can exert a ferroptosis inhibitory effect.

<2. Novel Compound>

The compound represented by the formula (I) serving as an active ingredient in the ferroptosis inhibitor according to one aspect of the present invention encompasses a novel compound. Hence, another aspect of the present invention relates to a compound represented by the formula (I-1):

[Formula 4]

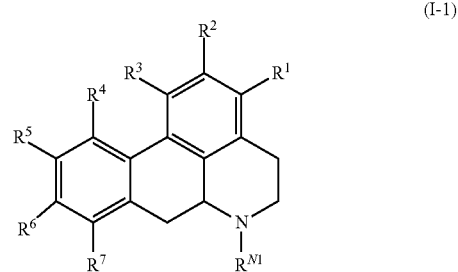

(I-1)

which is a novel compound or a salt thereof, or a solvate of the compound or the salt.

In the formula (I-1), $R^{N1}$ is methyl.
In the formula (I-1), $R^1$ is hydrogen.
In the formula (I-1), both $R^2$ and $R^3$ are hydrogen.
In the formula (I-1), $R^4$ is hydroxyl.
In the formula (I-1), $R^5$ is unsubstituted $C_1$ to $C_9$ alkoxy or $C_1$ to $C_9$ alkoxy substituted by at least one monovalent group selected from the group consisting of halogen (fluorine, chlorine, bromine, or iodine), hydroxyl, and carboxyl, or unsubstituted $C_7$ to $C_{20}$ arylalkyloxy or $C_7$ to $C_{20}$ arylalkyloxy substituted by at least one monovalent group selected from the group consisting of halogen (fluorine, chlorine, bromine, or iodine), hydroxyl, and carboxyl.

$R^5$ is preferably ethoxy, n-butyloxy, 2-phenylethoxy, 3-phenylpropyloxy, 4-phenylbutyloxy, 3,3-biphenylpropyloxy, 3-hydroxylpropyloxy, 3-chloropropyloxy, n-propyloxy, n-nonyloxy, or 4-trifluorobutyloxy.

In the formula (I-1), both $R^6$ and $R^7$ are hydrogen.

The compound represented by the formula (I-1) can encompass a compound defined by an arbitrary combination of $R^{N1}$, $R^1$, $R^2$, $R^3$, $R^4$, $R^5$, $R^6$, and $R^7$ listed above.

When $R^{N1}$, $R^1$, $R^2$, $R^3$, $R^4$, $R^5$, $R^6$, and $R^7$ are the groups listed above, the compound represented by the formula (I-1) can exert a high ferroptosis inhibitory effect.

Preferably, in the compound represented by the formula (I-1), $R^{N1}$ is methyl,
$R^1$ is hydrogen,
both $R^2$ and $R^3$ are hydrogen,
$R^4$ is hydroxyl,
$R^5$ is unsubstituted $C_1$ to $C_9$ alkoxy or $C_1$ to $C_9$ alkoxy substituted by at least one monovalent group selected from the group consisting of halogen (fluorine, chlorine, bromine, or iodine), hydroxyl, and carboxyl, or unsubstituted $C_7$ to $C_{20}$ arylalkyloxy or $C_7$ to $C_{20}$ arylalkyloxy substituted by at least one monovalent group selected from the group consisting of halogen (fluorine, chlorine, bromine, or iodine), hydroxyl, and carboxyl, and
both $R^6$ and $R^7$ are hydrogen.

More preferably, in the compound represented by the formula (I-1), $R^{N1}$ is methyl,
$R^1$ is hydrogen,
both $R^2$ and $R^3$ are hydrogen,
$R^4$ is hydroxyl,
$R^5$ is ethoxy, n-butyloxy, 2-phenylethoxy, 3-phenylpropyloxy, 4-phenylbutyloxy, 3,3-biphenylpropyloxy, 3-hydroxylpropyloxy, 3-chloropropyloxy, n-propyloxy, n-nonyloxy, or 4-trifluorobutyloxy, and
both $R^6$ and $R^7$ are hydrogen.

Still more particularly preferably, in the compound represented by the formula (I-1), $R^{N1}$ is methyl, $R^1$ is hydrogen, both $R^2$ and $R^3$ are hydrogen, $R^4$ is hydroxyl, $R^1$ is n-butyloxy, and both $R^6$ and $R^7$ are hydrogen (compound D36); or $R^{N1}$ is methyl, $R^1$ is hydrogen, both $R^2$ and $R^3$ are hydrogen, $R^4$ is hydroxyl, $R^1$ is 3-phenylpropyloxy, and both $R^6$ and $R^7$ are hydrogen (compound D37); or $R^{N1}$ is methyl, $R^1$ is hydrogen, both $R^2$ and $R^3$ are hydrogen, $R^4$ is hydroxyl, $R^1$ is 3-hydroxylpropyloxy, and both $R^6$ and $R^7$ are hydrogen (compound D38); or $R^{N1}$ is methyl, $R^1$ is hydrogen, both $R^2$ and $R^3$ are hydrogen, $R^4$ is hydroxyl, $R^1$ is 3-chloropropyloxy, and both $R^6$ and $R^7$ are hydrogen (compound D39); or $R^{N1}$ is methyl, $R^1$ is hydrogen, both $R^2$ and $R^3$ are hydrogen, $R^4$ is hydroxyl, $R^1$ is n-propyloxy, and both $R^6$ and $R^7$ are hydrogen (compound D40); or $R^{N1}$ is methyl, $R^1$ is hydrogen, both $R^2$ and $R^3$ are hydrogen, $R^4$ is hydroxyl, $R^1$ is n-nonyloxy, and both $R^6$ and $R^7$ are hydrogen (compound D41); or $R^{N1}$ is methyl, $R^1$ is hydrogen, both $R^2$ and $R^3$ are hydrogen, $R^4$ is hydroxyl, $R^1$ is 4-trifluorobutyloxy, and both $R^6$ and $R^7$ are hydrogen (compound D42); or $R^{N1}$ is methyl, $R^1$ is hydrogen, both $R^2$ and $R^3$ are hydrogen, $R^4$ is hydroxyl, $R^1$ is 2-phenylethyloxy, and both $R^6$ and $R^7$ are hydrogen (compound D48); or $R^{N1}$ is methyl, $R^1$ is hydrogen, both $R^2$ and $R^3$ are hydrogen, $R^4$ is hydroxyl, $R^1$ is 4-phenylbutyloxy, and both $R^6$ and $R^7$ are hydrogen (compound D50); or $R^{N1}$ is methyl, $R^1$ is hydrogen, both $R^2$ and $R^3$ are hydrogen, $R^4$ is hydroxyl, $R^5$ is 3,3-biphenylpropyloxy, and both $R^6$ and $R^7$ are hydrogen (compound D54); or $R^{N1}$ is methyl, $R^1$ is hydrogen, both $R^2$ and $R^3$ are hydrogen, $R^4$ is hydroxyl, $R^5$ is ethyloxy, and both $R^6$ and $R^7$ are hydrogen (compound D55).

When the compound represented by the formula (I-1) has the feature described above, this compound can exert a particularly high ferroptosis inhibitory effect.

The compound represented by the formula (I-1) encompasses not only the compound itself but a salt thereof. The salt of the compound represented by the formula (I-1) is not limited and is preferably, for example, various salts listed above as the salt of the compound represented by the formula (I). The compound represented by the formula (I-1), even in the form of the salt described above, can exert a ferroptosis inhibitory effect.

The compound represented by the formula (I-1) encompasses not only the compound itself but a solvate of the compound or the salt thereof. A solvent capable of forming the solvate with the compound or the salt thereof is not limited and is preferably, for example, various solvents listed above as the solvent capable of forming the solvate with the compound represented by the formula (I) or the salt thereof. The compound represented by the formula (I-1) or the salt thereof, even in the form of the solvate with the solvent described above, can exert a ferroptosis inhibitory effect.

The compound represented by the formula (I-1) encompasses not only the compound itself but a protected form thereof. The protective group capable of forming the protected form of the compound is not limited and is preferably, for example, various protective groups listed above as the protective group capable of forming the protected form of the compound represented by the formula (I). The compound represented by the formula (I-1), even in the protected form with the protective group described above, may be able to be used without substantially reducing a ferroptosis inhibitory effect.

When the compound represented by the formula (I-1) has one or more tautomers, the compound also encompasses the forms of individual tautomers.

When the compound represented by the formula (I-1) has one or more stereocenters (chiral centers), the compound also encompasses individual enantiomers and diastereomers of the compound, and mixtures thereof such as racemates.

By having the feature described above, the compound represented by the formula (I-1) of the present aspect can exert a ferroptosis inhibitory effect.

An alternative aspect of the present invention relates to a method for producing the compound represented by the formula (I-1). The method of the present aspect comprises a precursor provision step and a precursor linking step.

The precursor provision step comprises providing apomorphine and a compound represented by the formula (X):

$$R^5\text{-L} \qquad (X)$$

The apomorphine is a compound of the formula (I-1) wherein $R^{N1}$ is methyl, all of $R^1$, $R^2$, and $R^3$ are hydrogen, both $R^4$ and $R^5$ are hydroxyl, and both $R^6$ and $R^7$ are hydrogen. The apomorphine may be in the form of a salt or a solvate thereof. The apomorphine may be provided for example, by purchasing a commercially available product, or may be provided by preparation per se on the basis of a literature known in the art.

In the formula (X), $R^5$ is a group as defined in the formula (I-1).

In the formula (X), L is a leaving group. L is preferably halogen (fluorine, chlorine, bromine, or iodine).

The compound represented by the formula (X) may be provided for example, by purchasing a commercially available product, or may be provided by preparation per se on the basis of a literature known in the art.

The precursor linking step comprises linking the apomorphine and the compound represented by the formula (X) to form a compound represented by the formula (I-1).

The precursor linking step can be carried out by reacting the apomorphine and the compound represented by the formula (X) in the presence of abase. Through this reaction, the leaving group L is eliminated from the compound represented by the formula (X) so that a covalent bond is formed with an oxygen atom of a hydroxyl group of the apomorphine. Examples of the base for use in this step can include, but are not limited to, carbonates of alkali metals or alkaline earth metals (e.g., potassium carbonate). The reaction temperature of this step is usually in the range of 30 to 100° C., for example, in the range of 50 to 90° C. The reaction time of this step is usually in the range of overnight to several days, for example, in the range of 20 hours to 3 days.

The method of the present aspect may further comprise a purification step of purifying the compound represented by the formula (I-1) from the obtained product after the precursor linking step. Examples of the purification approach for use in the purification step can include extraction, filtration, centrifugation, adsorption, recrystallization, distillation, and various chromatography techniques.

The compound represented by the formula (I-1) capable of being used as an active ingredient in the ferroptosis inhibitor can be formed by carrying out the method of the present aspect.

<3. Medical Use>

The compound represented by the formula (I) serving as an active ingredient in the ferroptosis inhibitor according to one aspect of the present invention has a high ferroptosis inhibitory effect. Cell death related to mitochondrial dysfunction is mainly induced via ferroptosis. The compound represented by the formula (I), when administered to a subject having a symptom, a disease, or a disorder caused by mitochondrial dysfunction, is therefore capable of preventing or treating the symptom, the disease, or the disorder in the subject via the ferroptosis inhibitory effect. Hence, an alternative aspect of the present invention relates to a medicament or a pharmaceutical composition comprising, as an active ingredient, the ferroptosis inhibitor according to one aspect of the present invention, or the compound represented by the formula (I) or the pharmaceutically acceptable salt thereof, or the pharmaceutically acceptable solvate of the compound or the salt serving as an active ingredient in the ferroptosis inhibitor.

In each aspect of the present invention, the "ferroptosis inhibitory effect" means an effect of substantially inhibiting ferroptosis itself and/or various functions and/or activities caused by ferroptosis.

In each aspect of the present invention, the ferroptosis inhibitory effect of the compound represented by the formula (I) is not limited and can be determined, for example, by coadding a ferroptosis inducer known in the art and the compound to cells derived from a subject, and evaluating a suppressive effect on cell death induced by the ferroptosis inducer.

In each aspect of the present invention, the compound represented by the formula (I) can exert a ferroptosis inhibitory effect usually at 5 nM or higher or 100 nM or higher, for example, in the range of 5 to 5000 nM, particularly, in the range of 200 to 5000 nM.

In the case of applying the compound represented by the formula (I) to medical use, the compound represented by the formula (I) encompasses not only the compound itself but a pharmaceutically acceptable salt of the compound, and a pharmaceutically acceptable solvate of the compound or the salt. The pharmaceutically acceptable salt of the compound represented by the formula (I), or the pharmaceutically acceptable solvate of the compound or the salt is not limited and is preferably, for example, the salt or the solvate listed above. The compound represented by the formula (I) in the form of the pharmaceutically acceptable salt or the pharmaceutically acceptable solvate described above can be applied to desired medical use without substantially reducing a ferroptosis inhibitory effect.

In the case of applying the compound represented by the formula (I) to medical use, the compound represented by the formula (I) encompasses not only the compound itself but a prodrug form of the compound. In the present specification, the "prodrug" means a compound that is converted to a parent drug in vivo. Examples of the prodrug form of the compound can include, but are not limited to: in the presence of a hydroxyl group, ester of the hydroxyl group and arbitrary carboxylic acid, and amide of the hydroxyl group and arbitrary amine; and in the presence of an amino group, amide of the amino group and arbitrary carboxylic acid. The compound represented by the formula (I) in the prodrug form described above can improve pharmacokinetics at the time of administration of the prodrug form to a subject without substantially reducing the ferroptosis inhibitory effect of the parent drug compound represented by the formula (I).

In the case of applying the compound represented by the formula (I) to medical use, the compound may be used alone or may be used in combination with one or more pharmaceutically acceptable components. The medicament of the present aspect can be formulated into various dosage forms that are usually used in the technical field according to a desired administration method. Hence, the medicament of the present aspect can also be provided in the form of a pharmaceutical composition comprising the ferroptosis inhibitor according to one aspect of the present invention, or the compound represented by the formula (I) or the pharmaceutically acceptable salt thereof, or the pharmaceutically acceptable solvate of the compound or the salt serving as an active ingredient in the ferroptosis inhibitor, and one or more pharmaceutically acceptable carriers. The pharmaceutical composition of the present aspect may comprise, in addition to the components described above, for example, one or more pharmaceutically acceptable media (e.g., a solvent such as sterilized water or a solution such as physiological saline), an excipient, a binder, a vehicle, a solubilizer, an antiseptic, a stabilizer, a puffing agent, a lubricant, a surfactant, an emulsifier, an oily liquid (e.g., a plant oil), a suspending agent, a buffer, a soothing agent, an antioxidant, a sweetener, and a flavor.

The dosage form of the medicament of the present aspect comprising, as an active ingredient, the ferroptosis inhibitor according to one aspect of the present invention, or the compound represented by the formula (I) or the pharmaceutically acceptable salt thereof, or the pharmaceutically acceptable solvate of the compound or the salt serving as an active ingredient in the ferroptosis inhibitor is not particularly limited and may be a formulation for use in parenteral administration or may be a formulation for use in oral administration. The dosage form of the medicament of the present aspect may be a formulation in a unit dose form or may be a formulation in a plurality of dosage forms. Examples of the formulation for use in parenteral administration can include injections such as sterile solutions or suspensions with water or other pharmaceutically acceptable media. Examples of the component that can be mixed into an injection can include, but are not limited to, vehicles such as physiological saline and isotonic solutions containing glucose or other aids (e.g., D-sorbitol, D-mannitol, D-mannose, and sodium chloride), solubilizers such as alcohols (e.g., ethanol and benzyl alcohol), polyalcohols (e.g., propylene glycol and polyethylene glycol), and ester (e.g., benzyl benzoate), nonionic surfactants such as Polysorbate 80™ or polyoxyethylene hydrogenated castor oil, oily liquids such as sesame oil and soybean oil, buffers such as phosphate buffer solutions and sodium acetate buffer solutions, soothing agents such as benzalkonium chloride and procaine hydrochloride, stabilizers such as human serum albumin and polyethylene glycol, preservatives, and antioxidants. The prepared injection is usually packed into an appropriate vial (e.g., an ampule) and preserved in an appropriate environment until use.

Examples of the formulation for use in oral administration can include tablets, pills, powders, capsules, soft capsules, microcapsules, elixirs, solutions, syrups, slurries, and suspensions. The tablets may be prepared, if desired, in a dosage form of sugarcoated tablets provided with sugarcoating or soluble coating, gelatin-coated tablets, enteric coated tablets, orally disintegrating tablets (OD tablets), or film-coated tablets, or may be prepared in a dosage form of bilayered or multilayered tablets.

Examples of the component that can be mixed into tablets or capsules can include, but are not limited to: binders such as water, ethanol, propanol, simple syrups, glucose solutions, carboxymethylcellulose, shellac, methylcellulose, potassium phosphate, polyvinylpyrrolidone, gelatin, corn starch, tragacanth gum, and gum arabic; excipients such as crystalline cellulose, lactose, saccharose, sodium chloride, glucose, urea, starch, calcium carbonate, kaolin, and silicic acid; disintegrants such as dry starch, sodium alginate, agar powders, laminaran powders, sodium bicarbonate, calcium carbonate, polyoxyethylene sorbitan fatty acid ester, sodium lauryl sulfate, monoglyceride stearate, starch, and lactose; disintegration inhibitors such as saccharose, stearin cacao butter, and hydrogenated oils; absorption promoters such as quaternary ammonium salts and sodium lauryl sulfate; humectants such as glycerin and starch; adsorbents such as starch, lactose, kaolin, bentonite and colloidal silicic acid; lubricants such as purified talc, stearate (e.g., magnesium stearate), boric acid powders, and polyethylene glycol; sweeteners such as sucrose, lactose, and saccharine; and flavors such as peppermint, wintergreen oil, and cherry. The formulation in the form of capsules may further contain a liquid carrier such as an oil or a fat.

The medicament of the present aspect comprising, as an active ingredient, the ferroptosis inhibitor according to one aspect of the present invention, or the compound represented by the formula (I) or the pharmaceutically acceptable salt thereof, or the pharmaceutically acceptable solvate of the compound or the salt serving as an active ingredient in the ferroptosis inhibitor may be formulated as a depot formulation. In this case, the medicament of the present aspect in a dosage form of the depot formulation can be administered by, for example, subcutaneous or intramuscular implantation or intramuscular injection. By application to the depot formulation, the medicament of the present aspect can exert the ferroptosis inhibitory effect of the compound represented by the formula (I) in a sustained manner over a long period.

The medicament of the present aspect comprising, as an active ingredient, the ferroptosis inhibitor according to one aspect of the present invention, or the compound represented by the formula (I) or the pharmaceutically acceptable salt thereof, or the pharmaceutically acceptable solvate of the compound or the salt serving as an active ingredient in the ferroptosis inhibitor may be used in combination with one or more additional drugs useful as a medicament. Examples of the additional drugs for use in combination can include, but are not limited to, taurine, idebenone, and coenzyme $Q_{10}$. In this case, the medicament of the present aspect is in the form of a combination comprising the ferroptosis inhibitor according to one aspect of the present invention, or the compound represented by the formula (I) or the pharmaceutically acceptable salt thereof, or the pharmaceutically acceptable solvate of the compound or the salt serving as an active ingredient in the ferroptosis inhibitor, and the one or more additional drugs. The combination may be in the form of a pharmaceutical composition comprising the ferroptosis inhibitor according to one aspect of the present invention, or the compound represented by the formula (I) or the pharmaceutically acceptable salt thereof, or the pharmaceutically acceptable solvate of the compound or the salt serving as an active ingredient in the ferroptosis inhibitor, and the one or more additional drugs in combination, or may be in the form of a pharmaceutical composition comprising the ferroptosis inhibitor according to one aspect of the present invention, or the compound represented by the formula (I) or the pharmaceutically acceptable salt thereof, or the pharmaceutically acceptable solvate of the compound or the salt serving as an active ingredient in the ferroptosis inhibitor, the pharmaceutical composition being used in combination with the one or more additional drugs. The medicament of the present aspect in the form of the combination as described above may be provided in the form of a single formulation comprising the ferroptosis inhibitor according to one aspect of the present invention, or the compound represented by the formula (I) or the pharmaceutically acceptable salt thereof, or the pharmaceutically acceptable solvate of the compound or the salt serving as an active ingredient in the ferroptosis inhibitor, and the one or more additional drugs, or may be provided in the form of a pharmaceutical combination or kit comprising a plurality of formulations in which the ferroptosis inhibitor according to one aspect of the present invention, or the compound represented by the formula (I) or the pharmaceutically acceptable salt thereof, or the pharmaceutically acceptable solvate of the compound or the salt serving as an active ingredient in the ferroptosis inhibitor, and the one or more additional drugs are separately formulated. In the case of a pharmaceutical combination or kit, the individual formulations can be administered concurrently or separately (e.g., continuously).

The medicament of the present aspect comprising, as an active ingredient, the ferroptosis inhibitor according to one aspect of the present invention, or the compound represented by the formula (I) or the pharmaceutically acceptable salt thereof, or the pharmaceutically acceptable solvate of the compound or the salt serving as an active ingredient in the ferroptosis inhibitor can prevent or treat various symptoms, diseases, and/or disorders related to ferroptosis via a ferroptosis inhibitory effect. Examples of the symptom, the disease, and/or the disorder can include, but are not limited to, primary mitochondrial diseases, diseases caused by reductive stress, neurodegenerative diseases, metabolic diseases, and hepatic dysfunction which are related to ferroptosis. Examples of the symptom, the disease, and/or the disorder can include, but are not limited to, Leigh syndrome, a mitochondrial disease which is mitochondrial encephalopathy, lactic acidosis, and stroke-like episodes (MELAS) or Leber's disease, mitochondrial cardiomyopathy, mitochondrial hepatopathy, chronic progressive external ophthalmoplegia (CPEO), Parkinson's disease, Alzheimer's disease, Huntington's disease, amyotrophic lateral sclerosis, angina, myocardial infarction, acute heart failure, chronic heart failure, cardiomyopathy, diabetic cardiomyopathy, cardiomegaly, ischemia-reperfusion injury, hemorrhagic stroke, diabetes mellitus, cerebral infarction, kidney damage, acute renal failure, non-alcoholic steatohepatitis or liver damage, hepatic fibrosis, chronic obstructive pulmonary disease, urinary tract infection, polycystic kidney disease, sepsis-induced cardiac injury, and sepsis which are related to ferroptosis. The symptom, the disease, and/or the disorder is preferably one or more symptoms, diseases, or disorders selected from the group consisting of Leigh syndrome, a mitochondrial disease which is mitochondrial encephalopathy, lactic acidosis, and stroke-like episodes (MELAS) or Leber's disease, mitochondrial cardiomyopathy, mitochondrial hepatopathy, chronic progressive external ophthalmoplegia (CPEO), Parkinson's disease, Alzheimer's disease, Huntington's disease, amyotrophic lateral sclerosis, angina, myocardial infarction, acute heart failure, chronic heart failure, cardiomyopathy, diabetic cardiomyopathy, cardiomegaly, ischemia-reperfusion injury, hemorrhagic stroke, diabetes mellitus, cerebral infarction, kidney damage, acute renal failure, non-alcoholic steatohepatitis or liver damage, hepatic fibrosis, chronic obstructive pulmonary disease, urinary tract infection, polycystic kidney disease, sepsis-induced cardiac injury, and sepsis which are related to ferroptosis. The medicament of the present aspect is administered to a subject in need of prevention or treatment of the disease, the symptom, or the disorder related to ferroptosis and can thereby prevent or treat the disease, the symptom, or the disorder.

In each aspect of the present invention, the "symptom, disease, and/or disorder related to ferroptosis" means a symptom, a disease, and/or a disorder that is caused by ferroptosis itself and/or the inhibition of various functions and/or activities caused by ferroptosis. The relation of the symptom, the disease, and/or the disorder to ferroptosis can be identified, for example, but not limited to, by confirming increased or abnormal functional expression of ferroptosis in a subject having the symptom, the disease, and/or the disorder. The increased or abnormal functional expression of ferroptosis in a subject having the symptom, the disease, and/or the disorder related to ferroptosis can be evaluated, for example, but not limited to, on the basis of an index in which the ferroptosis inhibitor administered to the subject is capable of preventing cell death in the subject or is capable of changing the amount of lipid peroxides accumulated by ferroptosis in the subject.

The medicament of the present aspect comprising, as an active ingredient, the ferroptosis inhibitor according to one aspect of the present invention, or the compound represented by the formula (I) or the pharmaceutically acceptable salt thereof, or the pharmaceutically acceptable solvate of the compound or the salt serving as an active ingredient in the ferroptosis inhibitor can be applied to various subjects in need of prevention or treatment of the symptom, the disease, and/or the disorder related to ferroptosis. The subject is preferably a human or nonhuman mammal (e.g., a warm-blooded animal such as a pig, a dog, a bovine, a rat, a mouse, a guinea pig, a rabbit, a chicken, sheep, a cat, a monkey, a hamadryas, or a chimpanzee) test subject or patient. The medicament of the present aspect is administered to the subject and can thereby prevent or treat various symptoms, diseases, and/or disorders related to ferroptosis in the subject.

In the present specification, the "prevention" means to substantially deter or reduce the occurrence (development or manifestation) of a symptom, a disease, and/or a disorder. In the present specification, the "treatment" means to suppress (e.g., suppress progression), resolve, repair, and/or heal a symptom, a disease, and/or a disorder that has occurred (been developed or manifested).

The ferroptosis inhibitor according to one aspect of the present invention, and the compound represented by the formula (I) serving as an active ingredient in the ferroptosis inhibitor can be used in the prevention or treatment of the symptom, the disease, and/or the disorder related to ferroptosis described above in a subject having the symptom, the disease, and/or the disorder. Hence, the medicament of the present aspect is preferably a medicament for use in the prevention or treatment of the symptom, the disease, and/or the disorder related to ferroptosis described above, more preferably a medicament for use in the prevention or treatment of a primary mitochondrial disease, a disease caused by reductive stress, a neurodegenerative disease, a metabolic disease, or hepatic dysfunction, which is related to ferroptosis, further preferably a medicament for use in the prevention or treatment of one or more symptoms, diseases, and/or disorders selected from the group consisting of Leigh syndrome, a mitochondrial disease which is mitochondrial encephalopathy, lactic acidosis, and stroke-like episodes (MELAS) or Leber's disease, mitochondrial cardiomyopathy, mitochondrial hepatopathy, chronic progressive external ophthalmoplegia (CPEO), Parkinson's disease, Alzheimer's disease, Huntington's disease, amyotrophic lateral sclerosis, angina, myocardial infarction, acute heart failure, chronic heart failure, cardiomyopathy, diabetic cardiomyopathy, cardiomegaly, ischemia-reperfusion injury, hemorrhagic stroke, diabetes mellitus, cerebral infarction, kidney damage, acute renal failure, non-alcoholic steatohepatitis or liver damage, hepatic fibrosis, chronic obstructive pulmonary disease, urinary tract infection, polycystic kidney disease, sepsis-induced cardiac injury, and sepsis, which are related to ferroptosis. The medicament of the present aspect is used in the prevention or treatment of the symptom, the disease, and/or the disorder related to ferroptosis and can thereby prevent or treat the symptom, the disease, and/or the disorder related to ferroptosis via the ferroptosis inhibitory effect of the compound represented by the formula (I).

The ferroptosis inhibitor according to one aspect of the present invention, and the compound represented by the formula (I) serving as an active ingredient in the ferroptosis inhibitor can be used in the prevention or treatment of the symptom, the disease, and/or the disorder related to ferroptosis described above in a subject having the symptom, the disease, and/or the disorder. Hence, an alternative aspect of the present invention relates to a method for preventing or treating the symptom, the disease, and/or the disorder related to ferroptosis described above, comprising administering an effective amount of the ferroptosis inhibitor according to one aspect of the present invention, or the compound represented by the formula (I) or the pharmaceutically acceptable salt thereof, or the pharmaceutically acceptable solvate of the compound or the salt serving as an active ingredient in the ferroptosis inhibitor to a subject in need of prevention or treatment of the symptom, the disease, and/or the disorder. The symptom, the disease, and/or the disorder is preferably a primary mitochondrial disease, a disease caused by reductive stress, a neurodegenerative disease, a metabolic disease, or hepatic dysfunction, which is related to ferroptosis, more preferably one or more symptoms, diseases, and/or disorders selected from the group consisting of Leigh syndrome, a mitochondrial disease which is mitochondrial encephalopathy, lactic acidosis, and stroke-like episodes (MELAS) or Leber's disease, mitochondrial cardiomyopathy, mitochondrial hepatopathy, chronic progressive external ophthalmoplegia (CPEO), Parkinson's disease, Alzheimer's disease, Huntington's disease, amyotrophic lateral sclerosis, angina, myocardial infarction, acute heart failure, chronic heart failure, cardiomyopathy, diabetic cardiomyopathy, cardiomegaly, ischemia-reperfusion injury, hemorrhagic stroke, diabetes mellitus, cerebral infarction, kidney damage, acute renal failure, non-alcoholic steatohepatitis or liver damage, hepatic fibrosis, chronic obstructive pulmonary disease, urinary tract infection, polycystic kidney disease, sepsis-induced cardiac injury, and sepsis, which are related to ferroptosis. The ferroptosis inhibitor according to one aspect of the present invention, or the compound represented by the formula (I) serving as an active ingredient in the ferroptosis inhibitor is administered to a subject in need of prevention or treatment of the symptom, the disease, and/or the disorder related to ferroptosis and can thereby prevent or treat the symptom, the disease, and/or the disorder related to ferroptosis via the ferroptosis inhibitory effect of the compound represented by the formula (I).

An alternative aspect of the present invention relates to the ferroptosis inhibitor according to one aspect of the present invention, or the compound represented by the formula (I) or the pharmaceutically acceptable salt thereof, or the pharmaceutically acceptable solvate of the compound or the salt serving as an active ingredient in the ferroptosis inhibitor for use in the prevention or treatment of the symptom, the disease, and/or the disorder related to ferroptosis described above. An alternative aspect of the present invention relates to use of the ferroptosis inhibitor according to one aspect of the present invention, or the compound represented by the formula (I) or the pharmaceutically acceptable salt thereof, or the pharmaceutically acceptable solvate of the compound or the salt serving as an active ingredient in the ferroptosis inhibitor in the manufacture of a medicament for the prevention or treatment of the symptom, the disease, and/or the disorder related to ferroptosis described above. A further alternative aspect of the present invention relates to use of the ferroptosis inhibitor according to one aspect of the present invention, or the compound represented by the formula (I) or the pharmaceutically acceptable salt thereof, or the pharmaceutically acceptable solvate of the compound or the salt serving as an active ingredient in the ferroptosis inhibitor for the prevention or treatment of the symptom, the disease, and/or the disorder related to ferroptosis described above. The symptom, the disease, and/or the disorder is preferably a primary mitochondrial disease, a disease caused by reductive stress, a neurodegenerative disease, a metabolic disease, or hepatic dysfunction, which is related to ferroptosis, more preferably one or more symptoms, diseases, and/or disorders selected from the group consisting of Leigh syndrome, a mitochondrial disease which is mitochondrial encephalopathy, lactic acidosis, and stroke-like episodes (MELAS) or Leber's disease, mitochondrial cardiomyopathy, mitochondrial hepatopathy, chronic progressive external ophthalmoplegia (CPEO), Parkinson's disease, Alzheimer's disease, Huntington's disease, amyotrophic lateral sclerosis, angina, myocardial infarction, acute heart failure, chronic heart failure, cardiomyopathy, diabetic cardiomyopathy, cardiomegaly, ischemia-reperfusion injury, hemorrhagic stroke, diabetes mellitus, cerebral infarction, kidney damage, acute renal failure, non-alcoholic steatohepatitis or liver damage, hepatic fibrosis, chronic obstructive pulmonary disease, urinary tract infection, polycystic kidney disease, sepsis-induced cardiac injury, and sepsis, which are related to ferroptosis. The ferroptosis inhibitor according to one aspect of the present invention, or the compound represented by the formula (I) serving as an active ingredient in the ferroptosis inhibitor is used in the prevention or treatment of the symptom, the disease, and/or the disorder related to ferroptosis and can thereby prevent or treat the symptom, the disease, and/or the disorder related to ferroptosis via the ferroptosis inhibitory effect of the compound represented by the formula (I).

In the case of administering the medicament of the present aspect comprising, as an active ingredient, the ferroptosis inhibitor according to one aspect of the present invention, or the compound represented by the formula (I) or the pharmaceutically acceptable salt thereof, or the pharmaceutically acceptable solvate of the compound or the salt serving as an active ingredient in the ferroptosis inhibitor to a subject, particularly, a human patient, an accurate dosage and administration (e.g., a dose, the number of doses, and/or an administration route) should be finally determined by a doctor in attendance in light of many factors such as the age and sex of a subject, an accurate state (e.g., severity) of a symptom, a disease, and/or a disorder to be prevented or treated, and an administration route and in consideration of a therapeutically effective dose, number of doses, and administration route, etc. Hence, in the medicament of the present aspect, the ferroptosis inhibitor according to one aspect of the present invention, or the compound represented by the formula (I) serving as an active ingredient in the ferroptosis inhibitor is administered at a therapeutically effective amount and number of doses to a subject. In the case of administering the medicament of the present aspect to, for example, a human patient, the dose of the compound represented by the formula (I) is usually in the range of 0.001 to 100 mg/kg body weight per dose, typically in the range of 0.001 to 100 mg/kg body weight per dose, typically 0.01 to 10 mg/kg body weight per dose, particularly in the range of 0.1 to 10 mg/kg body weight per dose. The number of doses of the medicament of the present aspect can be set to, for example, once or more times (e.g., twice or three times) a day or once per several days. The administration route of the medicament of the present aspect is not particularly limited, and the medicament of the present aspect may be orally administered or parenterally (e.g., percutaneously, intrarectally, transmucosally, intestinally, intramuscularly, subcutaneously, into the bone marrow, intrathecally, directly intraventricularly, intravenously, intravitreally, intraperitoneally, intranasally, or intraocularly) administered at a single dose or a plurality of doses. The medicament of the present aspect is used in the dosage and administration described above and can thereby prevent or treat the symptom, the disease, and/or the disorder related to ferroptosis via the ferroptosis inhibitory effect of the compound represented by the formula (I).

EXAMPLES

Hereinafter, the present invention will be described further specifically with reference to Examples. However, the technical scope of the present invention is not limited by these Examples.

<Test I: Test on Suppression of Cell Death Induced by Ferroptosis Inducer Addition>

In mitochondrial dysfunction, for example, impaired ATP production and/or increased oxidative stress occurs, thereby causing cell death. Hence, individuals having mitochondrial dysfunction are reportedly vulnerable to oxidative stress as compared with normal individuals (Shrader W D et al., Bioorg Med Chem Lett., Jun. 15, 2011, Vol. 21 (12), p. 3693-8., doi:10.1016/j.bmcl.2011.04.085., e-published on Apr. 24, 2011, PubMed PMID: 21600768). Apoptosis, necrosis, and ferroptosis are known as cell death related to oxidative stress. However, it has not been clear which mechanism of manifestation described above causes cell death in individuals having mitochondrial dysfunction. Accordingly, a mechanism of action of cell death was examined with cell death induced by addition of a drug as an index using skin fibroblasts of patients having a mitochondrial disease.

In this test and tests described below, the skin fibroblasts used were established from each of patients having Leigh syndrome ascribable to a nuclear gene mutation, Leigh syndrome ascribable to a mitochondrial gene mutation, MELAS, mitochondrial cardiomyopathy, mitochondrial hepatopathy, or Kearns-Sayre syndrome (hereinafter, also referred to as "KSS"). All the gene mutations in the patients having Leigh syndrome are mutations that cause reduction in the activity of respiratory chain complex I. The normal cells used as a control were normal skin fibroblasts purchased from PromoCell GmbH. Samples were approved by the ethics committee of the Jichi Medical University Hospital, and informed consent was obtained from all of patients' families.

A ferroptosis inducer known in the art and a ferroptosis inhibitor, an apoptosis inhibitor, or a necrosis inhibitor known in the art were coadded to the skin fibroblasts and evaluated for a suppressive effect on cell death induced by the drug. The skin fibroblasts (within 15 passages) to be used in the test were inoculated at a concentration of 5,000 cells/well and 80 μL of a medium/well to a 96-well plate for cell culture and cultured for 24 hours in a carbon dioxide incubator (37° C., 5% $CO_2$). The maintenance medium used was a medium containing DMEM low glucose (1 g/L), 10% fetal bovine serum (FBS), and 1% penicillin-streptomycin (PS), and the medium for the test used was a medium containing DMEM low glucose (1 g/L) and 10% FBS. After the culture for 24 hours, the ferroptosis inducer (final concentration: 50 or 100 nM) and the ferroptosis inhibitor, the apoptosis inhibitor, or the necrosis inhibitor (final concentration: 1 μM) known in the art were coadded to the cells in each well, and cell viability was measured 48 hours after addition. The cell viability measurement was performed by using Cell Count Reagent SF (Nacalai Tesque, Inc.) and measuring the absorbance of formed formazan. The ferroptosis inducer used was L-buthionine-(S,R)-sulfoximine (BSO) or RSL-3. The ferroptosis inhibitor used was ferrostatin-1 (Fer-1), liproxstatin (Lip-1), or deferoxamine (DFO). The apoptosis inhibitor used was v-VAD. The necrosis inhibitor used was GSK872. Apomorphine (Apo) and idebenone (Ide) approved as a therapeutic drug for Leber's hereditary optic neuropathy in the Europe were used as drugs compared with these inhibitors.

The ferroptosis inducer BSO and various ferroptosis inhibitors were coadded to normal cells (Promo1 cells) or Leigh syndrome patient cells ($LS^{ND3}$) and evaluated for a suppressive effect on cell death induced by BSO. The results are shown in FIG. 1. In the drawing, A depicts the results about normal cells (Promo1 cells), and B depicts the results about Leigh syndrome patient cells ($LS^{ND3}$). In the drawing, the abscissa depicts test compounds, and the ordinate depicts the cell viability (%) of each treated plot when the number of live cells in a control non-supplemented with BSO is defined as 100%. The values in the drawing represent mean±standard deviation. In relation to the test compounds, "Control" represents a control non-supplemented with BSO, "BSO" represents a control supplemented with 100 μM BSO and non-supplemented with the test compounds, and "BSO+Apo", "BSO+Lip-1", "BSO +Fer-1", and "BSO+DFO" represent the coaddition of BSO and the respective ferroptosis inhibitors.

TABLE 1

| Cell ID | Disease | Age | Gene mutation | Protein | Mutation rate (%) |
|---|---|---|---|---|---|
| KCMC10 | Leigh syndrome | 0 | m.10158T > C, p(S34P) | ND3 | 90 |
| ME54 | Leigh syndrome | 5 | c.55C > T, p(P19S) | NDUFA1 | (100%) |
| ME110 | MELAS | 14 | m.3243A > G | tRNA-Leu | 21 |
| ME169 | MELAS | 23 | m.5541C > T | tRNA-Trp | 49 |
| ME250-1 | Mitochondrial cardiomyopathy | 0 | m.13513G > A, p(D393N) | ND5 | 79 |
| ME263-1 | Mitochondrial hepatopathy | 0 | (Diagnosed from reduced ATP production and biochemical and clinical symptoms) | | |
| ME130-1 | KSS | 6 | (Diagnosed from MRI image and biochemical and clinical symptoms) | | |
| Promo1 | Normal (control) | — | — | — | — |

Figure 2:
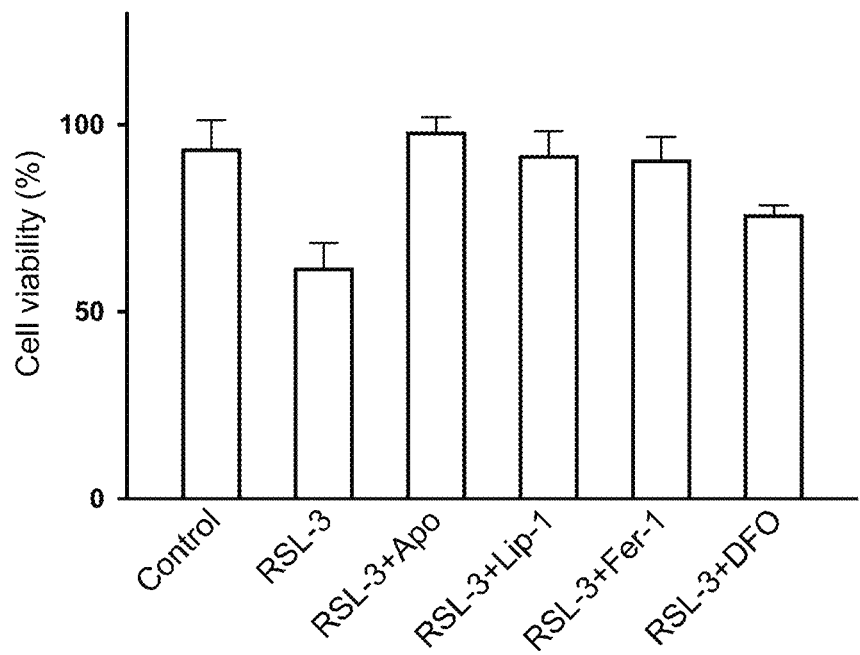
FIG. 2 is a graph showing results of Test I in which a ferroptosis inducer RSL-3 and various ferroptosis inhibitors were coadded to normal cells (Promo1 cells) or Leigh syndrome patient cells ($LS^{ND3}$) and evaluated for a suppressive effect on cell death induced by RSL-3. In the drawing, A depicts the results about normal cells (Promo1 cells), and B depicts the results about Leigh syndrome patient cells ($LS^{ND3}$). In the drawing, the abscissa depicts test compounds, and the ordinate depicts the cell viability (%) of each treated plot when the number of live cells in a control non-supplemented with RSL-3 is defined as 100%. The values in the drawing represent mean±standard deviation.
Figure 2:
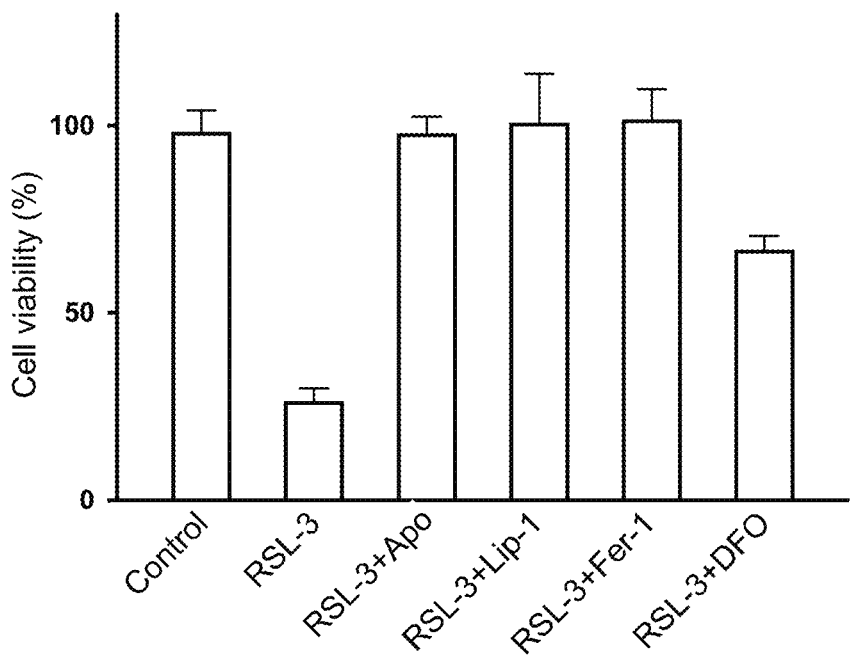

The ferroptosis inducer RSL-3 and various ferroptosis inhibitors were coadded to normal cells (Promo1 cells) or Leigh syndrome patient cells ($LS^{ND3}$) and evaluated for a suppressive effect on cell death induced by RSL-3. The results are shown in FIG. 2. In the drawing, A depicts the results about normal cells (Promo1 cells), and B depicts the results about Leigh syndrome patient cells ($LS^{ND3}$). In the drawing, the abscissa depicts test compounds, and the ordinate depicts the cell viability (%) of each treated plot when the number of live cells in a control non-supplemented with RSL-3 is defined as 100%. The values in the drawing represent mean±standard deviation. In relation to the test compounds, "Control" represents a control non-supplemented with RSL-3, "RSL-3" represents a control supplemented with 50 nM RSL-3 and non-supplemented with the test compounds, and "RSL-3+Apo", "RSL-3+Lip-1", "RSL-3+Fer-1", and "RSL-3+DFO" represent the coaddition of 50 nM RSL-3 and the respective ferroptosis inhibitors.

As shown in FIG. 1A, in the normal cells (Promo1 cells), cell death was not caused by the single addition or coaddition of any of the test compounds. By contrast, as shown in FIG. 1B, in the Leigh syndrome patient cells ($LS^{ND3}$), cell death was induced by the addition of BSO whereas this cell death was suppressed by the coaddition of BSO and Apo, Lip-1, Fer-1, or DFO. As shown in FIG. 2, the same or similar results in the case of using BSO were confirmed in the case of using RSL-3.

Figure 3:
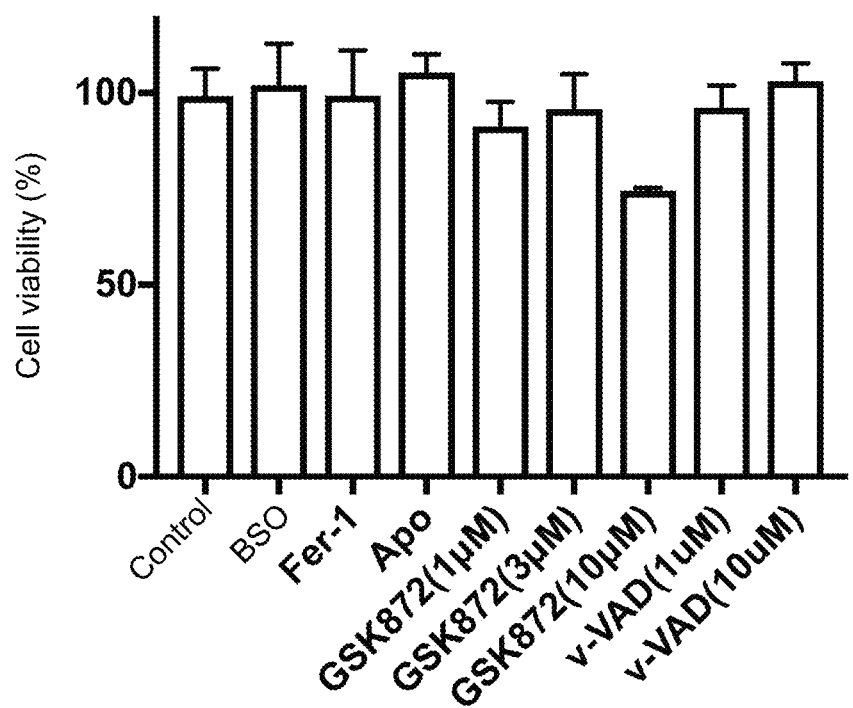
FIG. 3 is a graph showing results of Test I in which a ferroptosis inducer BSO and an apoptosis inhibitor (v-VAD) or a necrosis inhibitor (GSK872) were coadded to normal cells (Promo1 cells) or Leigh syndrome patient cells ($LS^{ND3}$) and evaluated for a suppressive effect on cell death induced by BSO. In the drawing, A depicts the results about normal cells (Promo1 cells), and B depicts the results about Leigh syndrome patient cells ($LS^{ND3}$). In the drawing, the abscissa depicts test compounds, and the ordinate depicts the cell viability (%) of each treated plot when the number of live cells in a control non-supplemented with BSO is defined as 100%. The values in the drawing represent mean±standard deviation.
Figure 3:
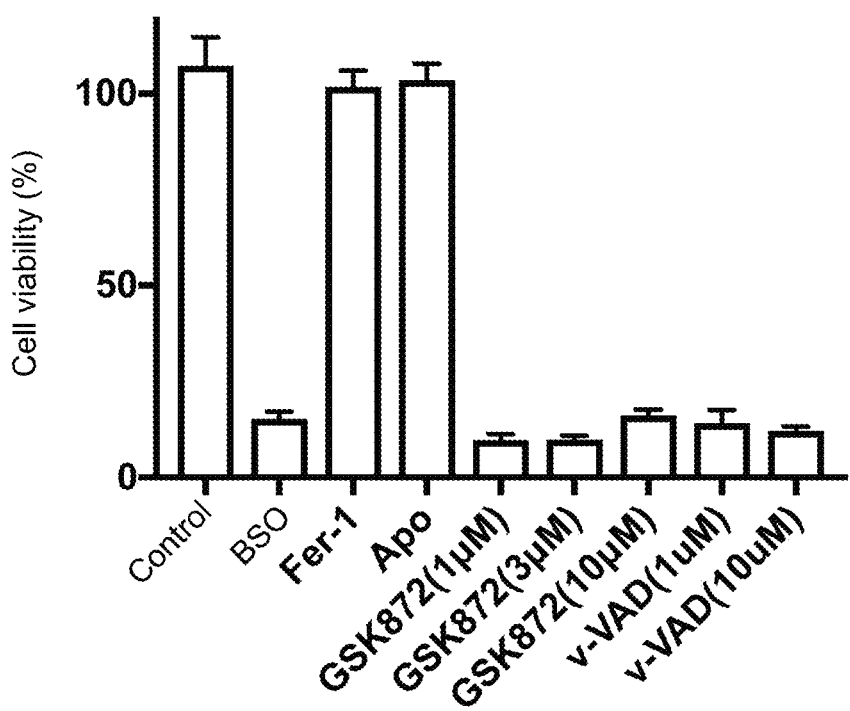

The ferroptosis inducer BSO and the apoptosis inhibitor (v-VAD) or the necrosis inhibitor (GSK872) were coadded to normal cells (Promo1 cells) or Leigh syndrome patient cells ($LS^{ND3}$) and evaluated for a suppressive effect on cell death induced by BSO. The results are shown in FIG. 3. In the drawing, A depicts the results about normal cells (Promo1 cells), and B depicts the results about Leigh syndrome patient cells ($LS^{ND3}$). In the drawing, the abscissa depicts test compounds, and the ordinate depicts the cell viability (%) of each treated plot when the number of live cells in a control non-supplemented with BSO is defined as 100%. The values in the drawing represent mean±standard deviation. In relation to the test compounds, "Control" represents a control non-supplemented with BSO, "BSO" represents a control supplemented with 100 μM BSO and non-supplemented with the test compounds, and "Fer-1" and "Apo" represent controls that underwent the coaddition of BSO and the respective ferroptosis inhibitors, "GSK872 (1 μM)", "GSK872 (3 μM)", and "GSK872 (10 μM)" represent the coaddition of BSO and the necrosis inhibitor (GSK872), and "v-VAD (1 μM)" and "v-VAD (10 μM)" represent the coaddition of BSO and the apoptosis inhibitor (v-VAD).

Figure 4:
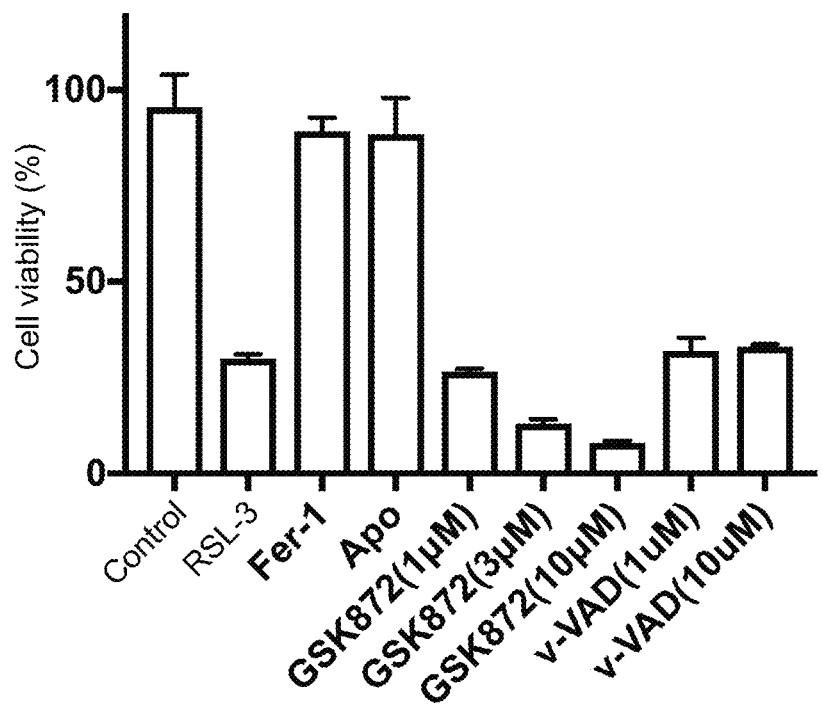
FIG. 4 is a graph showing results of Test I in which a ferroptosis inducer RSL-3 and an apoptosis inhibitor (v-VAD) or a necrosis inhibitor (GSK872) were coadded to normal cells (Promo1 cells) or Leigh syndrome patient cells ($LS^{ND3}$) and evaluated for a suppressive effect on cell death induced by RSL-3. In the drawing, A depicts the results about normal cells (Promo1 cells), and B depicts the results about Leigh syndrome patient cells ($LS^{ND3}$). In the drawing, the abscissa depicts test compounds, and the ordinate depicts the cell viability (%) of each treated plot when the number of live cells in a control non-supplemented with RSL-3 is defined as 100%. The values in the drawing represent mean±standard deviation.
Figure 4:
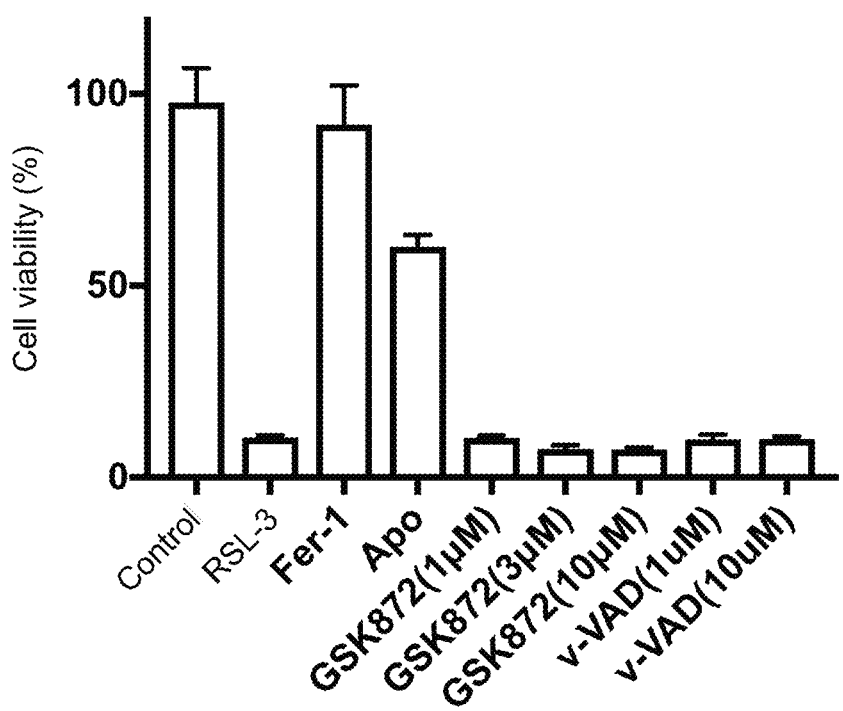

The ferroptosis inducer RSL-3 and the apoptosis inhibitor (v-VAD) or the necrosis inhibitor (GSK872) were coadded to normal cells (Promo1 cells) or Leigh syndrome patient cells ($LS^{ND3}$) and evaluated for a suppressive effect on cell death induced by RSL-3. The results are shown in FIG. 4. In the drawing, A depicts the results about normal cells (Promo1 cells), and B depicts the results about Leigh syndrome patient cells ($LS^{ND3}$). In the drawing, the abscissa depicts test compounds, and the ordinate depicts the cell viability (%) of each treated plot when the number of live cells in a control non-supplemented with RSL-3 is defined as 100%. The values in the drawing represent mean±standard deviation. In relation to the test compounds, "Control" represents a control non-supplemented with RSL-3, "RSL-3" represents a control supplemented with 50 nM RSL-3 and non-supplemented with the test compounds, and "Fer-1" and "Apo" represent controls that underwent the coaddition of RSL-3 and the respective ferroptosis inhibitors, "GSK872 (1 μM)", "GSK872 (3 μM)", and "GSK872 (10 μM)" represent the coaddition of RSL-3 and the necrosis inhibitor (GSK872), and "v-VAD (1 μM)" and "v-VAD (10 μM)" represent the coaddition of RSL-3 and the apoptosis inhibitor (v-VAD).

As shown in FIG. 3A, in the normal cells (Promo1 cells), cell death was not caused by the single addition or coaddition of any of the test compounds. By contrast, as shown in FIG. 3B, in the Leigh syndrome patient cells ($LS^{ND3}$), cell death was induced by the addition of BSO, and this cell death was suppressed by the coaddition of BSO and Fer-1 or Apo whereas this cell death was not suppressed by the coaddition of BSO and GSK872 or v-VAD.

In the case of using RSL-3, as shown in FIG. 4A, even in the normal cells (Promo1 cells), cell death was induced by the single addition of RSL-3, and cell death was similarly induced by the coaddition of RSL-3 and GSK872 or v-VAD. This cell death was suppressed by the coaddition of RSL-3 and Fer-1 or Apo. By contrast, as shown in FIG. 4B, in the Leigh syndrome patient cells ($LS^{ND3}$), the same or similar tendency as above was more strongly confirmed.

These results revealed that: cell death in an individual having mitochondrial dysfunction is mainly induced via ferroptosis; and apomorphine has a ferroptosis inhibitory effect.

Figure 5:
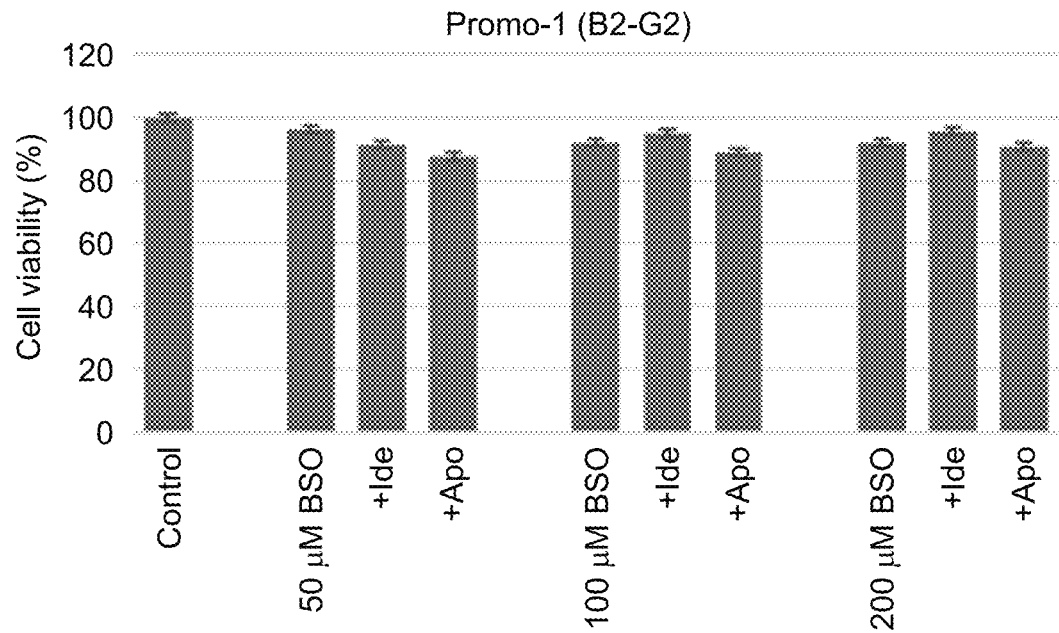
FIG. 5 is a graph showing results of Test I in which a ferroptosis inducer BSO and apomorphine or idebenone were coadded to normal cells (Promo1 cells) or mitochondrial cardiomyopathy patient cells (ME250-1) and evaluated for a suppressive effect on cell death induced by BSO. In the drawing, A depicts the results about normal cells (Promo1 cells), and B depicts the results about mitochondrial cardiomyopathy patient cells (ME250-1). In the drawing, the abscissa depicts test compounds, and the ordinate depicts the cell viability (%) of each treated plot when the number of live cells in a control non-supplemented with BSO is defined as 100%. The values in the drawing represent mean±standard deviation.
Figure 5:
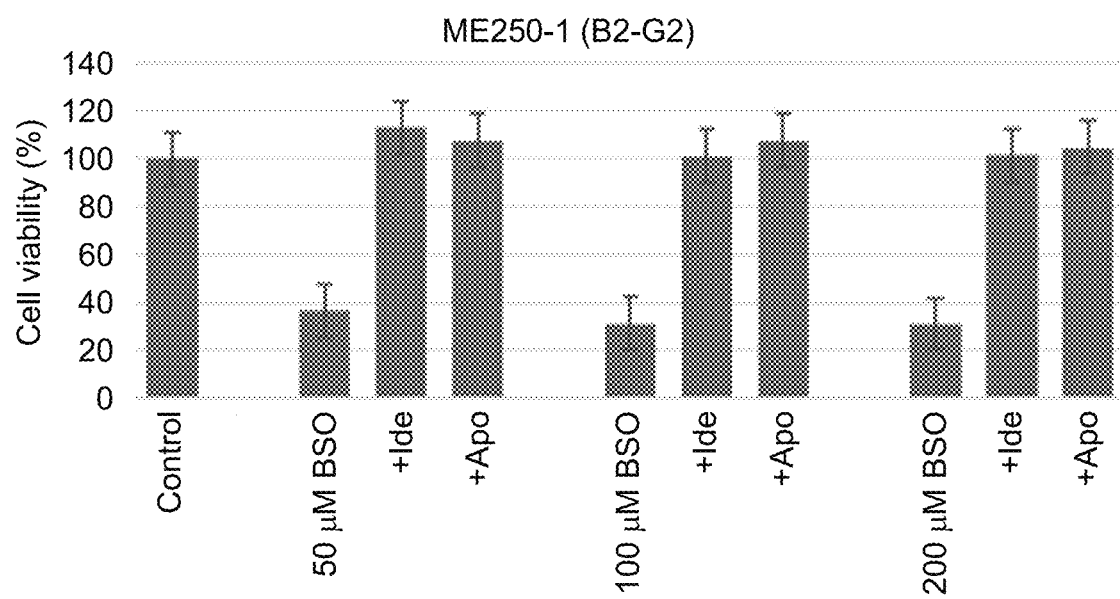

The ferroptosis inducer BSO and apomorphine or idebenone were coadded to normal cells (Promo1 cells) or mitochondrial cardiomyopathy patient cells (ME250-1) and evaluated for a suppressive effect on cell death induced by BSO. The results are shown in FIG. 5. In the drawing, A depicts the results about normal cells (Promo1 cells), and B depicts the results about mitochondrial cardiomyopathy patient cells (ME250-1). In the drawing, the abscissa depicts test compounds, and the ordinate depicts the cell viability (%) of each treated plot when the number of live cells in a control non-supplemented with BSO is defined as 100%. The values in the drawing represent mean±standard deviation. In relation to the test compounds, "Control" represents a control non-supplemented with BSO, "50 μM BSO", "100 μM BSO", and "200 μM BSO" represent controls supplemented with the respective predetermined concentrations of BSO and non-supplemented with the test compounds, and "+Ide" and "+Apo" represent the coaddition of the respective predetermined concentrations of BSO and the respective drugs.

Figure 6:
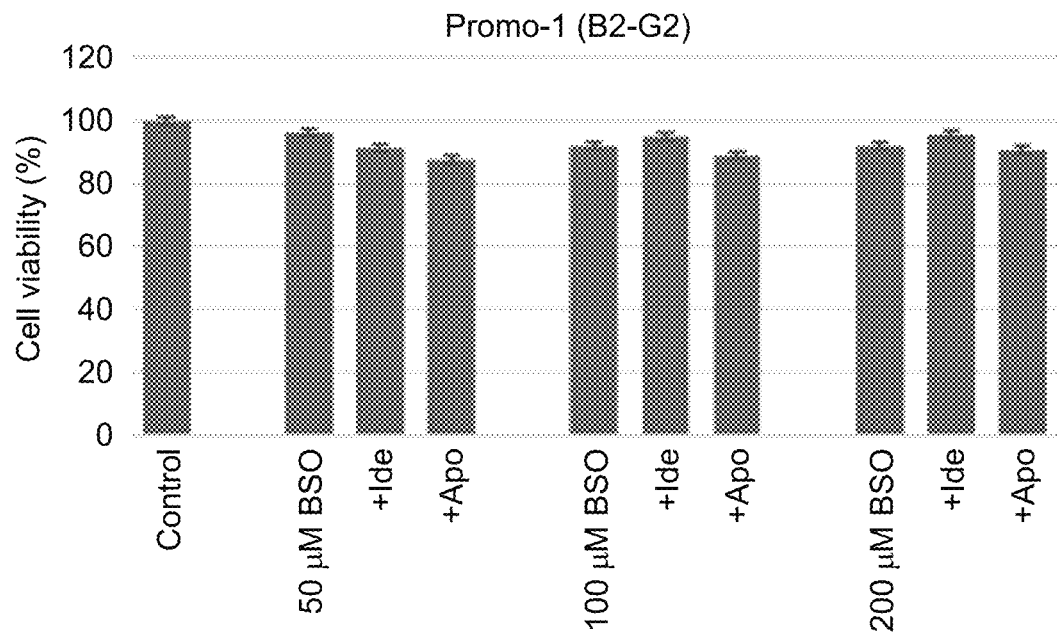
FIG. 6 is a graph showing results of Test I in which a ferroptosis inducer BSO and apomorphine or idebenone were coadded to normal cells (Promo1 cells) or mitochondrial hepatopathy patient cells (ME263-1) and evaluated for a suppressive effect on cell death induced by BSO. In the drawing, A depicts the results about normal cells (Promo1 cells), and B depicts the results about mitochondrial hepatopathy patient cells (ME263-1). In the drawing, the abscissa depicts test compounds, and the ordinate depicts the cell viability (%) of each treated plot when the number of live cells in a control non-supplemented with BSO is defined as 100%. The values in the drawing represent mean±standard deviation.
Figure 6:
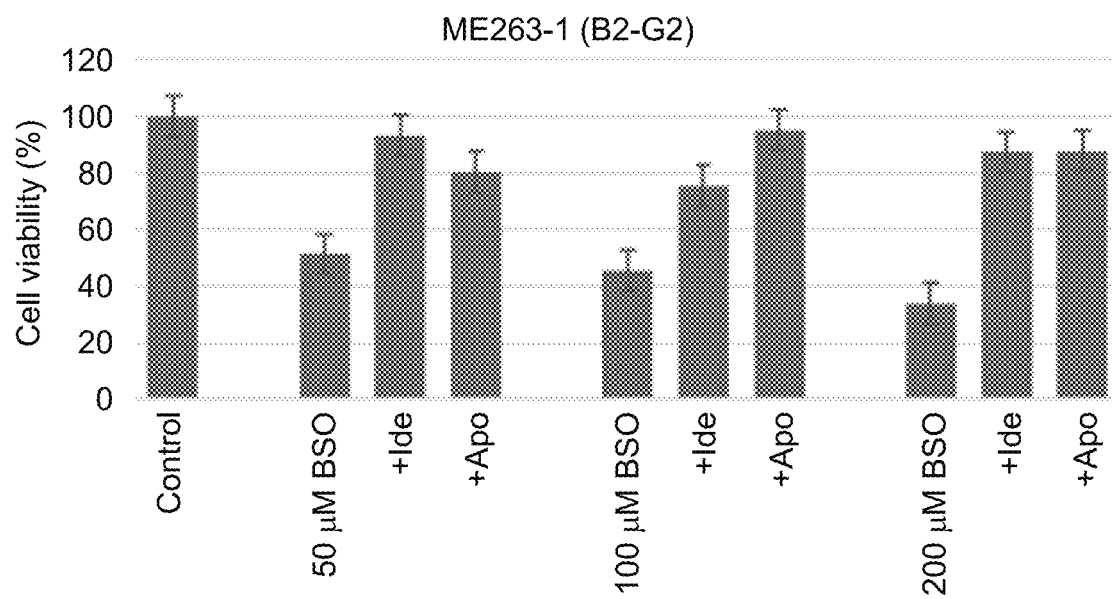

The ferroptosis inducer BSO and apomorphine or idebenone were coadded to normal cells (Promo1 cells) or mitochondrial hepatopathy patient cells (ME263-1) and evaluated for a suppressive effect on cell death induced by BSO. The results are shown in FIG. 6. In the drawing, A depicts the results about normal cells (Promo1 cells), and B depicts the results about mitochondrial hepatopathy patient cells (ME263-1). In the drawing, the abscissa depicts test compounds, and the ordinate depicts the cell viability (%) of each treated plot when the number of live cells in a control non-supplemented with BSO is defined as 100%. The values in the drawing represent mean±standard deviation. In relation to the test compounds, "Control" represents a control non-supplemented with BSO, "50 μM BSO", "100 μM BSO", and "200 μM BSO" represent controls supplemented with the respective predetermined concentrations of BSO and non-supplemented with the test compounds, and "+Ide" and "+Apo" represent the coaddition of the respective predetermined concentrations of BSO and the respective drugs.

Figure 7:
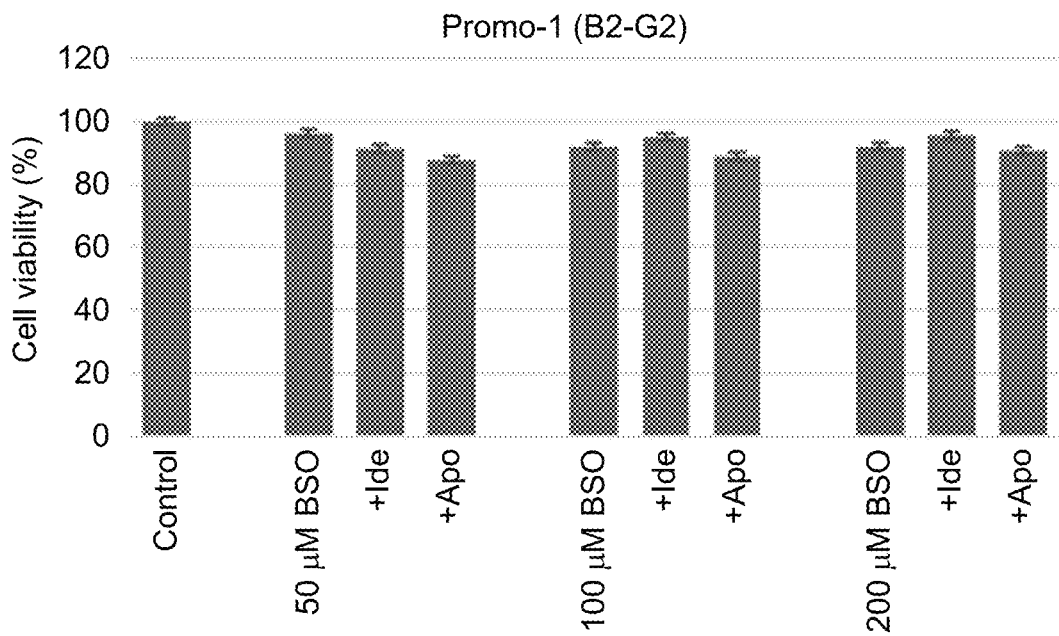
FIG. 7 is a graph showing results of Test I in which a ferroptosis inducer BSO and apomorphine or idebenone were coadded to normal cells (Promo1 cells) or Kearns-Sayre syndrome (KSS) patient cells (ME130-1) and evaluated for a suppressive effect on cell death induced by BSO. In the drawing, A depicts the results about normal cells (Promo1 cells), and B depicts the results about KSS patient cells (ME130-1). In the drawing, the abscissa depicts test compounds, and the ordinate depicts the cell viability (%) of each treated plot when the number of live cells in a control non-supplemented with BSO is defined as 100%. The values in the drawing represent mean±standard deviation.
Figure 7:
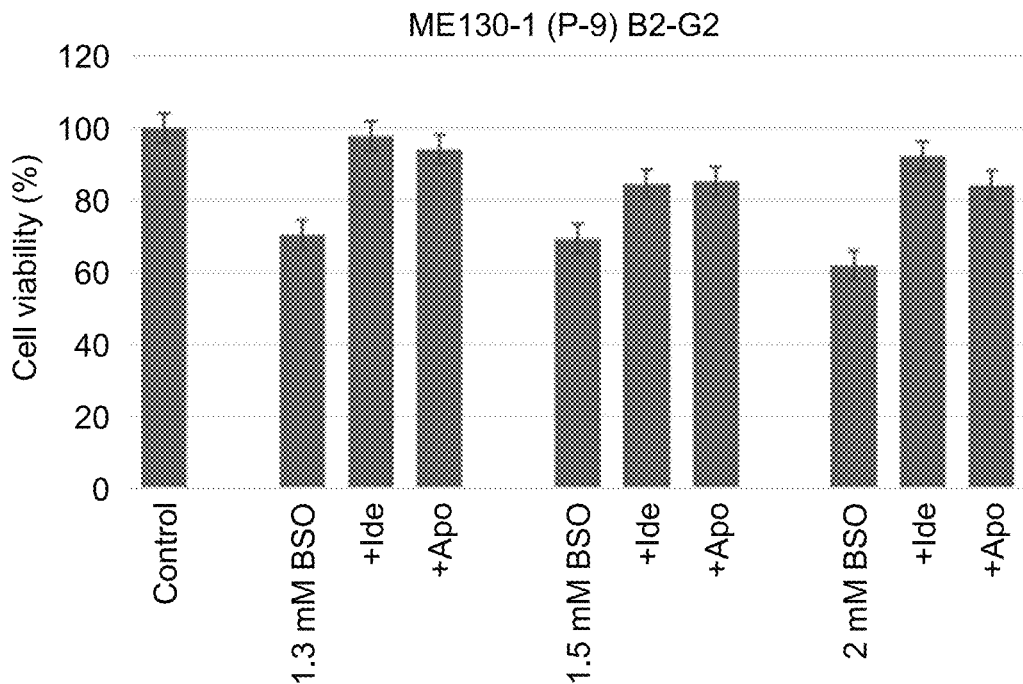

The ferroptosis inducer BSO and apomorphine or idebenone were coadded to normal cells (Promo1 cells) or Kearns-Sayre syndrome (KSS) patient cells (ME130-1) and evaluated for a suppressive effect on cell death induced by BSO. The results are shown in FIG. 7. In the drawing, A depicts the results about normal cells (Promo1 cells), and B depicts the results about KSS patient cells (ME130-1). In the drawing, the abscissa depicts test compounds, and the ordinate depicts the cell viability (%) of each treated plot when the number of live cells in a control non-supplemented with BSO is defined as 100%. The values in the drawing represent mean±standard deviation. In relation to the test compounds, "Control" represents a control non-supplemented with BSO, "50 μM BSO", "100 μM BSO", "200 μM BSO", "1.3 mM BSO", "1.5 mM BSO", and "2 mM BSO" represent controls supplemented with the respective predetermined concentrations of BSO and non-supplemented with the test compounds, and "+Ide" and "+Apo" represent the coaddition of the respective predetermined concentrations of BSO and the respective drugs.

As shown in FIG. 5A, in the normal cells (Promo1 cells), cell death was not caused by the single addition or coaddition of any of the test compounds. By contrast, as shown in FIG. 5B, in the mitochondrial cardiomyopathy patient cells (ME250-1), cell death was induced by the addition of BSO whereas this cell death was suppressed by the coaddition of BSO and Ide or Apo. As shown in FIGS. 6 and 7, the same or similar results in the case of using the mitochondrial cardiomyopathy patient cells (ME250-1) were confirmed in the case of using the mitochondrial hepatopathy patient cells (ME263-1) and the KSS patient cells (ME130-1).

Figure 8:
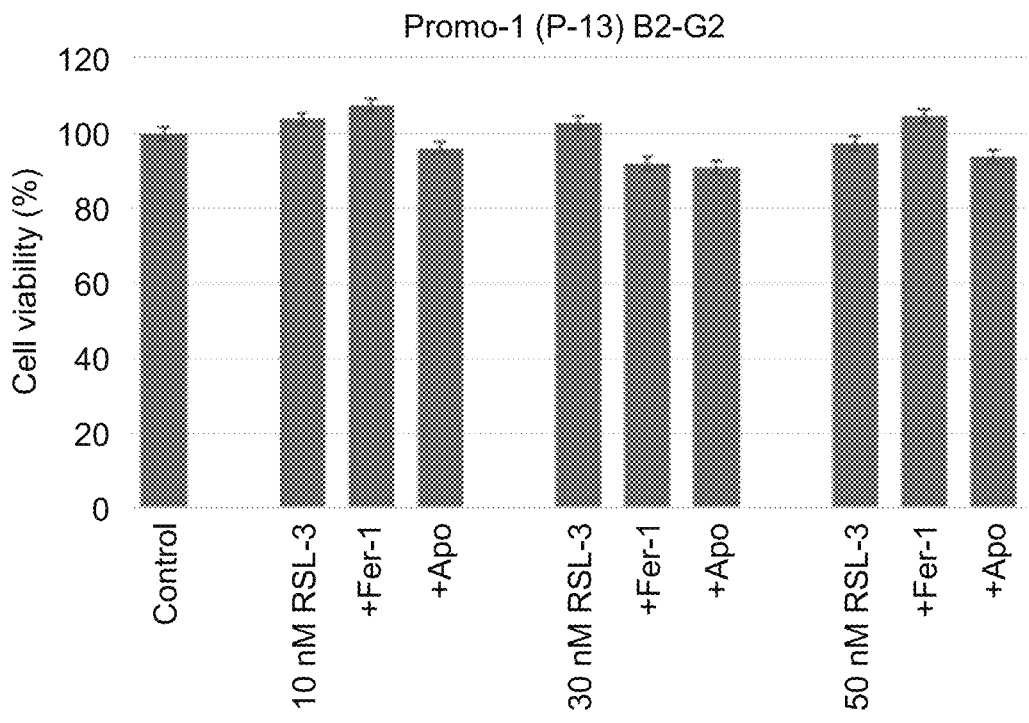
FIG. 8 is a graph showing results of Test I in which a ferroptosis inducer RSL-3 and apomorphine or ferrostatin-1 were coadded to normal cells (Promo1 cells) or mitochondrial cardiomyopathy patient cells (ME250-1) and evaluated for a suppressive effect on cell death induced by RSL-3. In the drawing, A depicts the results about normal cells (Promo1 cells), and B depicts the results about mitochondrial cardiomyopathy patient cells (ME250-1). In the drawing, the abscissa depicts test compounds, and the ordinate depicts the cell viability (%) of each treated plot when the number of live cells in a control non-supplemented with RSL-3 is defined as 100%. The values in the drawing represent mean±standard deviation.
Figure 8:
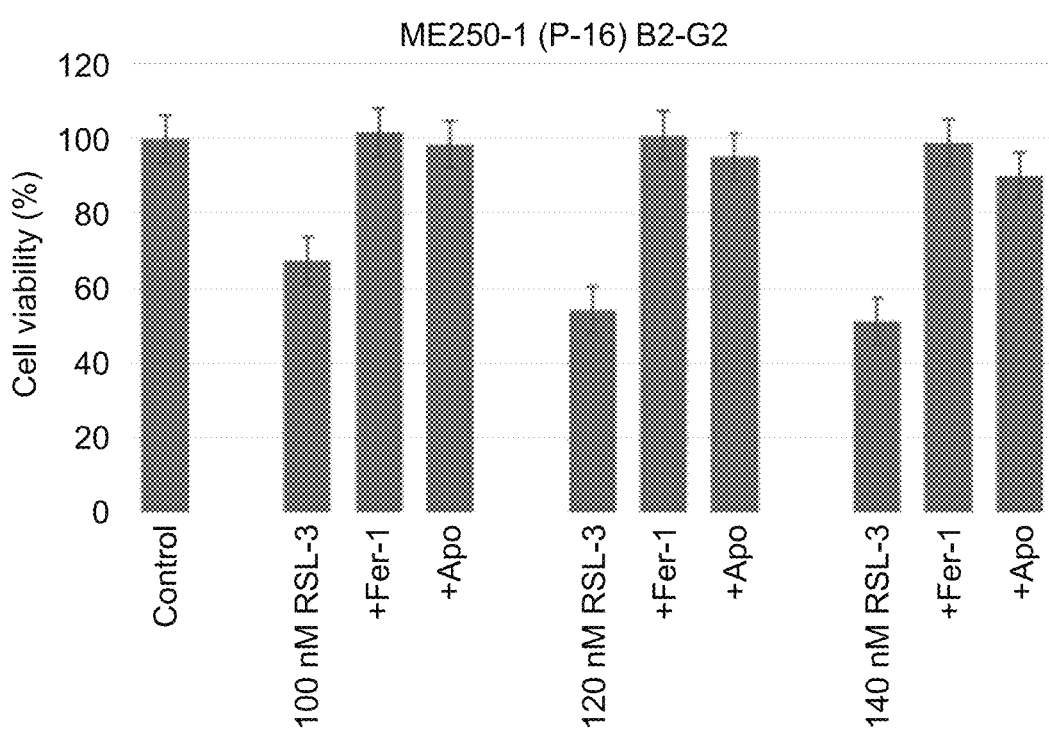

The ferroptosis inducer RSL-3 and apomorphine or ferrostatin-1 were coadded to normal cells (Promo1 cells) or mitochondrial cardiomyopathy patient cells (ME250-1) and evaluated for a suppressive effect on cell death induced by RSL-3. The results are shown in FIG. 8. In the drawing, A depicts the results about normal cells (Promo1 cells), and B depicts the results about mitochondrial cardiomyopathy patient cells (ME250-1). In the drawing, the abscissa depicts test compounds, and the ordinate depicts the cell viability (%) of each treated plot when the number of live cells in a control non-supplemented with RSL-3 is defined as 100%. The values in the drawing represent mean±standard deviation. In relation to the test compounds, "Control" represents a control non-supplemented with RSL-3, "10 nM RSL-3", "30 nM RSL-3", "50 nM RSL-3", "100 nM RSL-3", "120 nM RSL-3", and "140 nM RSL-3" represent controls supplemented with the respective predetermined concentrations of RSL-3 and non-supplemented with the test compounds, and "+Fer-1" and "+Apo" represent the coaddition of the respective predetermined concentrations of RSL-3 and the respective drugs.

Figure 9:
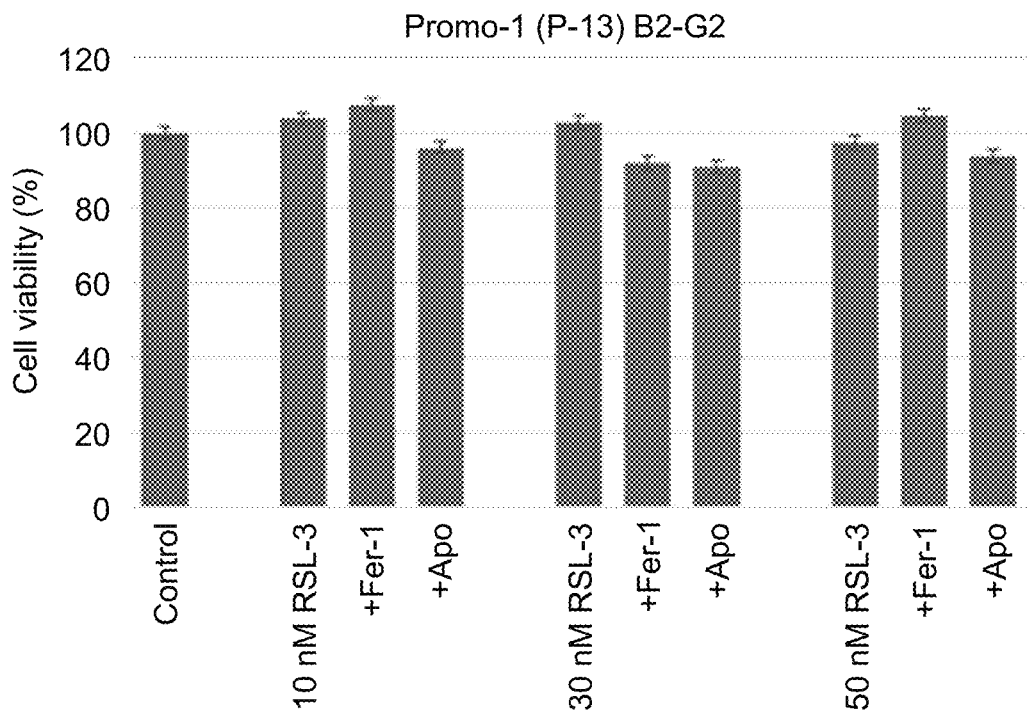
FIG. 9 is a graph showing results of Test I in which a ferroptosis inducer RSL-3 and apomorphine or ferrostatin-1 were coadded to normal cells (Promo1 cells) or mitochondrial hepatopathy patient cells (ME263-1) and evaluated for a suppressive effect on cell death induced by RSL-3. In the drawing, A depicts the results about normal cells (Promo1 cells), and B depicts the results about mitochondrial hepatopathy patient cells (ME263-1). In the drawing, the abscissa depicts test compounds, and the ordinate depicts the cell viability (%) of each treated plot when the number of live cells in a control non-supplemented with RSL-3 is defined as 100%. The values in the drawing represent mean±standard deviation.
Figure 9:
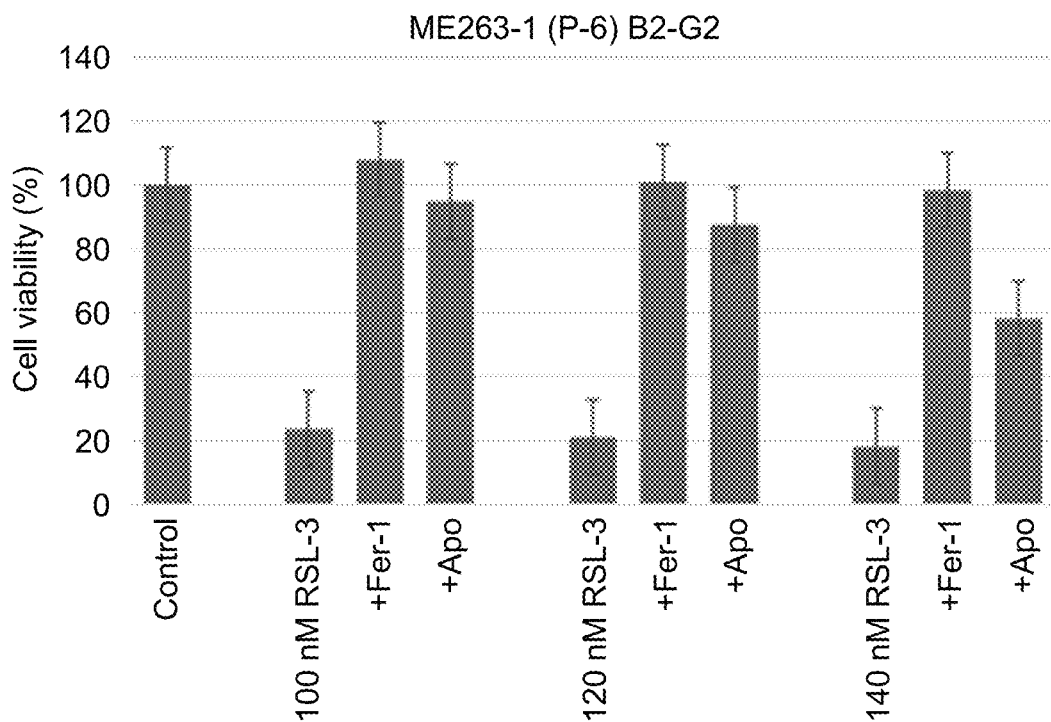

The ferroptosis inducer RSL-3 and apomorphine or ferrostatin-1 were coadded to normal cells (Promo1 cells) or mitochondrial hepatopathy patient cells (ME263-1) and evaluated for a suppressive effect on cell death induced by RSL-3. The results are shown in FIG. 9. In the drawing, A depicts the results about normal cells (Promo1 cells), and B depicts the results about mitochondrial hepatopathy patient cells (ME263-1). In the drawing, the abscissa depicts test compounds, and the ordinate depicts the cell viability (%) of each treated plot when the number of live cells in a control non-supplemented with RSL-3 is defined as 100%. The values in the drawing represent mean±standard deviation. In relation to the test compounds, "Control" represents a control non-supplemented with RSL-3, "10 nM RSL-3", "30 nM RSL-3", "50 nM RSL-3", "100 nM RSL-3", "120 nM RSL-3", and "140 nM RSL-3" represent controls supplemented with the respective predetermined concentrations of RSL-3 and non-supplemented with the test compounds, and "+Fer-1" and "+Apo" represent the coaddition of the respective predetermined concentrations of RSL-3 and the respective drugs.

Figure 10:
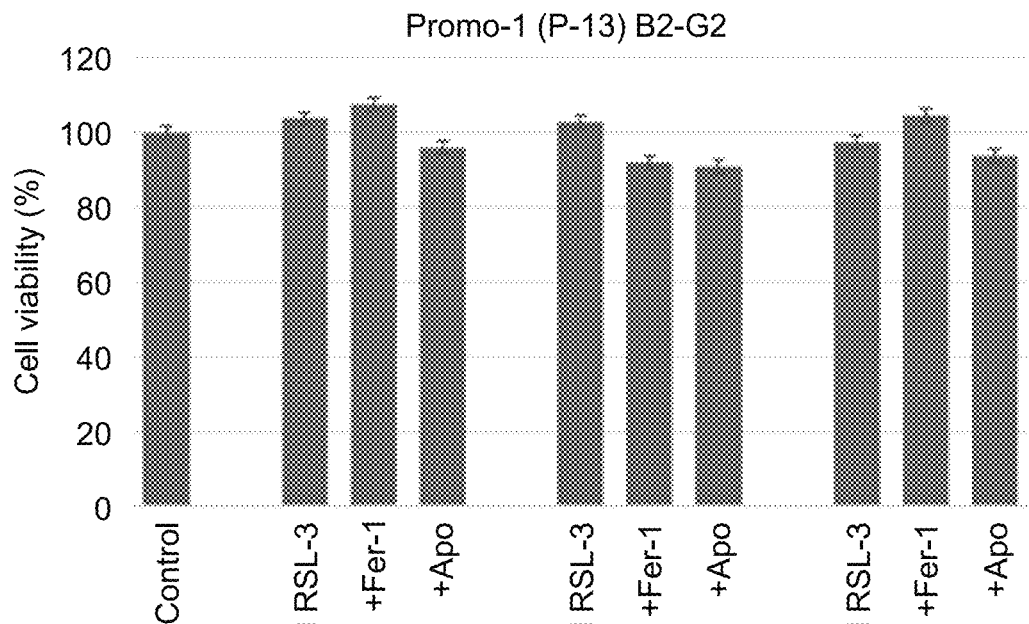
FIG. 10 is a graph showing results of Test I in which a ferroptosis inducer RSL-3 and apomorphine or ferrostatin-1 were coadded to normal cells (Promo1 cells) or Kearns-Sayre syndrome (KSS) patient cells (ME130-1) and evaluated for a suppressive effect on cell death induced by RSL-3. In the drawing, A depicts the results about normal cells (Promo1 cells), and B depicts the results about KSS patient cells (ME130-1). In the drawing, the abscissa depicts test compounds, and the ordinate depicts the cell viability (%) of each treated plot when the number of live cells in a control non-supplemented with RSL-3 is defined as 100%. The values in the drawing represent mean±standard deviation.
Figure 10:
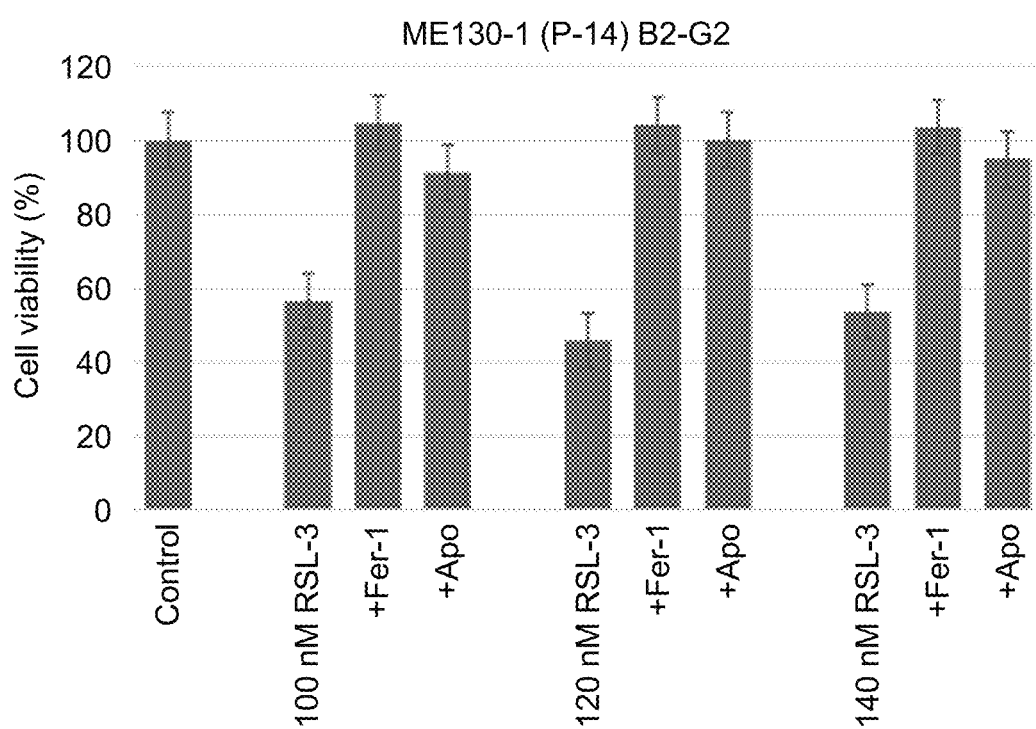

The ferroptosis inducer RSL-3 and apomorphine or ferrostatin-1 were coadded to normal cells (Promo1 cells) or Kearns-Sayre syndrome (KSS) patient cells (ME130-1) and evaluated for a suppressive effect on cell death induced by RSL-3. The results are shown in FIG. 10. In the drawing, A depicts the results about normal cells (Promo1 cells), and B depicts the results about KSS patient cells (ME130-1). In the drawing, the abscissa depicts test compounds, and the ordinate depicts the cell viability (%) of each treated plot when the number of live cells in a control non-supplemented with RSL-3 is defined as 100%. The values in the drawing represent mean±standard deviation. In relation to the test compounds, "Control" represents a control non-supplemented with RSL-3, "10 nM RSL-3", "30 nM RSL-3", "50 nM RSL-3", "100 nM RSL-3", "120 nM RSL-3", and "140 nM RSL-3" represent controls supplemented with the respective predetermined concentrations of RSL-3 and non-supplemented with the test compounds, and "+Fer-1" and "+Apo" represent the coaddition of the respective predetermined concentrations of RSL-3 and the respective drugs.

As shown in FIG. 8A, in the normal cells (Promo1 cells), cell death was not caused by the single addition or coaddition of any of the test compounds. By contrast, as shown in FIG. 8B, in the mitochondrial cardiomyopathy patient cells (ME250-1), cell death was induced by the addition of RSL-3 whereas this cell death was suppressed by the coaddition of RSL-3 and Fer-1 or Apo. As shown in FIGS. 9 and 10, the same or similar results in the case of using the mitochondrial cardiomyopathy patient cells (ME250-1) were confirmed in the case of using the mitochondrial hepatopathy patient cells (ME263-1) and the KSS patient cells (ME130-1).

<Test II. Search for Novel Ferroptosis Inhibitors>

The results of Test I revealed that: cell death in an individual having mitochondrial dysfunction is mainly induced via ferroptosis; and the cell death is suppressed by a ferroptosis inhibitor such as apomorphine. Accordingly, novel ferroptosis inhibitors were searched with apomorphine as a lead compound.

45 apomorphine derivatives were provided by synthesis or purchase, etc., with apomorphine as a lead compound. Among these apomorphine derivatives, test compounds used in the tests given below are shown in Table 2. The synthesis of the novel apomorphine derivatives will be described below.

TABLE 2

| Test compound | Chemical formula |
|---|---|
| D8 |  |

TABLE 2-continued

| Test compound | Chemical formula |
|---|---|
| D9 | |
| D10 | |
| D18 | |
| D20 | |
| D26 | |

TABLE 2-continued
| Test compound | Chemical formula |
|---|---|
| D36 | 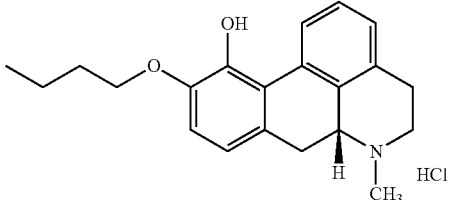 |
| D37 | 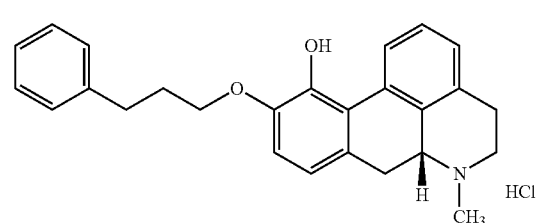 |
| D38 | 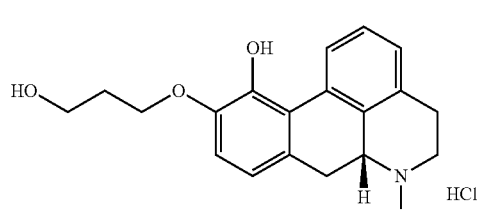 |
| D39 | 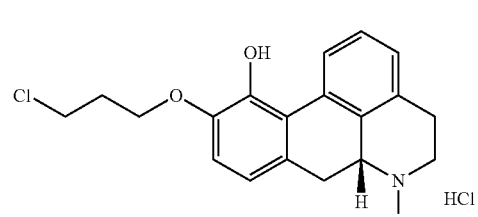 |
| D40 | 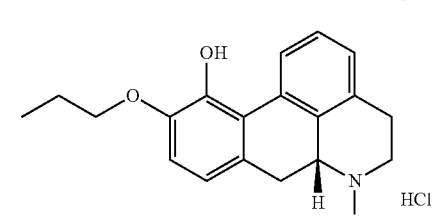 |
| D41 | 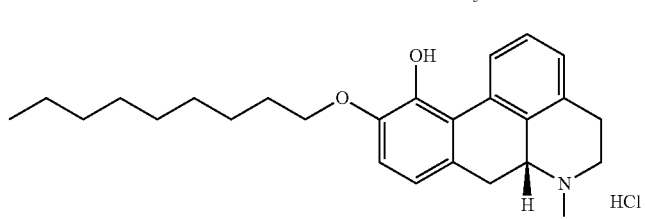 |
| D42 | 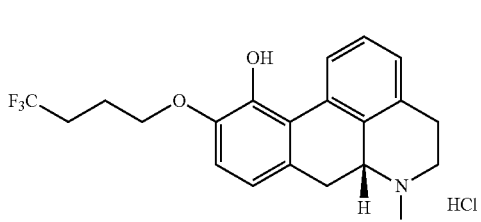 |

TABLE 2-continued
| Test compound | Chemical formula |
|---|---|
| D43 | 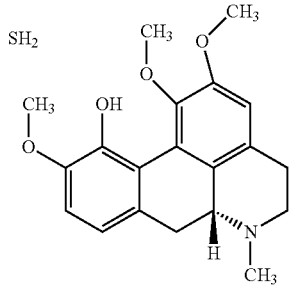 |
| D45 | 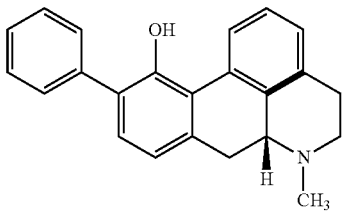 |
| D47 | 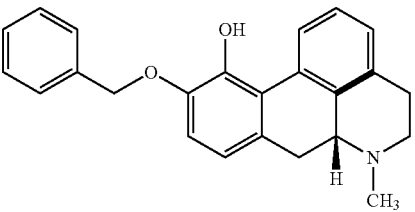 |
| D48 | 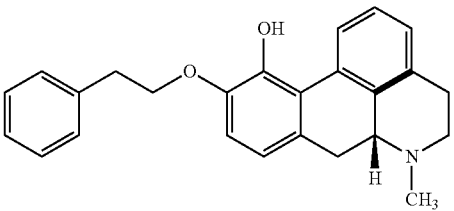 |
| D50 | 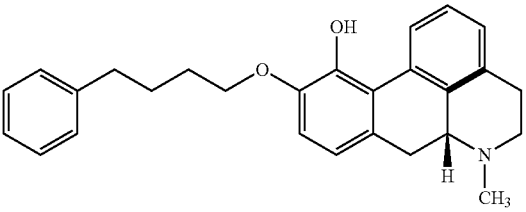 |
| D54 | 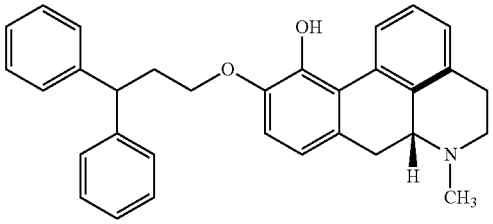 |

TABLE 2-continued

| Test compound | Chemical formula |
|---|---|
| D55 | 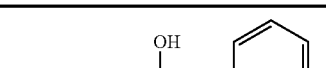 |

[II-1: Synthesis of Compound D36]

[Formula 5]

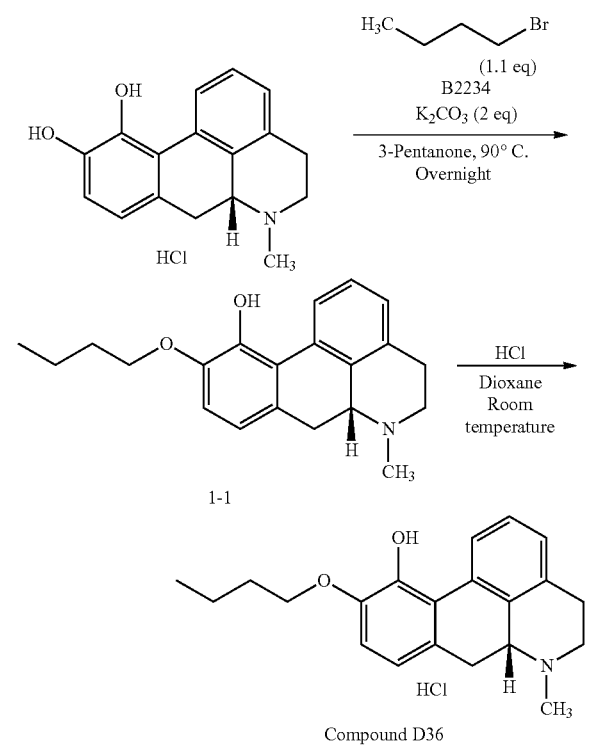

Figure 11:
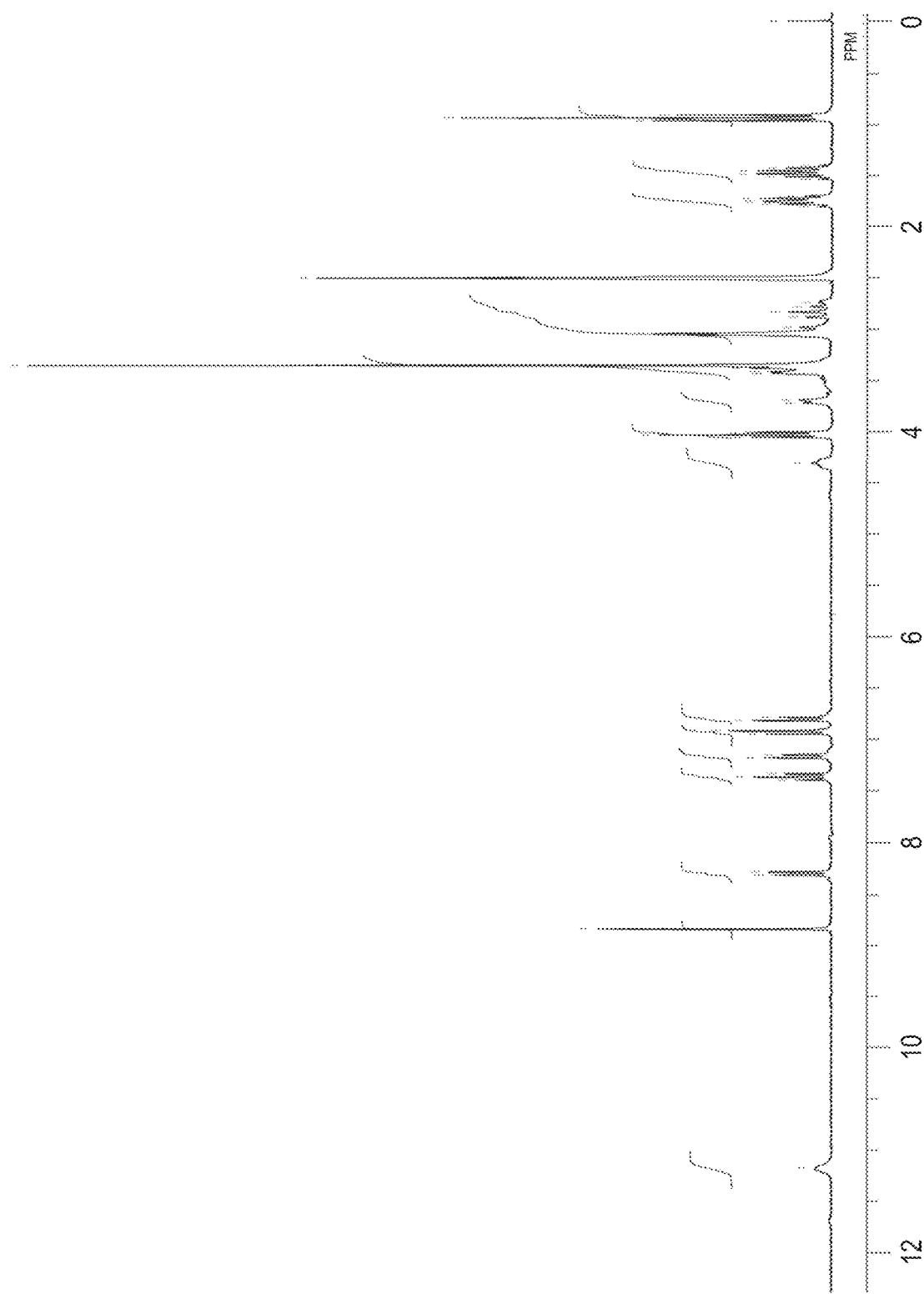
FIG. 11 shows the 270 MHz $^1$H-NMR spectrum of compound D36 measured in DMSO-d6.
Figure 12:
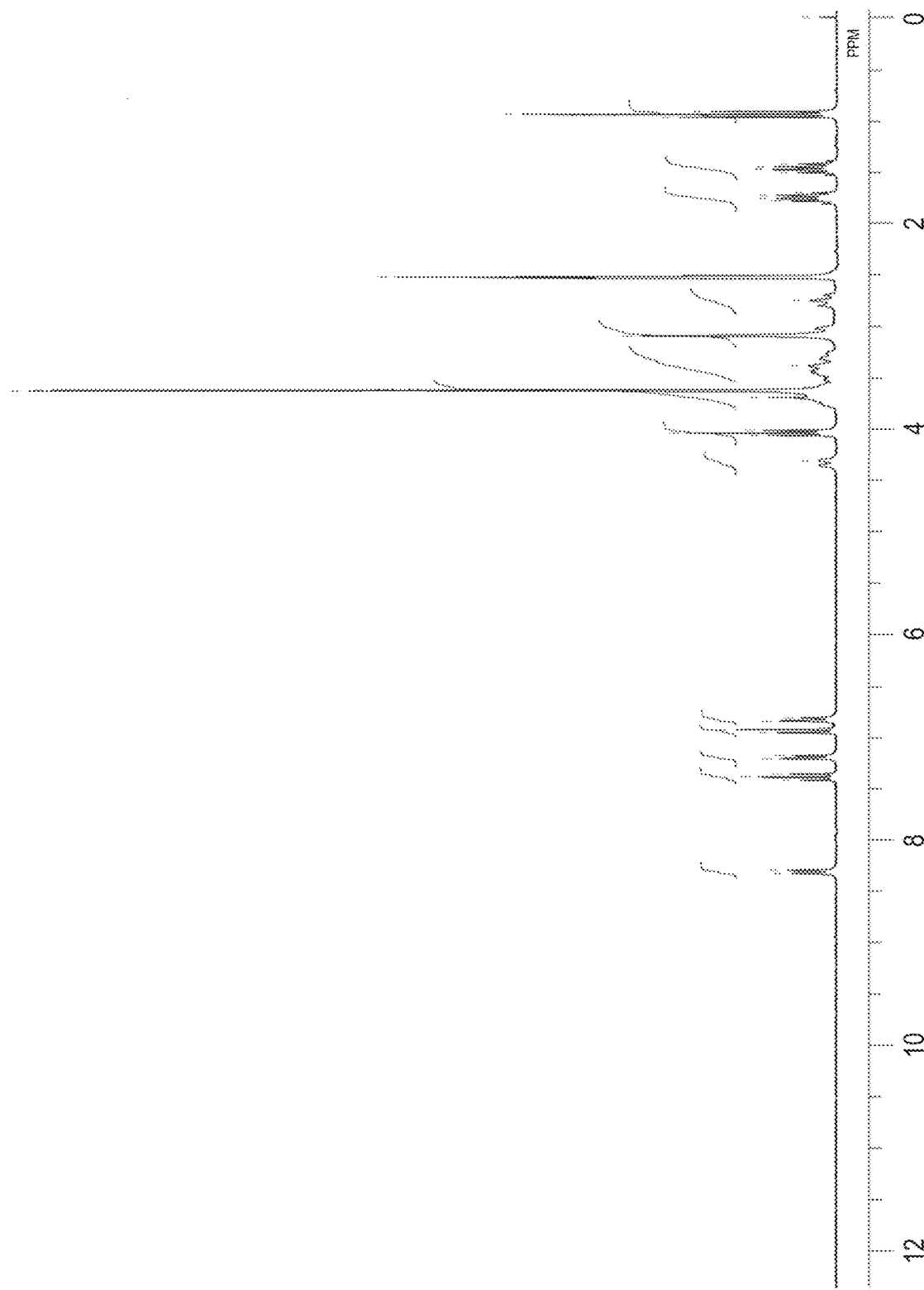
FIG. 12 shows the 270 MHz $^1$H-NMR spectrum of compound D36 measured in DMSO-d6 containing $D_2O$.
Figure 13:
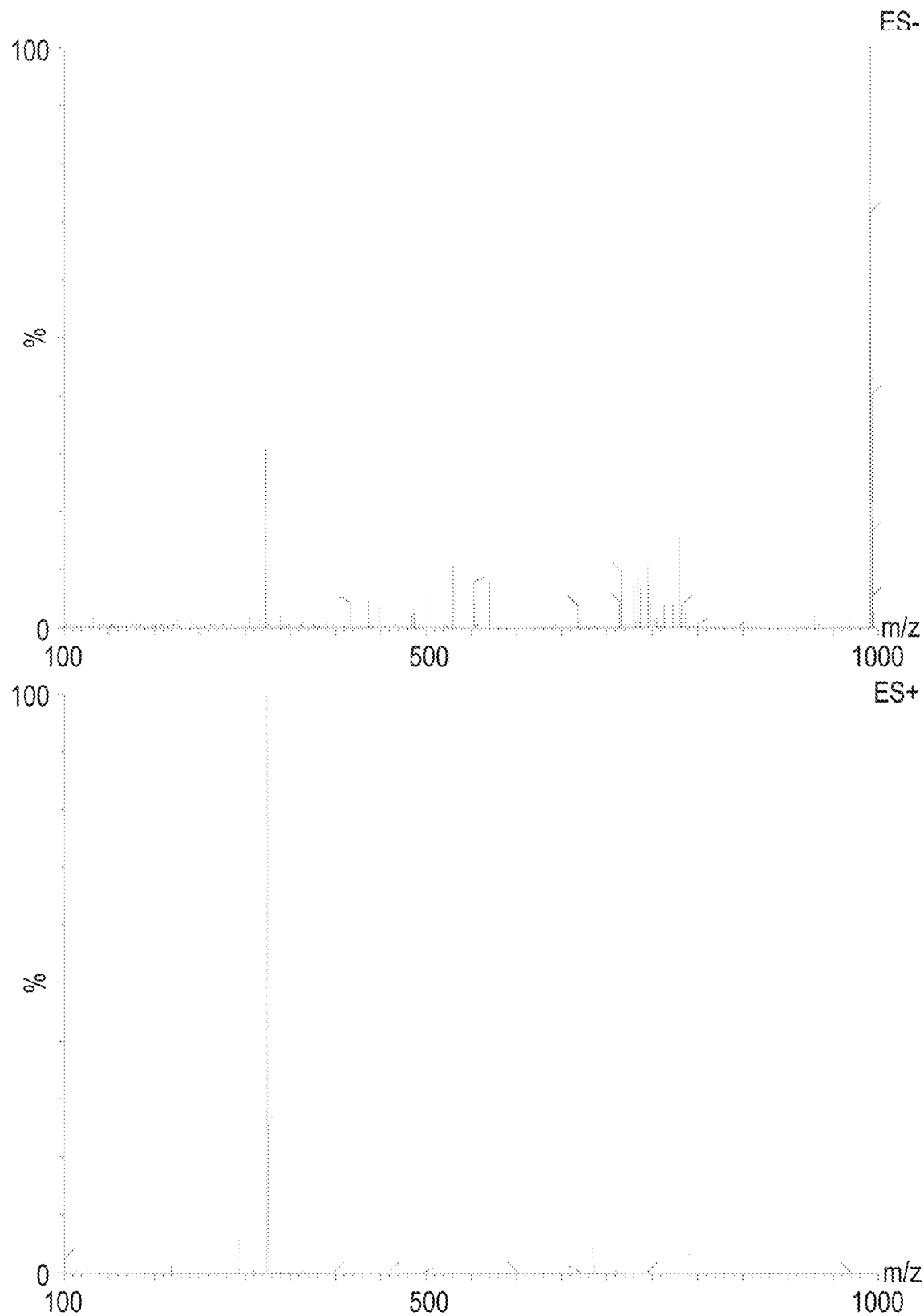
FIG. 13 shows the ESI-MS spectrum (upper: anion mode, lower: cation mode) of compound D36.

Under nitrogen stream, deaerated 3-pentanone (5 mL) and 1-bromobutane (0.20 mL, 1.8 mmol) were added to apomorphine hydrochloride 0.5-hydrate (500 mg, 1.65 mmol) and potassium carbonate (0.46 g, 3.3 mmol), and the mixture was heated overnight (20 hours) at 90° C. After being allowed to cool, the reaction solution was filtered through celite, and the filtrate was concentrated under reduced pressure. The obtained residue was purified by medium-pressure preparative silica gel column chromatography (30 g of NH silica gel, hexane/ethyl acetate=90/10 to 75/25). The obtained compound 1-1 was dissolved by the addition of a solution of approximately 4 M hydrogen chloride in 1,4-dioxane (2 mL), and the solution was concentrated under reduced pressure to obtain compound D36 (0.237 g, 0.659 mmol, yield: 40%) as a white solid. FIG. 11 shows the 270 MHz $^1$H-NMR spectrum of the compound D36 measured in DMSO-d6, FIG. 12 shows the 270 MHz $^1$H-NMR spectrum of the compound D36 measured in DMSO-d6 containing D$_2$O, and FIG. 13 shows the ESI-MS spectrum (upper: anion mode, lower: cation mode) of the compound D36.

Molecular formula: $C_{21}H_{26}ClNO_2$ (HCl salt)
Molecular weight: 359.89 (HCl salt)
LRMS: $C_{21}H_{26}NO_2$ calcd [M+H]$^+$324.20, found: 324.6
$^1$H NMR (270 MHz, DMSO-d6): δ 11.18 (brs, 1H), 8.85 (s, 1H), 8.31 (d, J=8.1 Hz, 1H), 7.37 (t, J=8.1 Hz, 1H), 7.17 (d, J=8.1 Hz, 1H), 6.94 (d, J=8.1 Hz, 1H), 6.81 (d, J=8.1 Hz, 1H), 4.31 (m, 1H), 4.03 (t, J=5.4 Hz, 2H), 3.70 (m, 1H), 3.45-3.30 (m, 3H), 3.09 (s, 3H), 3.10-2.95 (m, 1H), 2.90-2.70 (m, 1H), 1.76 (m, 2H), 1.47 (m, 2H), 0.94 (t, J=8.1 Hz, 3H).

[II-2: Synthesis of Compound D37]

[Formula 6]

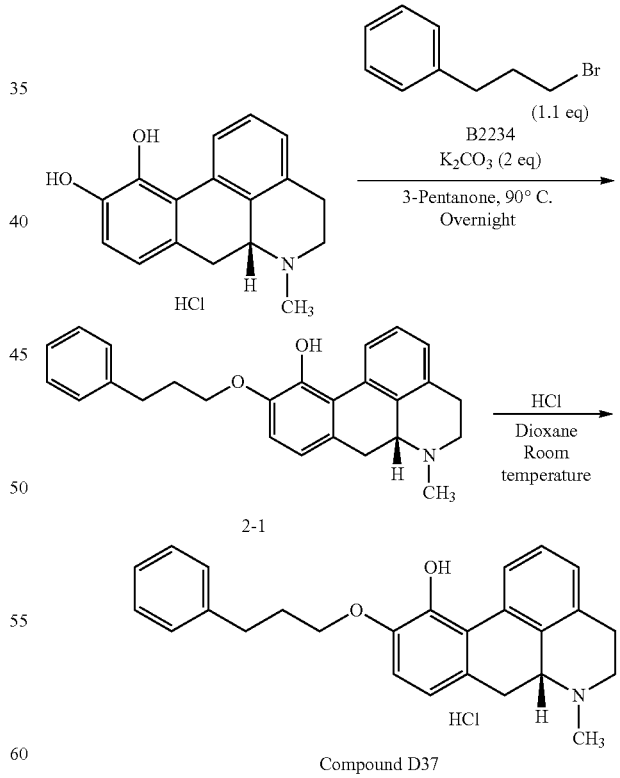

Figure 14:
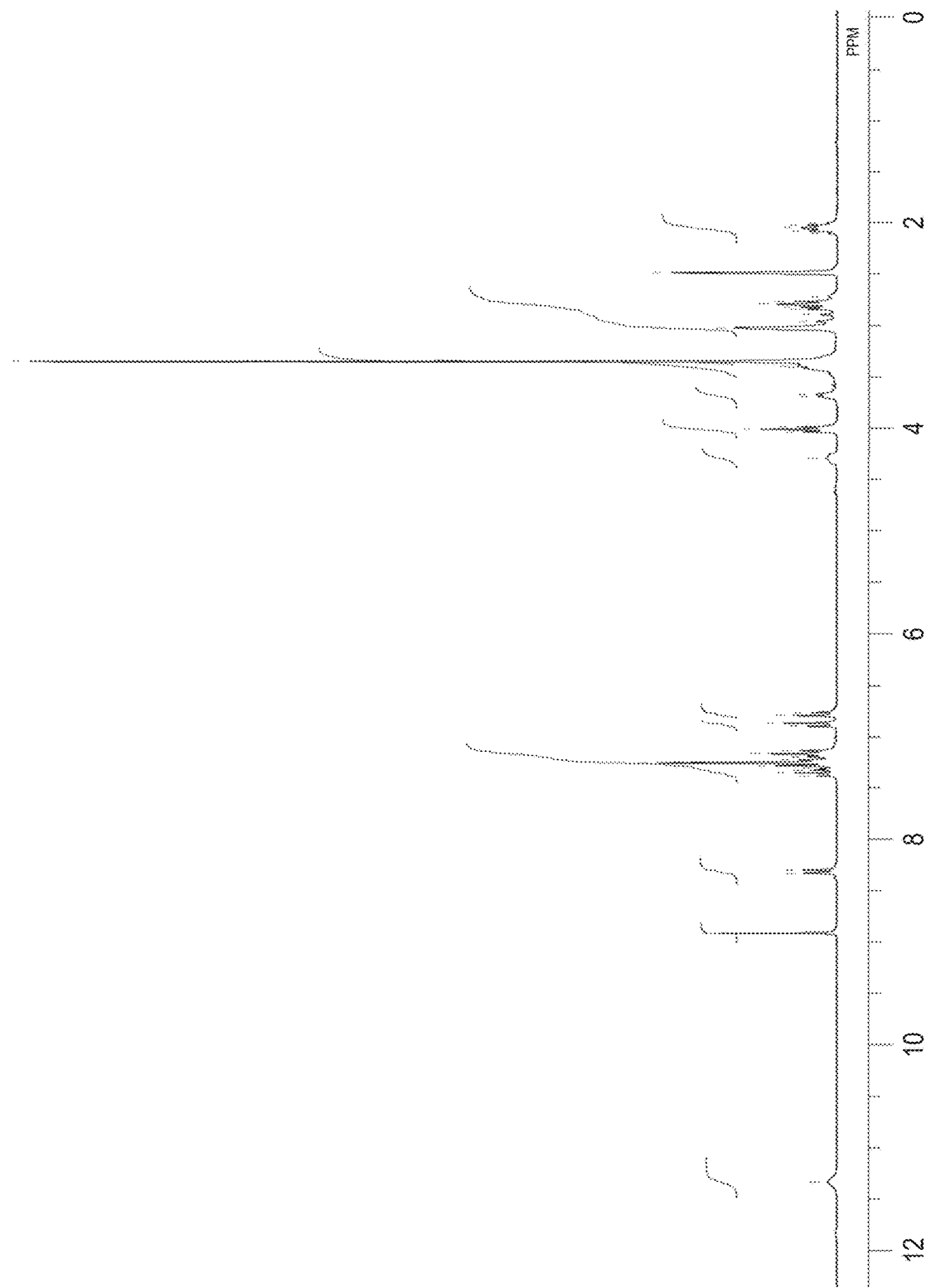
FIG. 14 shows the 270 MHz $^1$H-NMR spectrum of compound D37 measured in DMSO-d6.
Figure 15:
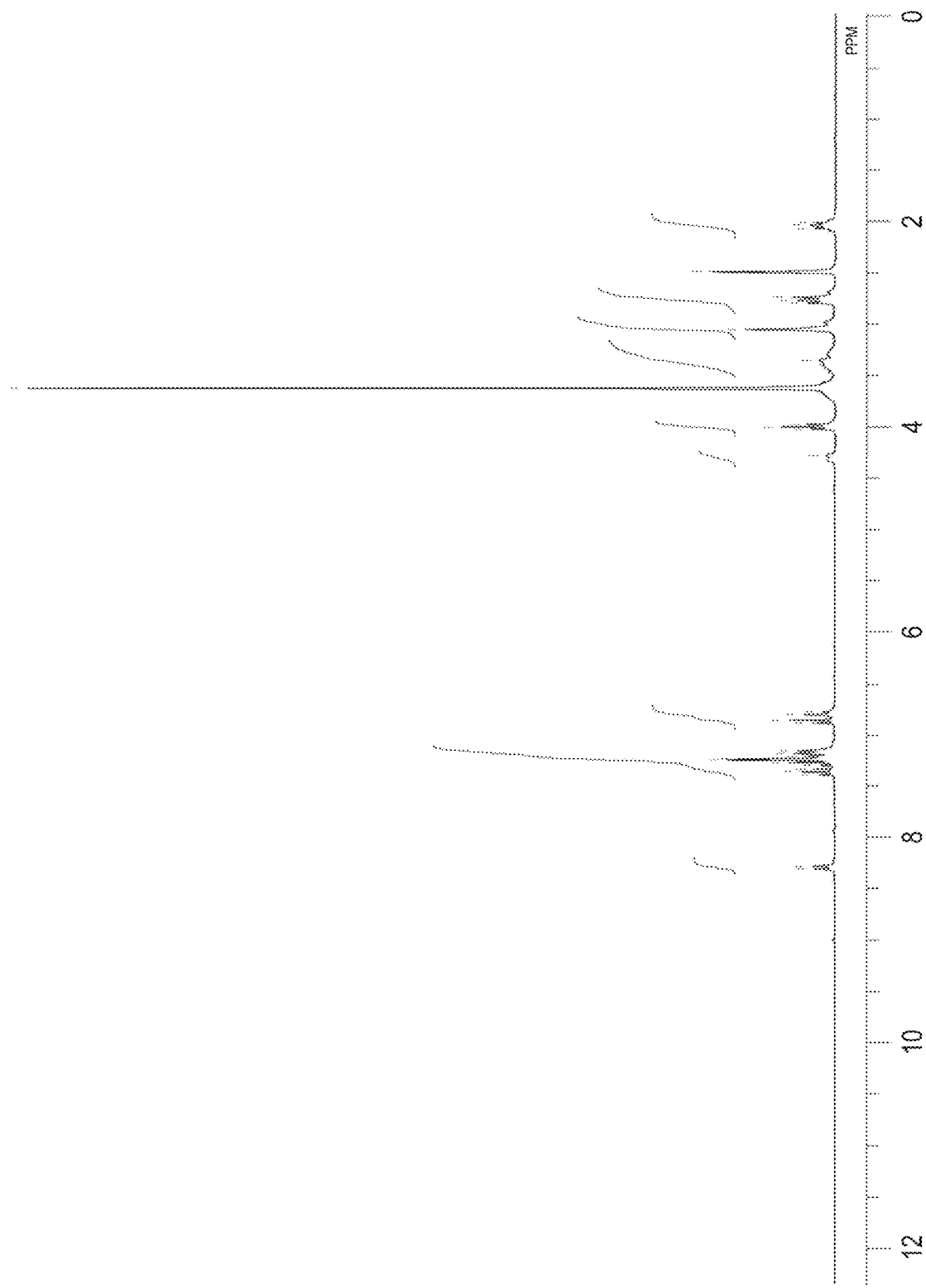
FIG. 15 shows the 270 MHz $^1$H-NMR spectrum of compound D37 measured in DMSO-d6 containing $D_2O$.
Figure 16:
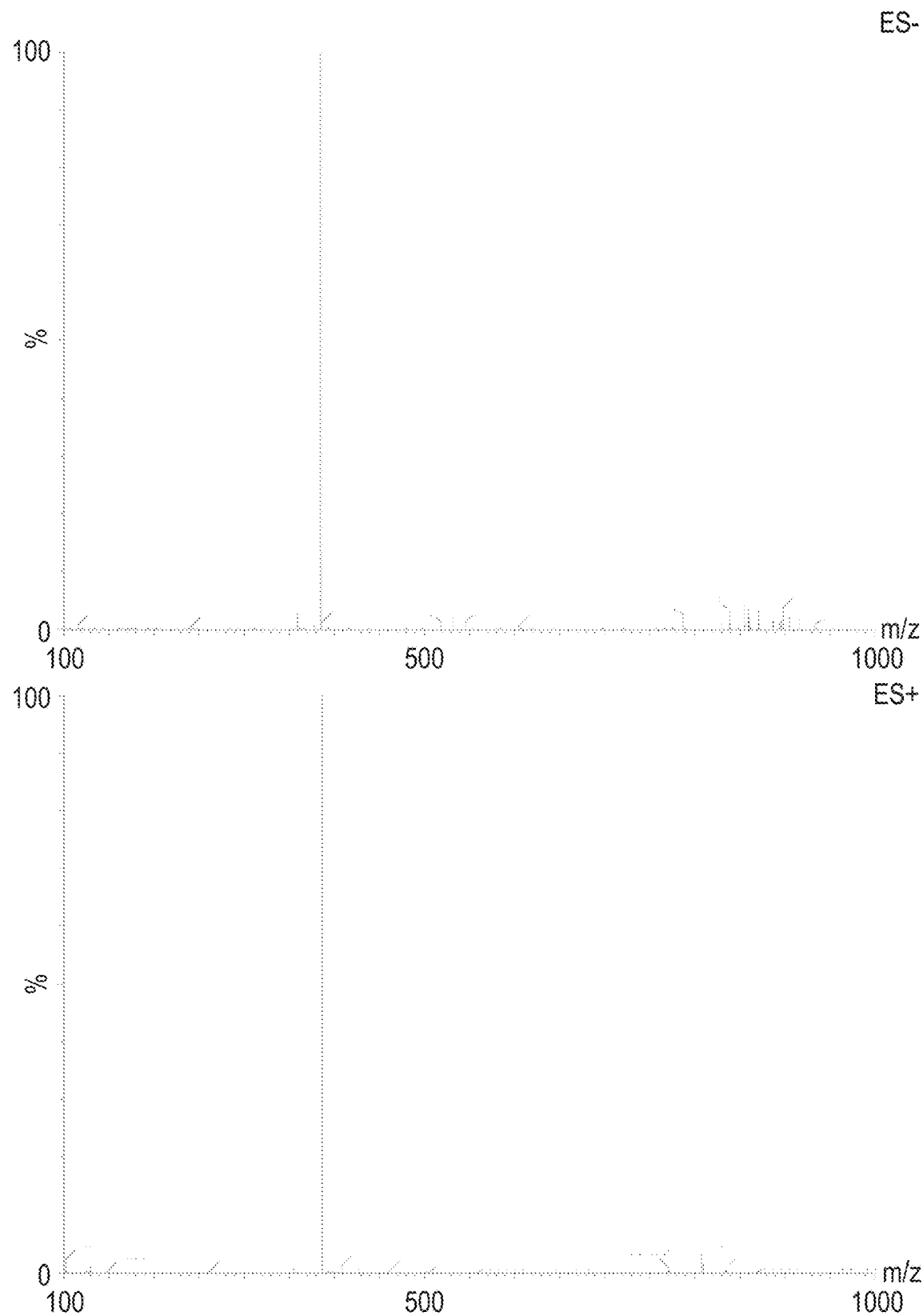
FIG. 16 shows the ESI-MS spectrum (upper: anion mode, lower: cation mode) of compound D37.

Under nitrogen stream, deaerated 3-pentanone (5 mL) and 3-phenylpropyl bromide (0.275 mL, 1.81 mmol) were added to apomorphine hydrochloride 0.5-hydrate (500 mg, 1.65 mmol) and potassium carbonate (0.46 g, 3.3 mmol), and the mixture was heated overnight (20 hours) at 90° C. After being allowed to cool, the reaction solution was filtered through celite, and the filtrate was concentrated under reduced pressure. The obtained residue was purified by medium-pressure preparative silica gel column chromatography (30 g of NH silica gel, hexane/ethyl acetate=90/10 to 75/25). The obtained compound 2-1 was dissolved by the addition of a solution of approximately 4 M hydrogen chloride in 1,4-dioxane (2 mL), and the solution was concentrated under reduced pressure to obtain compound D37 (0.175 g, 0.415 mmol, yield: 25%) as a white solid. FIG. 14 shows the 270 MHz $^1$H-NMR spectrum of the compound D37 measured in DMSO-d6, FIG. 15 shows the 270 MHz $^1$H-NMR spectrum of the compound D37 measured in DMSO-d6 containing $D_2O$, and FIG. 16 shows the ESI-MS spectrum (upper: anion mode, lower: cation mode) of the compound D37.

Molecular formula: $C_{26}H_{28}ClNO_2$ (HCl salt)
Molecular weight: 421.97 (HCl salt)
LRMS: $C_{26}H_{28}NO_2$ calcd [M+H]$^+$386.21, found: 386.8
$^1$H NMR (270 MHz, DMSO-d6): δ 11.34 (brs, 1H), 8.93 (s, 1H), 8.33 (d, J=8.1 Hz, 1H), 7.42-7.11 (m, 7H), 6.90 (d, J=8.1 Hz, 1H), 6.80 (d, J=8.1 Hz, 1H), 4.31 (m, 1H), 4.02 (t, J=5.4 Hz, 2H), 3.69 (m, 1H), 3.50-3.25 (m, 3H), 3.03 (s, 3H), 3.08-2.68 (m, 4H), 2.06 (m, 2H).

[II-3: Synthesis of Compound D38]

[Formula 7]

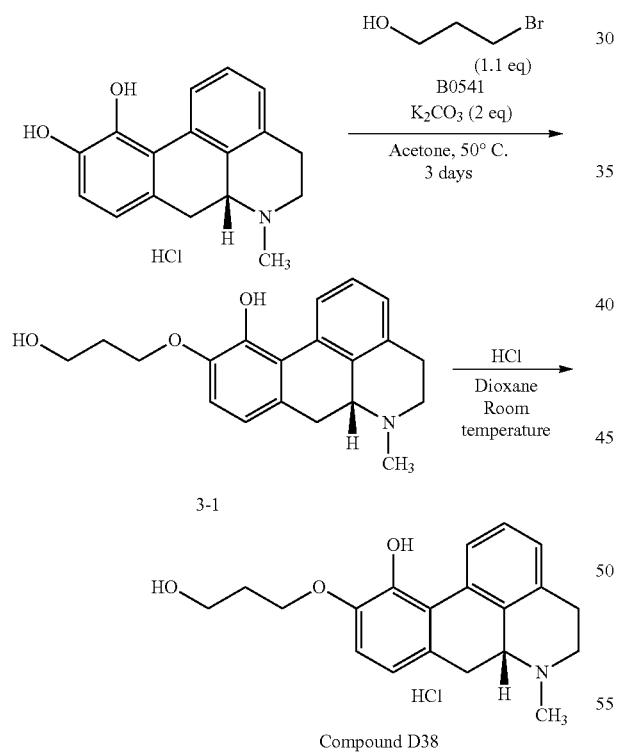

Figure 17:
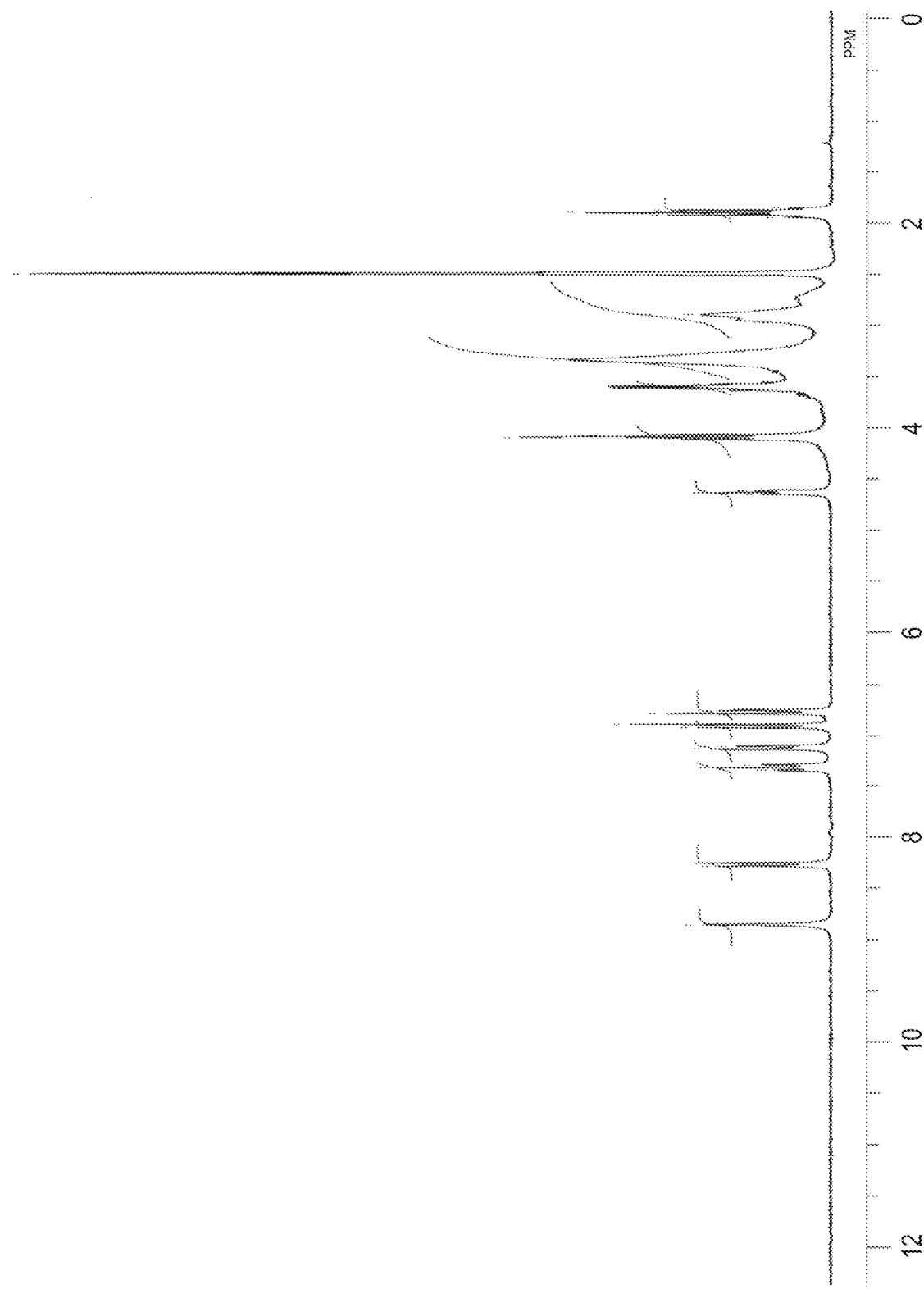
FIG. 17 shows the 270 MHz $^1$H-NMR spectrum of compound D38 measured in DMSO-d6.
Figure 18:
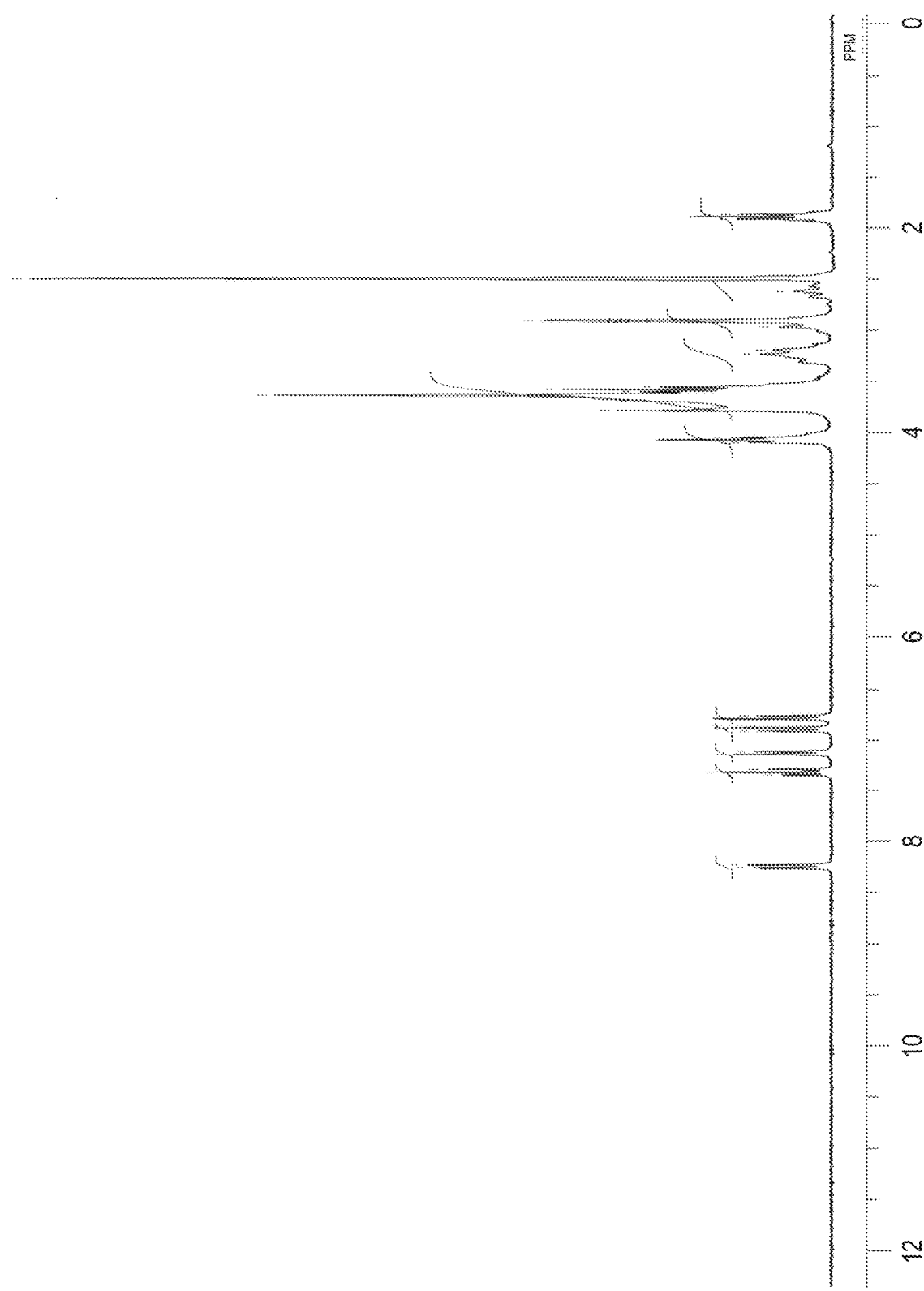
FIG. 18 shows the 270 MHz $^1$H-NMR spectrum of compound D38 measured in DMSO-d6 containing $D_2O$.
Figure 19:
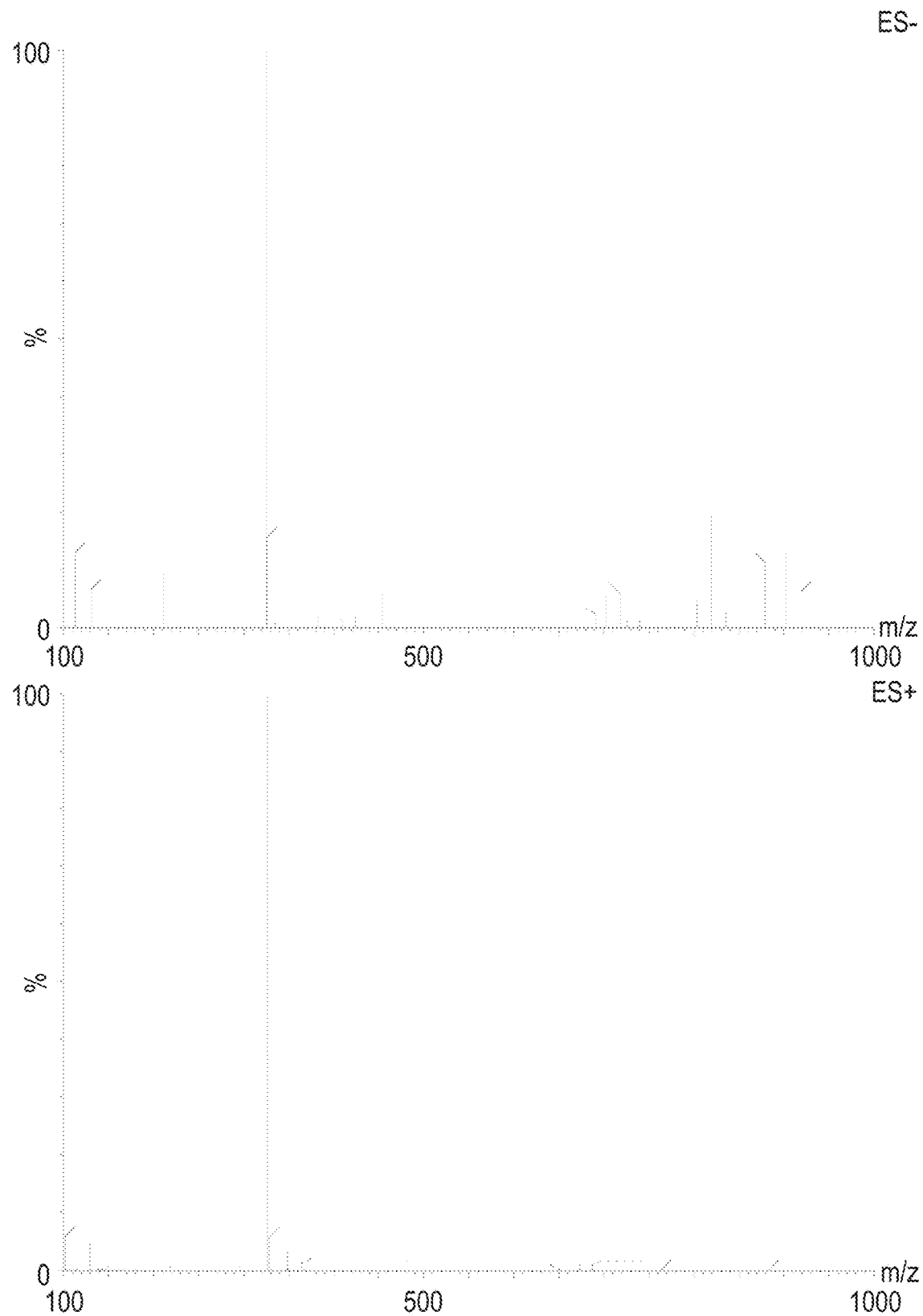
FIG. 19 shows the ESI-MS spectrum (upper: anion mode, lower: cation mode) of compound D38.

Under nitrogen stream, deaerated acetone (5 mL) and 3-bromo-1-propanol (0.16 mL, 1.8 mmol) were added to apomorphine hydrochloride 0.5-hydrate (500 mg, 1.65 mmol) and potassium carbonate (0.46 g, 3.3 mmol), and the mixture was heated at 50° C. for 3 days. After being allowed to cool, the reaction solution was filtered through celite, and the filtrate was concentrated under reduced pressure. The obtained residue was purified by medium-pressure preparative silica gel column chromatography (30 g of NH silica gel, hexane/ethyl acetate=80/20 to 50/50). The obtained solid 3-1 was suspended in methylene chloride (4 mL), washed, and filtered. The resultant was dissolved in dioxane (4 mL), and after addition of a solution of approximately 4 M hydrogen chloride in 1,4-dioxane (0.5 mL), the mixture was concentrated under reduced pressure to obtain compound D38 (114 mg, 0.315 mmol, yield: 19%) as a white solid. FIG. 17 shows the 270 MHz $^1$H-NMR spectrum of the compound D38 measured in DMSO-d6, FIG. 18 shows the 270 MHz $^1$H-NMR spectrum of the compound D38 measured in deuterated DMSO-d6 containing $D_2O$, and FIG. 19 shows the ESI-MS spectrum (upper: anion mode, lower: cation mode) of the compound D38.

Molecular formula: $C_{20}H_{24}ClNO_3$ (HCl salt)
Molecular weight: 361.87 (HCl salt)
LRMS: $C_{20}H_{24}NO_3$ calcd [M+H]$^+$326.18, found: 326.6
$^1$H NMR (270 MHz, DMSO-d6): δ 8.87 (s, 1H), 8.28 (d, J=8.1 Hz, 1H), 7.33 (t, J=8.1 Hz, 1H), 7.14 (d, J=8.1 Hz, 1H), 6.93 (d, J=8.1 Hz, 1H), 6.79 (d, J=8.1 Hz, 1H), 4.65 (t, J=5.4 Hz, 1H), 4.20-4.01 (m, 3H), 3.80-2.55 (m, 11H), 1.91 (m, 2H).

[II-4: Synthesis of Compound D39]

[Formula 8]

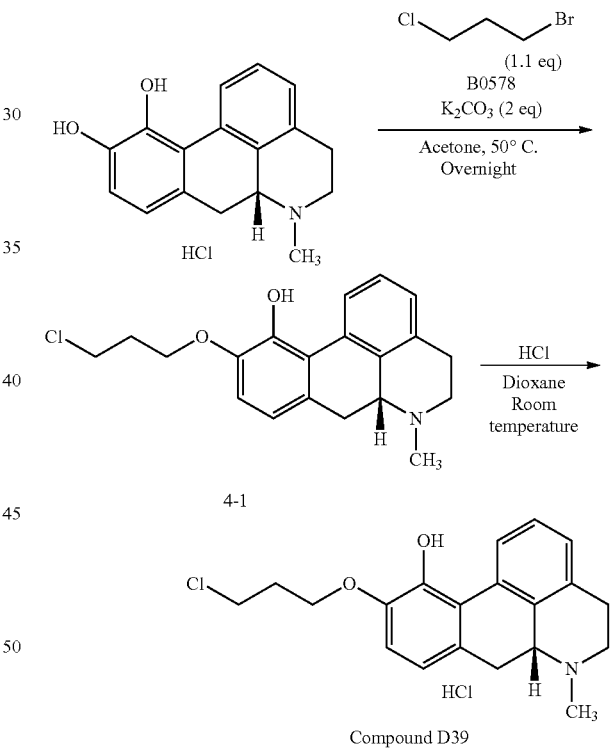

Figure 20:
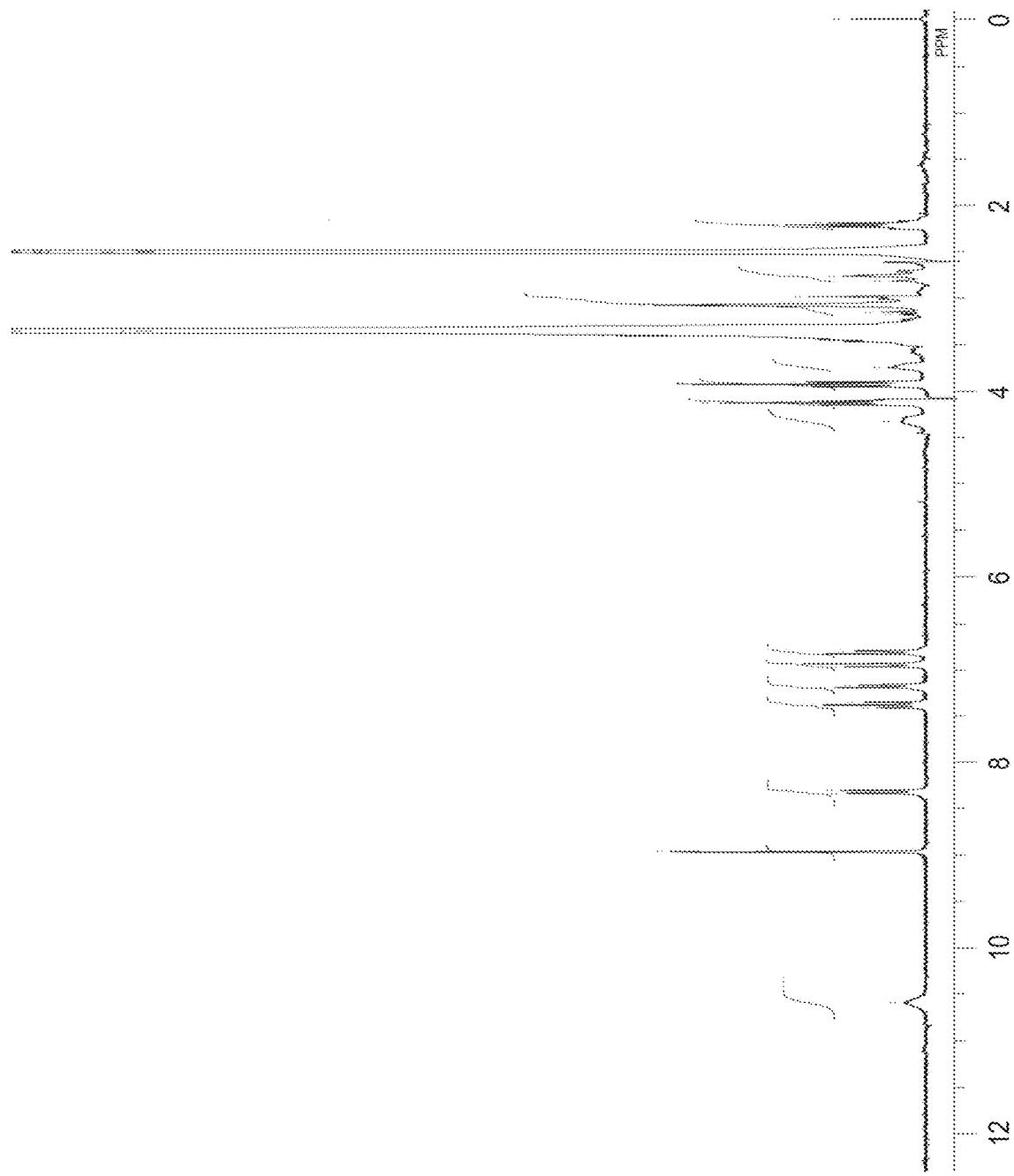
FIG. 20 shows the 270 MHz $^1$H-NMR spectrum of compound D39 measured in DMSO-d6.
Figure 21:
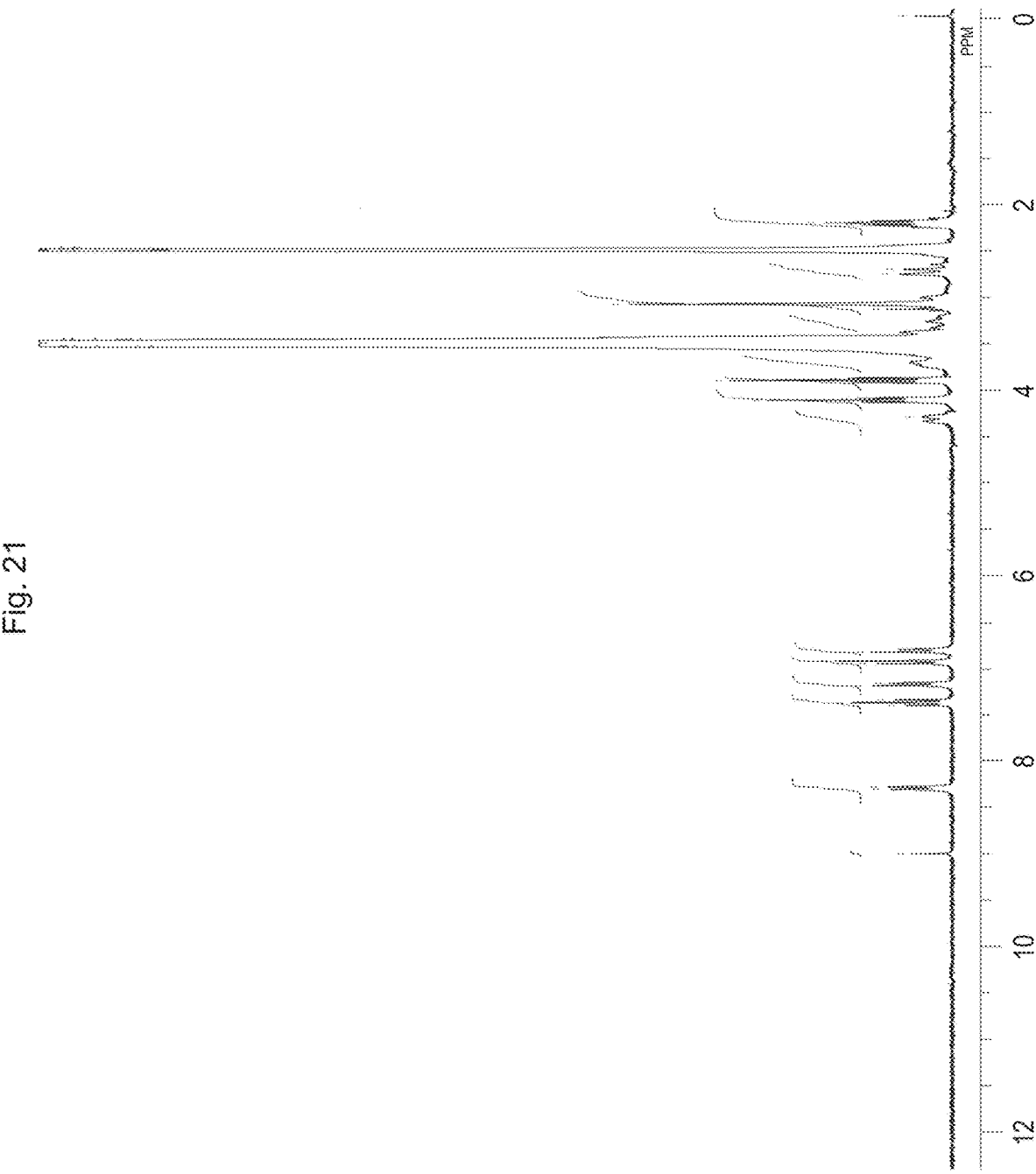
FIG. 21 shows the 270 MHz $^1$H-NMR spectrum of compound D39 measured in DMSO-d6 containing $D_2O$.
Figure 22:
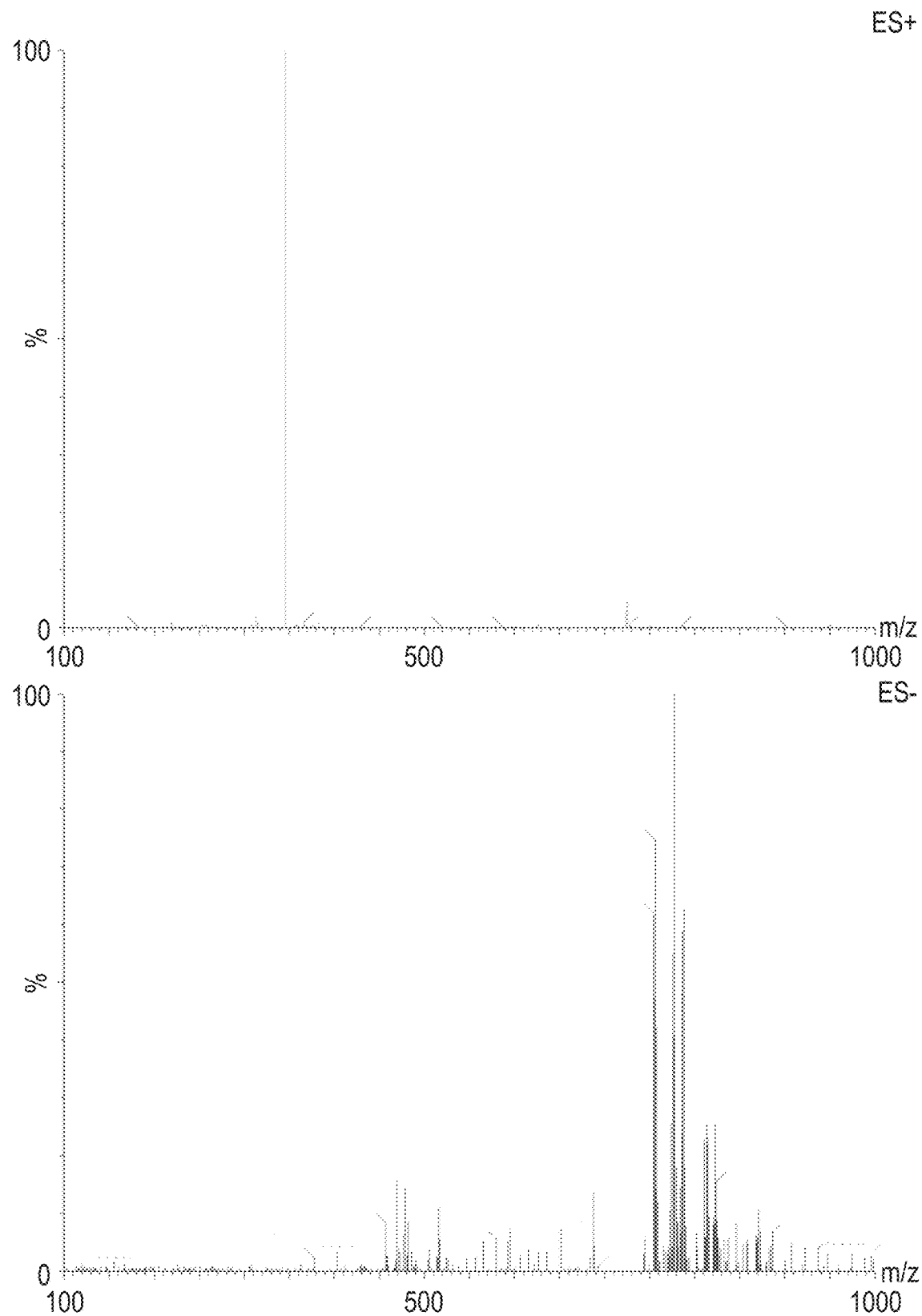
FIG. 22 shows the ESI-MS spectrum (upper: cation mode, lower: anion mode) of compound D39.

Under nitrogen stream, deaerated acetone (10 mL) and 1-bromo-3-chloropropane (0.36 mL, 3.6 mmol) were added to apomorphine hydrochloride 0.5-hydrate (1.00 g, 3.30 mmol) and potassium carbonate (910 mg, 6.58 mmol), and the mixture was heated overnight (23 hours) at 50° C. After being allowed to cool, the reaction solution was filtered through celite, and the filtrate was concentrated under reduced pressure. The obtained residue was purified by medium-pressure preparative silica gel column chromatography (30 g of NH silica gel, hexane/ethyl acetate=95/5 to 80/20). The obtained compound 4-1 was dissolved in cyclopentyl methyl ether (3 mL), and a solution of approximately 4 M hydrogen chloride in cyclopentyl methyl ether (1 mL) was added thereto. The deposited solid was collected by filtration to obtain compound D39 (107 mg, 0.281 mmol, yield: 8.5%) as a white solid. FIG. 20 shows the 270 MHz $^1$H-NMR spectrum of the compound D39 measured in DMSO-d6, FIG. 21 shows the 270 MHz $^1$H-NMR spectrum of the compound D39 measured in deuterated DMSO-d6 containing $D_2O$, and FIG. 22 shows the ESI-MS spectrum (upper: cation mode, lower: anion mode) of the compound D39.

Molecular formula: $C_{20}H_{23}Cl_2NO_2$ (HCl salt)
Molecular weight: 380.31 (HCl salt)
LRMS: $C_{20}H_{23}ClNO_2$ calcd $[M+H]^+$ 344.14, found: 344.5
$^1$H NMR (270 MHz, DMSO-d6): δ 10.60 (brs, 1H), 8.97 (s, 1H), 8.32 (d, J=8.1 Hz, 1H), 7.38 (t, J=8.1 Hz, 1H), 7.19 (d, J=8.1 Hz, 1H), 6.96 (d, J=8.1 Hz, 1H), 6.82 (d, J=8.1 Hz, 1H), 4.33 (m, 1H), 4.13 (t, J=5.4 Hz, 2H), 3.92 (t, J=8.1 Hz, 2H), 3.73 (m, 1H), 3.60-2.65 (m, 5H), 3.07 (s, 3H), 2.21 (m, 2H).

Figure 23:
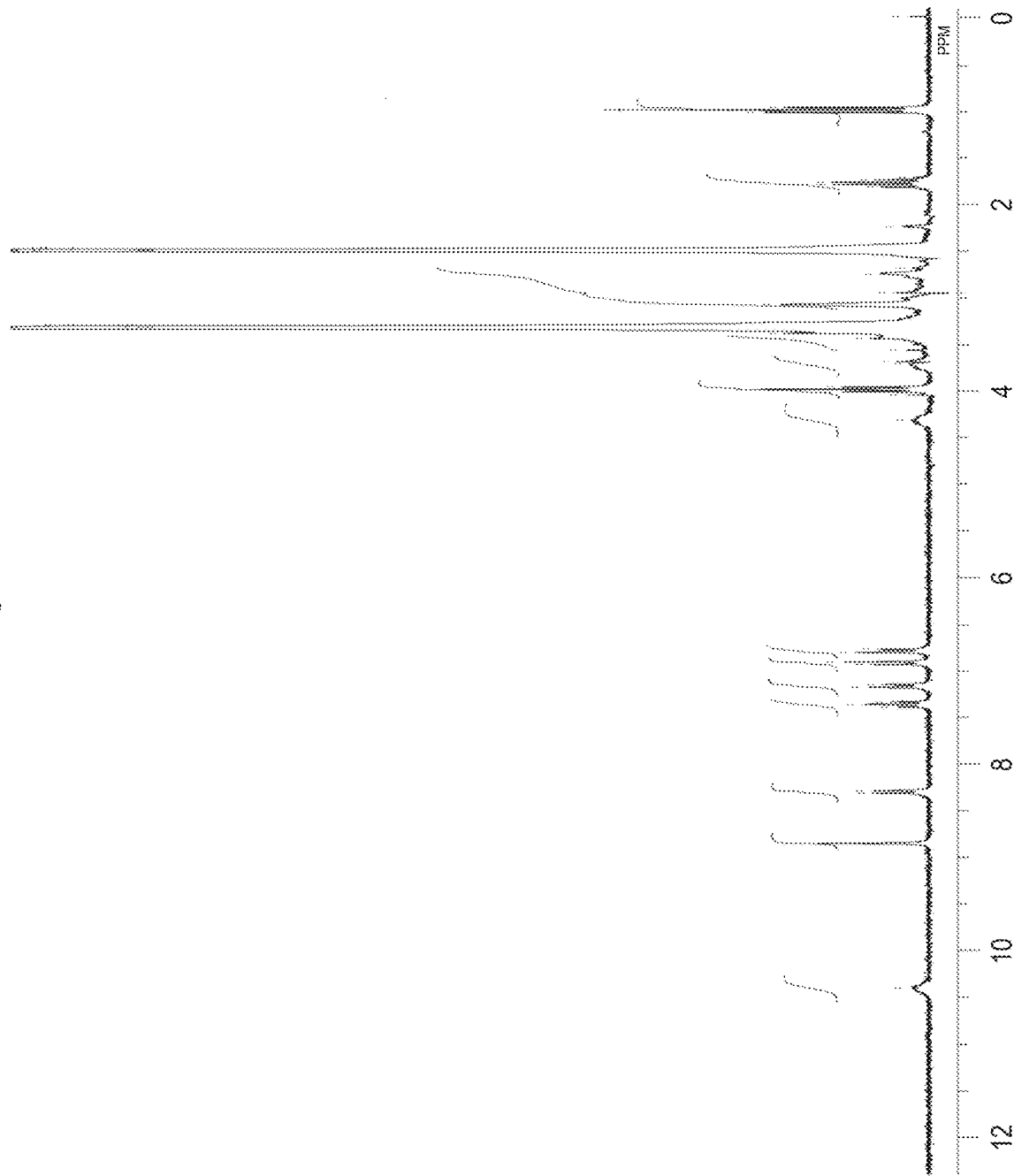
FIG. 23 shows the 270 MHz $^1$H-NMR spectrum of compound D40 measured in DMSO-d6.
Figure 24:
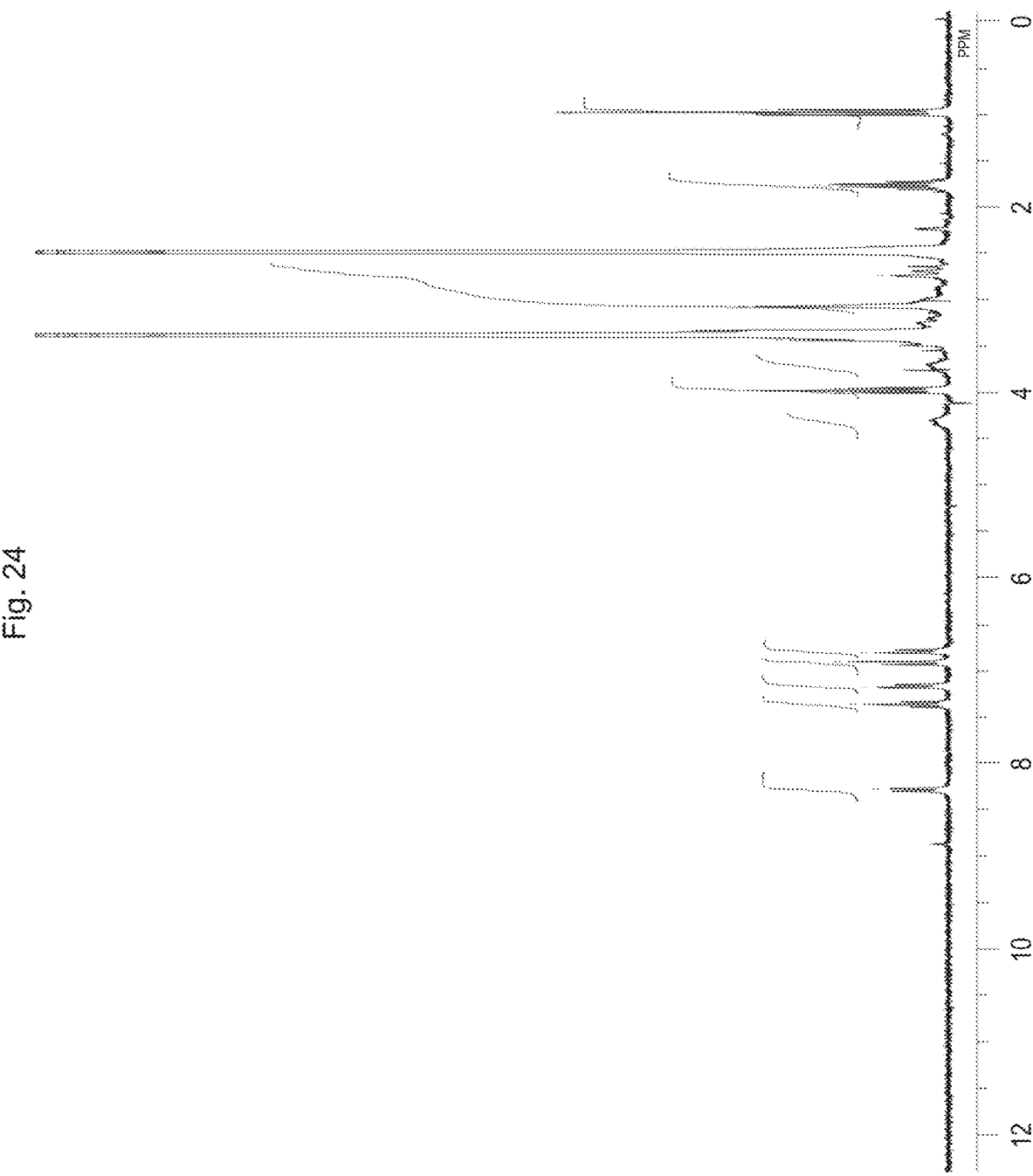
FIG. 24 shows the 270 MHz $^1$H-NMR spectrum of compound D40 measured in DMSO-d6 containing $D_2O$.
Figure 25:
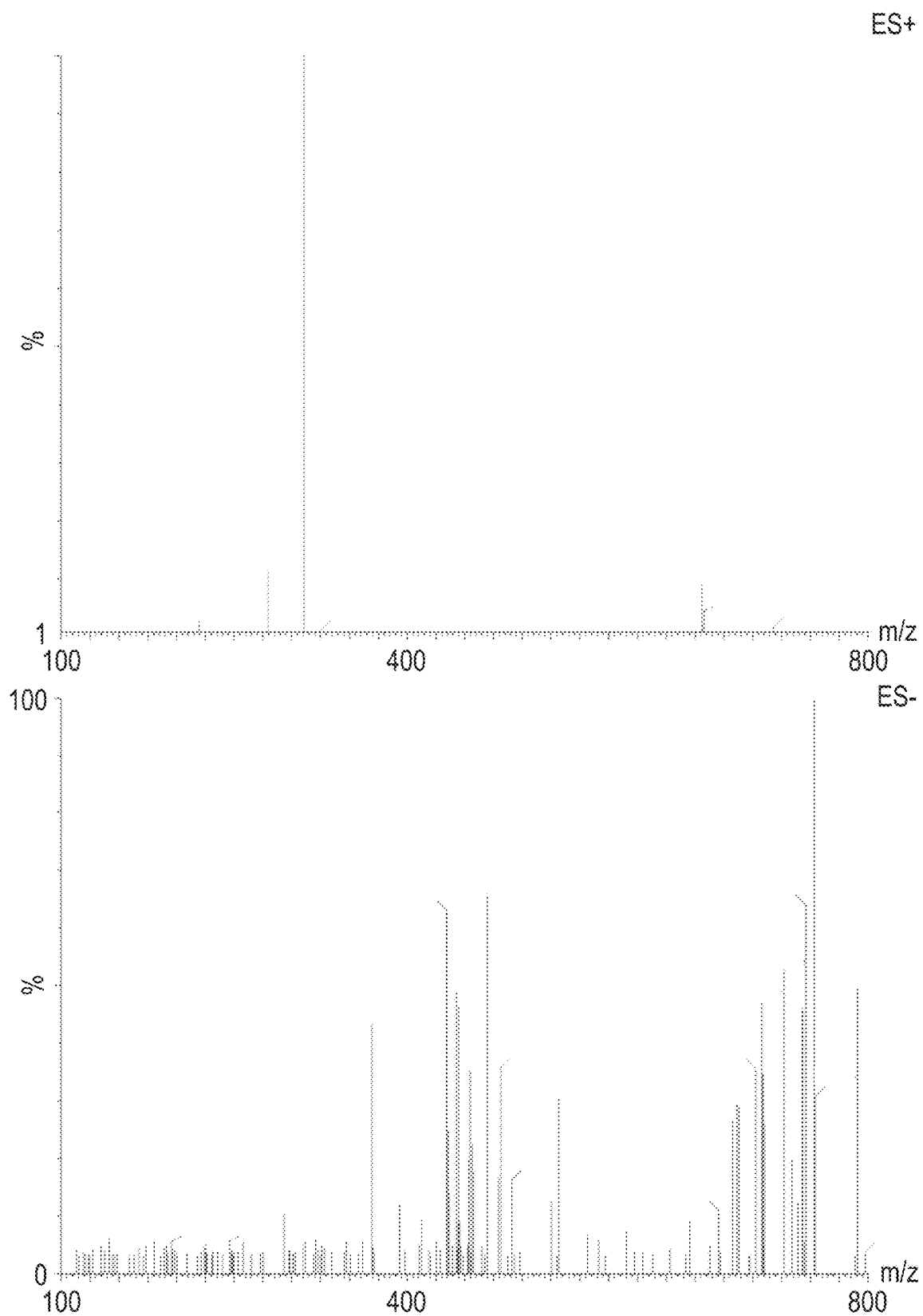
FIG. 25 shows the ESI-MS spectrum (upper: cation mode, lower: anion mode) of compound D40.

[II-5: Synthesis of Compound D40]

mL), and the solution was concentrated under reduced pressure to obtain compound D40 (120 mg, 0.347 mmol, yield: 21%) as a white solid. FIG. 23 shows the 270 MHz $^1$H-NMR spectrum of the compound D40 measured in DMSO-d6, FIG. 24 shows the 270 MHz $^1$H-NMR spectrum of the compound D40 measured in deuterated DMSO-d6 containing $D_2O$, and FIG. 25 shows the ESI-MS spectrum (upper: cation mode, lower: anion mode) of the compound D40.

Molecular formula: $C_{20}H_{24}ClNO_2$ (HCl salt)
Molecular weight: 345.87 (HCl salt)
LRMS: $C_{20}H_{24}NO_2$ calcd $[M+H]^+$310.18, found: 310.8
$^1$H NMR (270 MHz, DMSO-d6): δ 10.40 (brs, 1H), 8.85 (s, 1H), 8.30 (d, J=8.1 Hz, 1H), 7.36 (t, J=8.1 Hz, 1H), 7.17 (d, J=8.1 Hz, 1H), 6.93 (d, J=8.1 Hz, 1H), 6.80 (d, J=8.1 Hz, 1H), 4.32 (m, 1H), 3.98 (t, J=5.4 Hz, 2H), 3.71 (m, 1H), 3.45-2.64 (m, 5H), 3.06 (s, 3H), 1.78 (m, 2H), 0.99 (t, J=8.1 Hz, 3H).

[II-6: Synthesis of Compound D41]

[Formula 9]

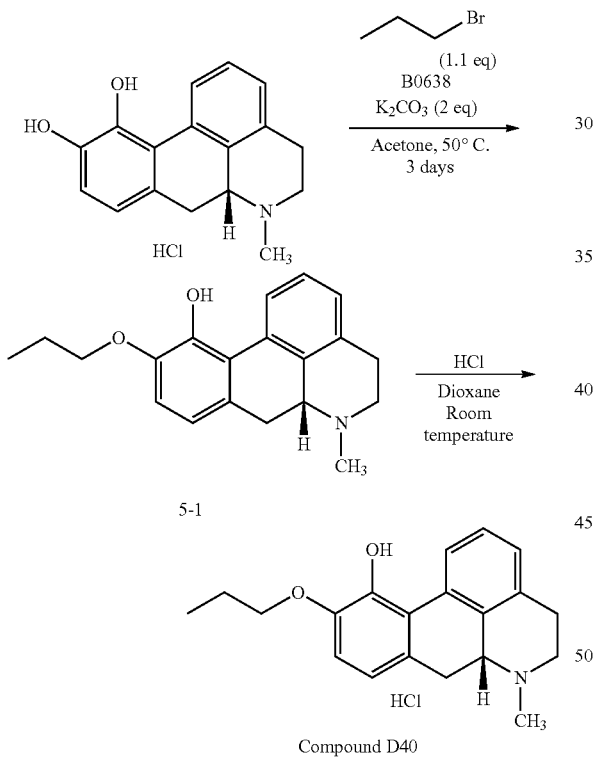

Compound D40

[Formula 10]

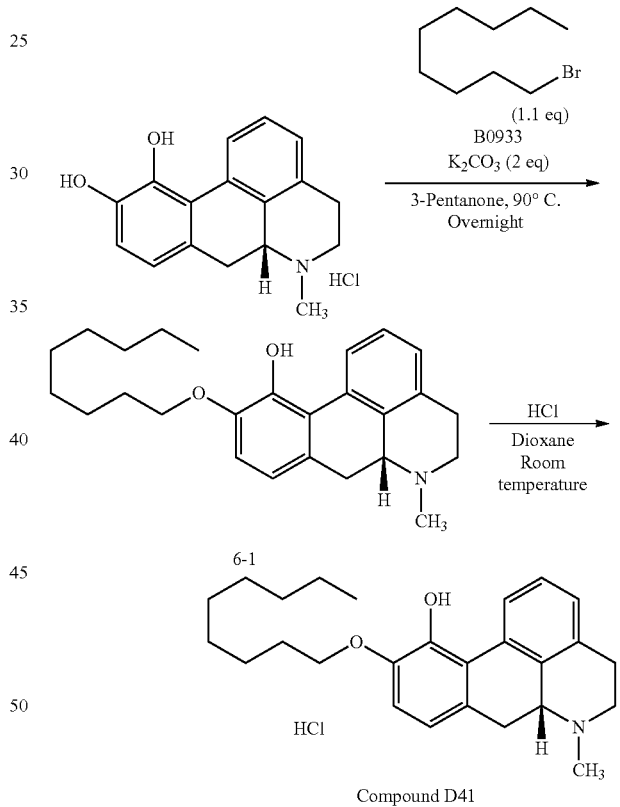

Compound D41

Under nitrogen stream, deaerated acetone (5 mL) and 1-bromopropane (0.165 mL, 1.81 mmol) were added to apomorphine hydrochloride 0.5-hydrate (500 mg, 1.65 mmol) and potassium carbonate (0.46 g, 3.3 mmol), and the mixture was heated at 50° C. for 3 days. After being allowed to cool, the reaction solution was filtered through celite, and the filtrate was concentrated under reduced pressure. The obtained residue was purified by medium-pressure preparative silica gel column chromatography (30 g of NH silica gel, hexane/ethyl acetate=95/5 to 80/20). The obtained compound 5-1 was dissolved by the addition of a solution of approximately 4 M hydrogen chloride in 1,4-dioxane (2

Figure 26:
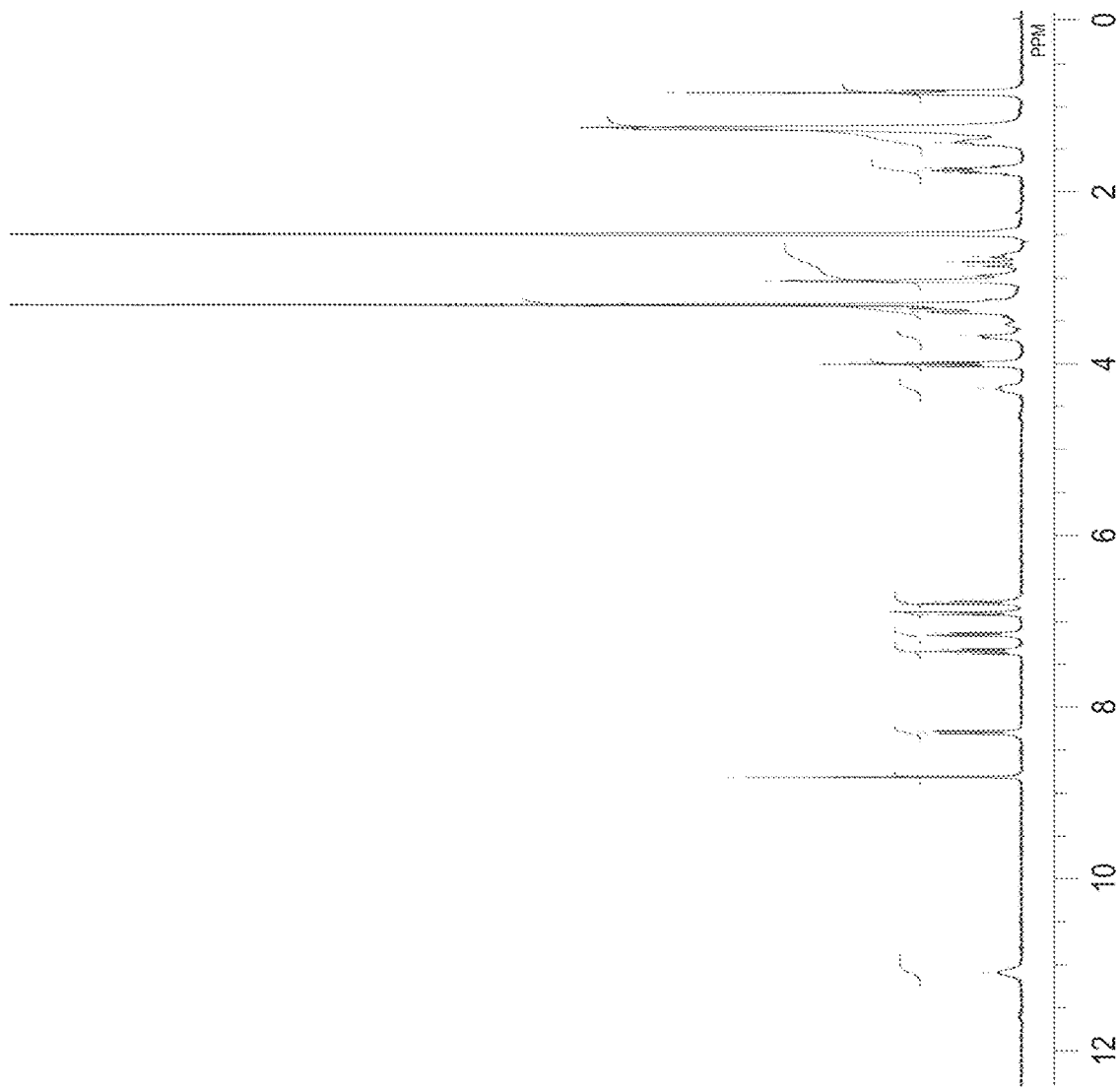
FIG. 26 shows the 270 MHz $^1$H-NMR spectrum of compound D41 measured in DMSO-d6.
Figure 27:
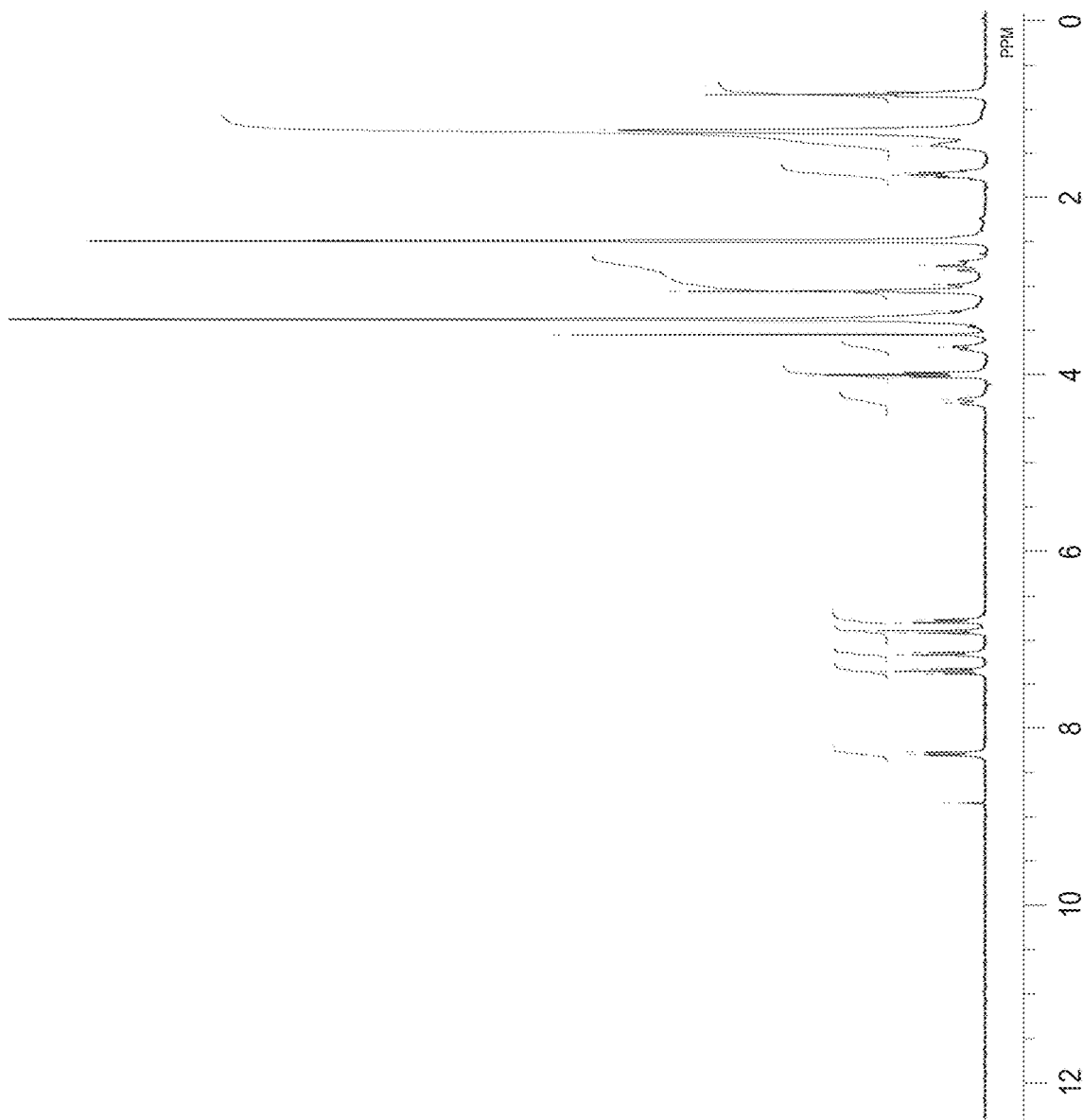
FIG. 27 shows the 270 MHz $^1$H-NMR spectrum of compound D41 measured in DMSO-d6 containing $D_2O$.
Figure 28:
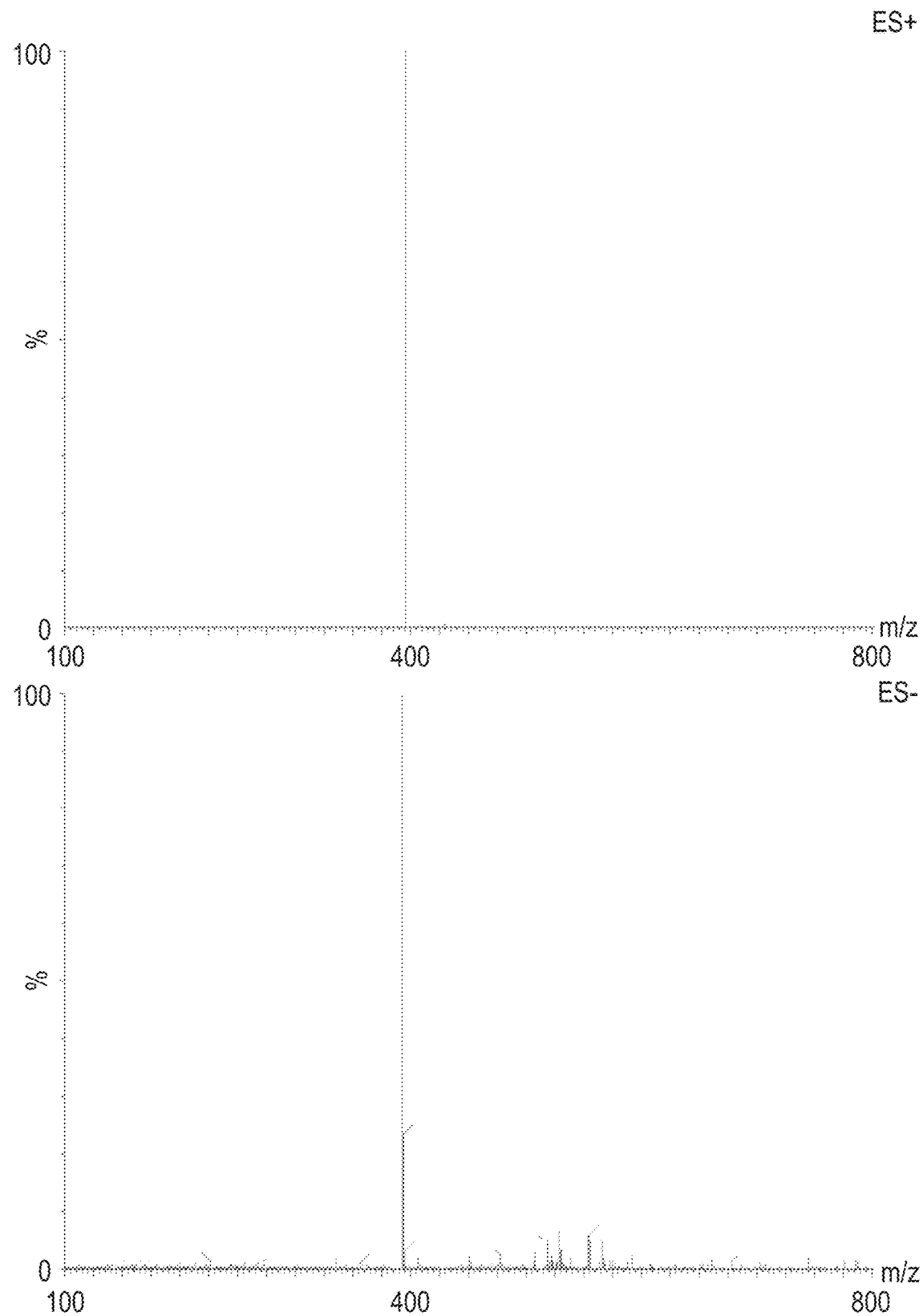
FIG. 28 shows the ESI-MS spectrum (upper: cation mode, lower: anion mode) of compound D41.

Under nitrogen stream, deaerated 3-pentanone (5 mL) and 1-bromononane (0.32 mL, 1.8 mmol) were added to apomorphine hydrochloride 0.5-hydrate (500 mg, 1.65 mmol) and potassium carbonate (0.46 g, 3.3 mmol), and the mixture was heated overnight (20 hours) at 90° C. After being allowed to cool, the reaction solution was filtered through celite, and the filtrate was concentrated under reduced pressure. The obtained residue was purified by medium-pressure preparative silica gel column chromatography (30 g of NH silica gel, hexane/ethyl acetate=95/5 to 80/20). The obtained compound 6-1 was dissolved by the addition of a solution of approximately 4 M hydrogen chloride in 1,4-dioxane (2 mL), and the solution was concentrated under reduced pressure to obtain compound D41 (0.251 g, 0.584 mmol, yield: 35%) as a white solid. FIG. 26 shows the 270 MHz $^1$H-NMR spectrum of the compound D41 measured in DMSO-d6, FIG. 27 shows the 270 MHz $^1$H-NMR spectrum of the compound D41 measured in deuterated DMSO-d6 containing D$_2$O, and FIG. 28 shows the ESI-MS spectrum (upper: cation mode, lower: anion mode) of the compound D41.

Molecular formula: $C_{26}H_{36}ClNO_2$ (HCl salt)
Molecular weight: 430.03 (HCl salt)
LRMS: $C_{26}H_{34}NO_2$ calcd [M−H]$^-$392.26, found: 392.8
$^1$H NMR (270 MHz, DMSO-d6): δ 11.09 (brs, 1H), 8.81 (s, 1H), 8.30 (d, J=8.1 Hz, 1H), 7.35 (t, J=8.1 Hz, 1H), 7.16 (d, J=8.1 Hz, 1H), 6.92 (d, J=8.1 Hz, 1H), 6.79 (d, J=8.1 Hz, 1H), 4.30 (m, 1H), 4.01 (t, J=5.4 Hz, 2H), 3.69 (m, 1H), 3.59-2.65 (m, 5H), 3.03 (s, 3H), 1.76 (m, 2H), 1.49-1.15 (m, 12H), 0.85 (t, J=8.1 Hz, 3H).

[II-7: Synthesis of Compound D42]

[Formula 11]

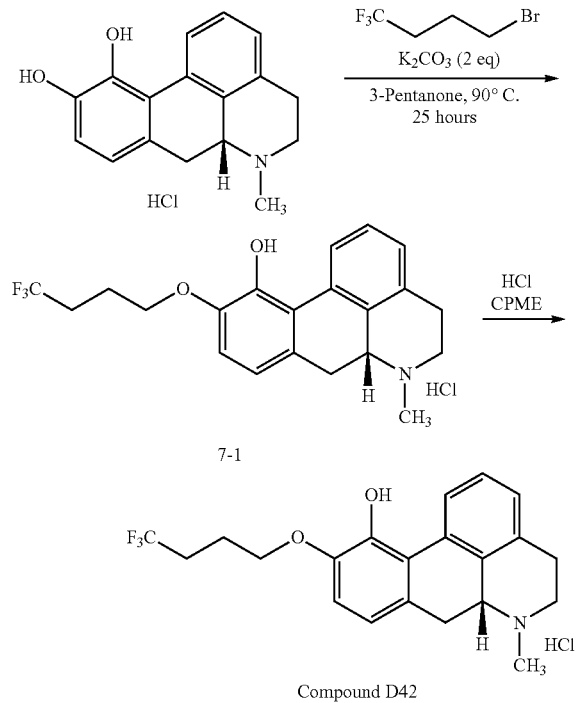

Compound D42

Figure 29:
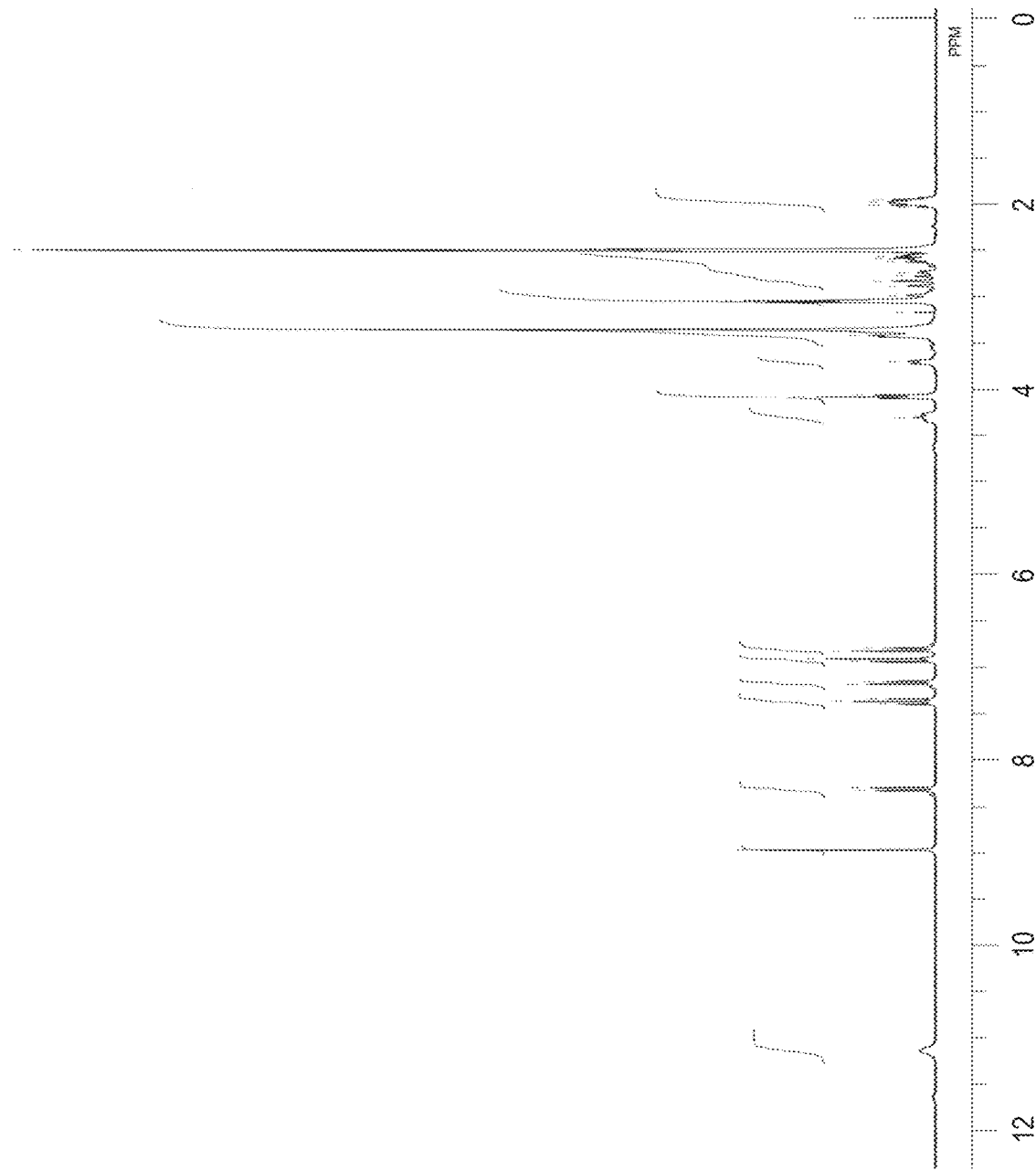
FIG. 29 shows the 270 MHz $^1$H-NMR spectrum of compound D42 measured in DMSO-d6.
Figure 30:
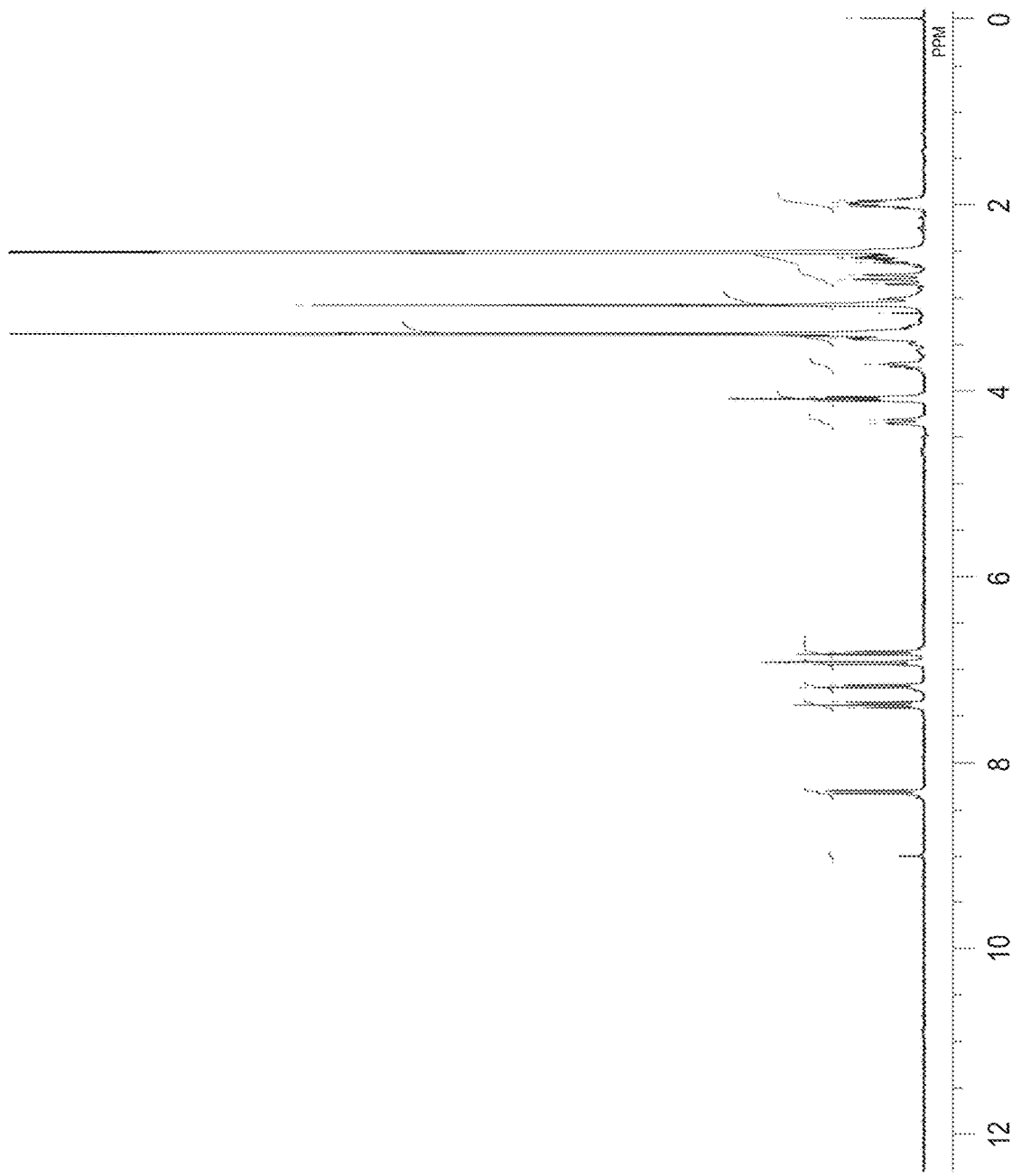
FIG. 30 shows the 270 MHz $^1$H-NMR spectrum of compound D42 measured in DMSO-d6 containing $D_2O$.
Figure 31:
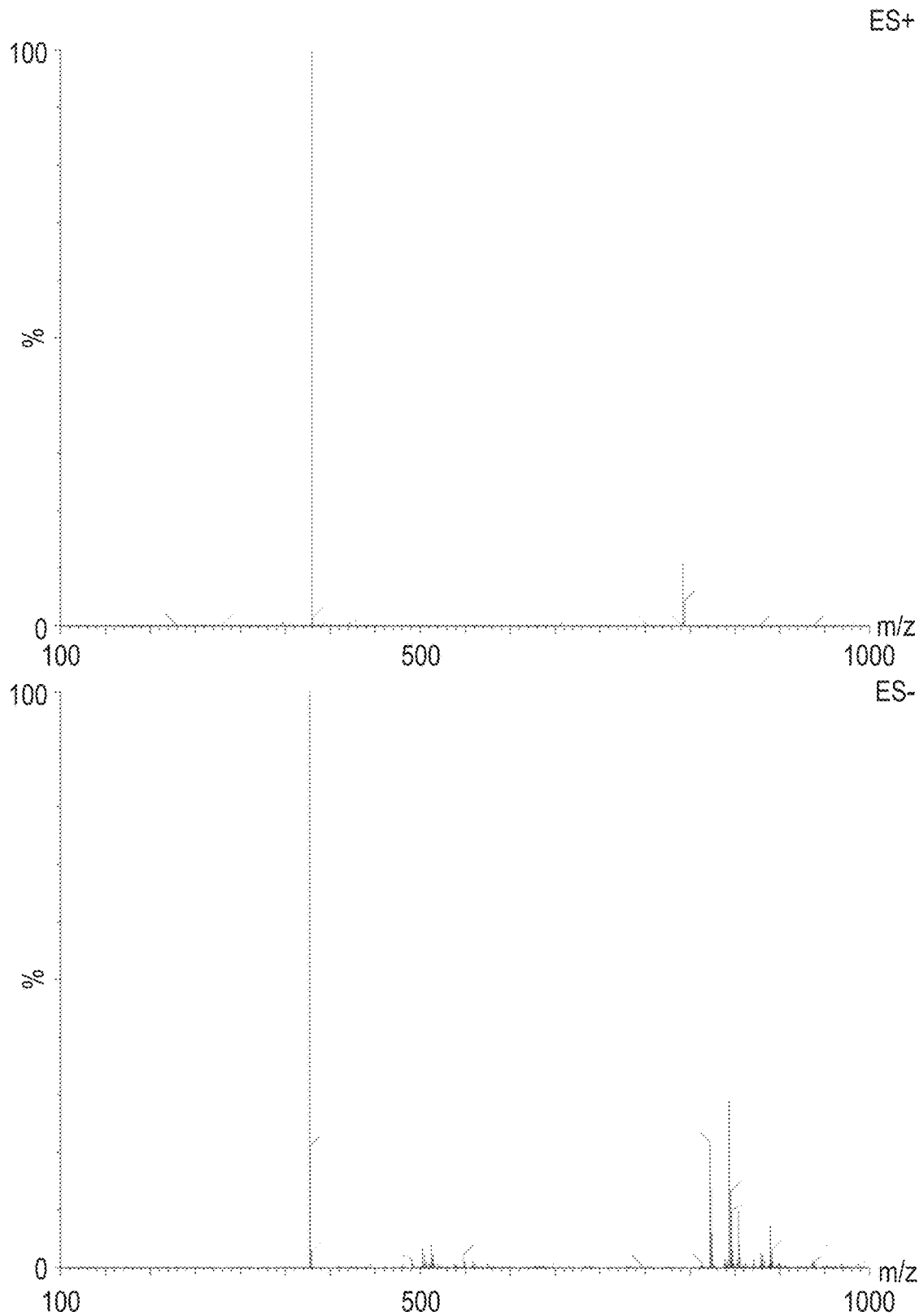
FIG. 31 shows the ESI-MS spectrum (upper: cation mode, lower: anion mode) of compound D42.

Under nitrogen stream, deaerated 3-pentanone (5 mL) and 1,1,1-trifluoro-4-bromobutane (0.22 mL, 1.8 mmol) were added to apomorphine hydrochloride 0.5-hydrate (0.50 g, 1.7 mmol) and potassium carbonate (0.46 g, 3.3 mmol), and the mixture was heated at 90° C. for 25 hours. After being allowed to cool, the reaction solution was filtered through celite, and the filtrate was concentrated under reduced pressure. The obtained residue was purified by medium-pressure preparative silica gel column chromatography (30 g of NH silica gel, hexane/ethyl acetate=95/5 to 80/20). To the obtained compound 7-1, a solution of approximately 4 M hydrogen chloride in cyclopentyl methyl ether (10 mL) was added, and the deposited solid was collected by filtration to obtain compound D42 (0.17 g, 0.42 mmol, yield: 25%) as a white solid. FIG. 29 shows the 270 MHz $^1$H-NMR spectrum of the compound D42 measured in DMSO-d6, FIG. 30 shows the 270 MHz $^1$H-NMR spectrum of the compound D42 measured in deuterated DMSO-d6 containing D$_2$O, and FIG. 31 shows the ESI-MS spectrum (upper: cation mode, lower: anion mode) of the compound D42.

Molecular formula: $C_{21}H_{23}ClF_3NO_2$ (HCl salt)
Molecular weight: 413.87 (HCl salt)
LRMS: $C_{21}H_{23}F_3NO_2$ calcd [M+H]$^+$ 378.17, found: 378.8
$^1$H NMR (270 MHz, DMSO-d6): δ 11.14 (brs, 1H), 8.98 (s, 1H), 8.32 (d, J=8.1 Hz, 1H), 7.37 (t, J=8.1 Hz, 1H), 7.18 (d, J=8.1 Hz, 1H), 6.93 (d, J=8.1 Hz, 1H), 6.82 (d, J=8.1 Hz, 1H), 4.31 (m, 1H), 4.08 (t, J=5.4 Hz, 2H), 3.70 (m, 1H), 3.45-2.51 (m, 10H), 1.98 (m, 2H).

[II-8: Synthesis of Compound D48]

[Formula 12]

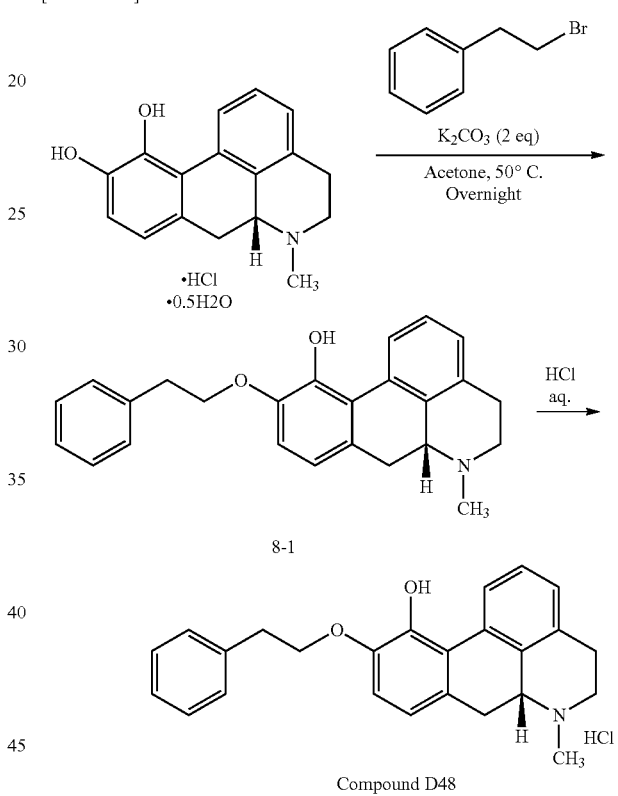

Compound D48

Under nitrogen stream, deaerated acetone (5 mL) and phenethyl bromide (3.60 mL, 26.7 mmol) were added to apomorphine hydrochloride 0.5-hydrate (0.50 g, 1.7 mmol) and potassium carbonate (0.42 g, 3.3 mmol). While the mixture was heated at 50° C., phenethyl bromide was added in divided portions until the starting materials disappeared. After being allowed to cool, the reaction solution was filtered through celite, and the filtrate was concentrated under reduced pressure. The obtained residue was purified by medium-pressure preparative silica gel column chromatography (10 g of NH silica gel, hexane/ethyl acetate=100/0 to 60/40) to obtain compound 8-1. The obtained compound 8-1 was purified by medium-pressure preparative silica gel column chromatography (10 g of ODS silica gel, 1% hydrochloric acid/acetonitrile=60/40) to obtain compound D48 (0.145 g, 0.355 mmol, yield: 21%) as a white solid.

Molecular formula: $C_{25}H_{26}ClNO_2$ (HCl salt)
Molecular weight: 407.94 (HCl salt)
LRMS: $C_{25}H_{26}NO_2$ calcd [M+H]$^+$372.20, found: 372.5

¹H NMR (400 MHz, DMSO-d6): δ 10.91 (brs, 1H), 8.92 (s, 1H), 8.31 (d, J=8.0 Hz, 1H), 7.41-7.35 (m, 3H), 7.32 (t, J=8.0 Hz, 2H), 7.23 (t, J=8.0 Hz, 1H), 7.18 (d, J=8.0 Hz, 1H), 6.97 (d, J=8.0 Hz, 1H), 6.80 (d, J=8.0 Hz, 1H), 4.31 (m, 1H), 4.23 (t, J=8.0 Hz, 2H), 3.71 (m, 1H), 3.47-3.30 (m, 3H), 3.11 (t, J=8.0 Hz, 2H), 3.09-2.96 (m, 1H), 3.06 (s, 3H), 2.84-2.72 (m, 1H).

[II-9: Synthesis of Compound D50]

[Formula 13]

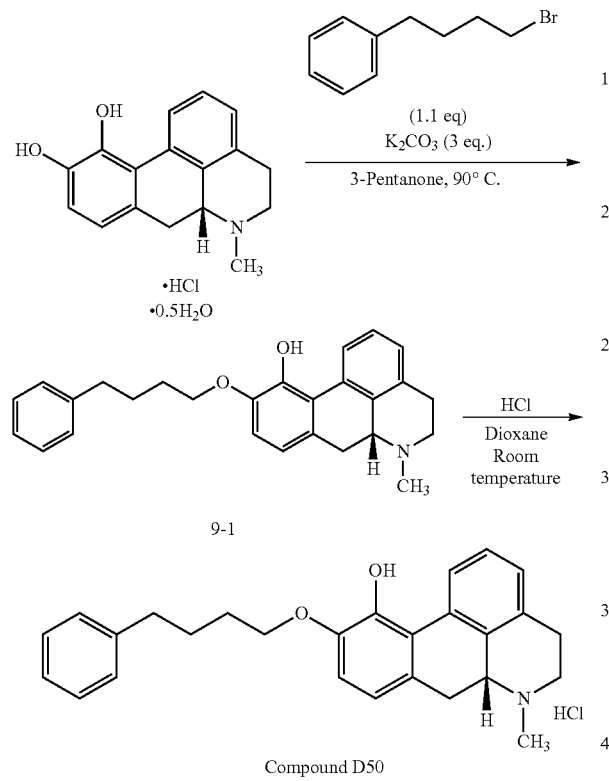

Compound D50

Under nitrogen stream, deaerated 3-pentanone (5 mL) and 4-phenylbutyl bromide (0.295 mL, 1.76 mmol) were added to apomorphine hydrochloride 0.5-hydrate (0.50 g, 1.7 mmol) and potassium carbonate (0.66 g, 4.8 mmol), and the mixture was heated at 90° C. for 18 hours. After being allowed to cool, the reaction solution was separated into organic and aqueous layers by the addition of ethyl acetate and water, and the organic layer was dried over anhydrous sodium sulfate. The organic layer was concentrated under reduced pressure, and the obtained residue was purified by medium-pressure preparative silica gel column chromatography (10 g of NH silica gel, hexane/ethyl acetate=100/0 to 80/20). The obtained compound 9-1 was dissolved in a solution of approximately 4 M hydrogen chloride in dioxane (2 mL), and the solution was concentrated under reduced pressure. The obtained solid was suspended in acetonitrile/isopropyl ether (1/1, 10 mL) and washed to obtain compound D50 (0.16 g, 0.37 mmol, yield: 22%) as a white solid.

Molecular formula: $C_{27}H_{30}ClNO_2$ (HCl salt)

Molecular weight: 435.99 (HCl salt)

LRMS: $C_{27}H_{30}NO_2$ calcd [M+H]⁺400.23, found: 400.8

¹H NMR (270 MHz, DMSO-d6): δ 10.90 (brs, 1H), 8.82 (s, 1H), 8.31 (d, J=8.1 Hz, 1H), 7.42-7.10 (m, 7H), 6.92 (d, J=8.1 Hz, 1H), 6.80 (d, J=8.1 Hz, 1H), 4.32 (m, 1H), 4.05 (m, 2H), 3.71 (m, 1H), 3.47-3.27 (m, 3H), 3.11-2.92 (m, 1H), 3.05 (s, 3H), 2.80 (t, J=13.5 Hz, 1H), 2.65 (t, 2H), 1.83-1.70 (m, 4H).

[II-10: Synthesis of Compound D54]

[Formula 14]

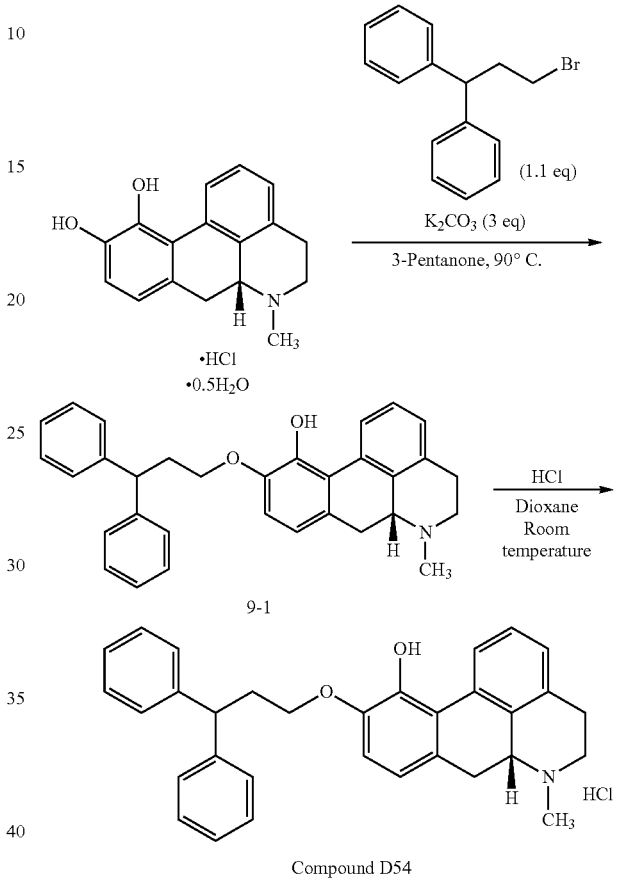

Compound D54

Under nitrogen stream, deaerated 3-pentanone (5 mL) and 3,3-diphenylpropyl bromide (473 mg, 1.72 mmol) were added to apomorphine hydrochloride 0.5-hydrate (0.50 g, 1.7 mmol) and potassium carbonate (0.66 g, 4.8 mmol), and the mixture was heated at 90° C. for 20 hours. After being allowed to cool, the reaction solution was separated into organic and aqueous layers by the addition of methylene chloride and water, and the organic layer was dried over anhydrous sodium sulfate. The organic layer was concentrated under reduced pressure, and the obtained residue was purified by medium-pressure preparative silica gel column chromatography (10 g of NH silica gel, hexane/ethyl acetate=100/0 to 80/20). The obtained compound 10-1 was dissolved in a solution of approximately 4 M hydrogen chloride in dioxane (2 mL), and the solution was concentrated under reduced pressure. The obtained solid was suspended in acetonitrile/isopropyl ether (1/1, 10 mL) and washed to obtain compound D54 (198 mg, 0.398 mmol, yield: 23%) as a white solid.

Molecular formula: $C_{32}H_{32}ClNO_2$ (HCl salt)

Molecular weight: 498.06 (HCl salt)

LRMS: $C_{32}H_{32}NO_2$ calcd [M+H]⁺462.24, found: 462.9

¹H NMR (270 MHz, DMSO-d6): δ 10.96 (brs, 1H), 8.91 (s, 1H), 8.34 (d, J=8.1 Hz, 1H), 7.42-7.23 (m, 9H), 7.22-7.12

(m, 3H), 6.75 (m, 2H), 4.42 (t, J=8.1 Hz, 1H), 4.30 (m, 1H), 3.90 (t, J=5.4 Hz, 2H), 3.70 (m, 1H), 3.46-3.27 (m, 3H), 3.09-2.93 (m, 1H), 3.04 (s, 3H), 2.79 (t, J=13.5 Hz, 1H), 2.59-2.45 (m, 2H).

[II-11: Synthesis of Compound D55]

[Formula 15]

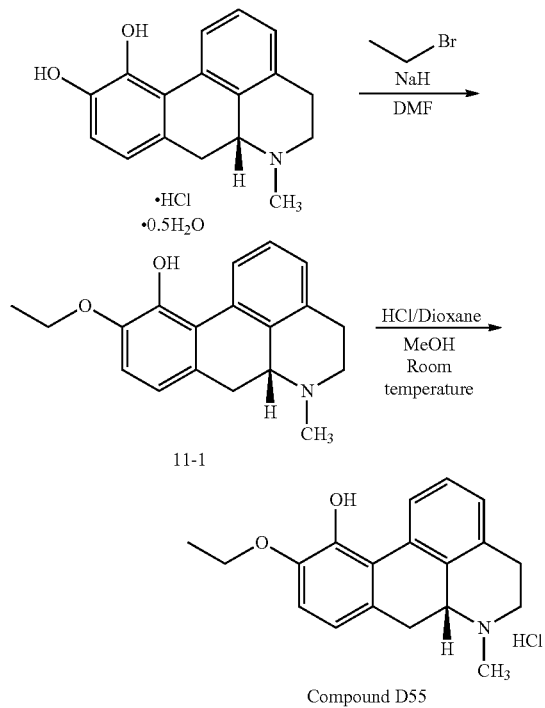

Under nitrogen stream, apomorphine hydrochloride 0.5-hydrate (0.70 g, 2.2 mmol) was dissolved in DMF (3 mL), and sodium hydride (60%, dispersed in liquid paraffin) (0.26 g, 11 mmol) was added to the solution under ice cooling. After 30 minutes, bromoethane (0.18 mL, 2.4 mmol) was added to the reaction solution, and the mixture was stirred at room temperature for 1 hour. Bromoethane (0.05 mL, 0.66 mmol) was further added to the reaction solution. When the starting materials disappeared, the reaction solution was separated into organic and aqueous layers by the addition of water and methylene chloride. The organic layer was dried over anhydrous sodium sulfate and concentrated under reduced pressure, and the obtained residue was subjected to medium-pressure preparative silica gel column chromatography (30 g of NH silica gel, hexane/ethyl acetate=100/0 to 75/25) to obtain a partially purified product of compound 11-1. This product was purified by medium-pressure preparative silica gel column chromatography (30 g of ODS silica gel, 1% hydrochloric acid/acetonitrile=70/30). The obtained purified product was dissolved in methanol (2 mL), and a solution of approximately 4 M hydrogen chloride in 1,4-dioxane (1 mL) was added to the solution. The solution was concentrated under reduced pressure to obtain compound D55 (208 mg, 0.626 mmol, yield: 28%) as a white solid.

Molecular formula: $C_{19}H_{22}ClNO_2$ (HCl salt)
Molecular weight: 331.84 (HCl salt)
LRMS: $C_{19}H_{22}NO_2$ calcd $[M+H]^+$296.17, found: 296.8
$^1H$ NMR (270 MHz, DMSO-d6): δ 11.00 (brs, 1H), 8.91 (s, 1H), 8.31 (d, J=8.1 Hz, 1H), 7.37 (t, J=8.1 Hz, 1H), 7.17 (d, J=8.1 Hz, 1H), 6.94 (d, J=8.1 Hz, 1H), 6.81 (d, J=8.1 Hz, 1H), 4.32 (m, 1H), 4.10 (q, J=8.1 Hz, 2H), 3.71 (m, 1H), 3.49-3.26 (m, 3H), 3.11-2.94 (m, 1H), 3.05 (s, 3H), 2.01 (t, J=12.5 Hz, 1H), 1.38 (t, J=8.1 Hz, 3H).

<Test III: Ferroptosis Inhibitory Effect of Apomorphine Derivative>

A suppressive effect on cell death induced by various ferroptosis inducers was evaluated by the same procedures as in Test I except that the test compounds shown in Table 2 were used instead of apomorphine in the coaddition. Apomorphine and idebenone approved as a therapeutic drug for Leber's hereditary optic neuropathy in the Europe were used as control drugs.

Figure 32:
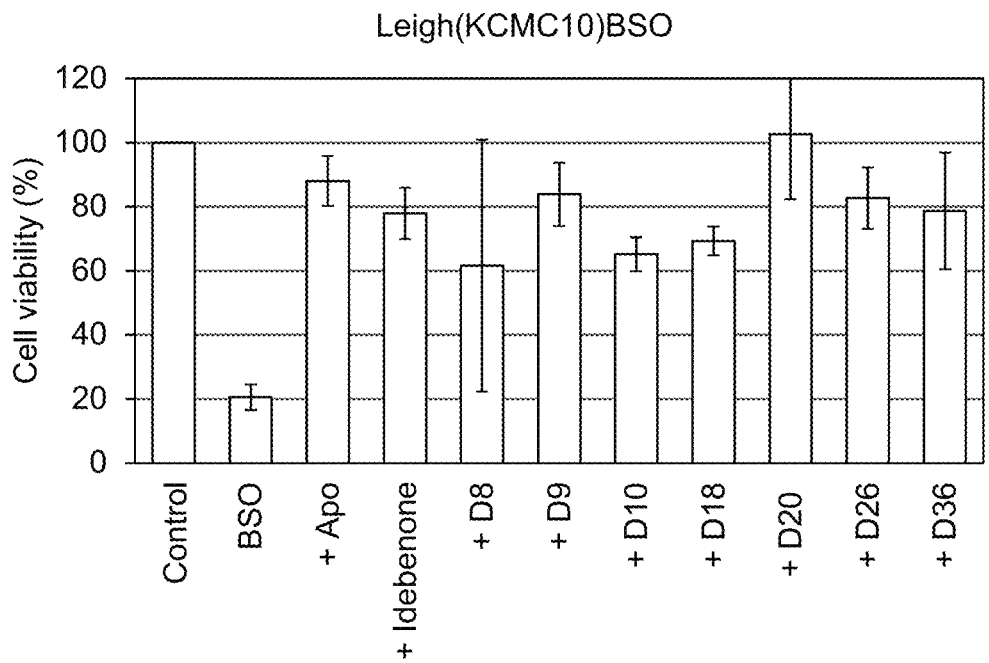
FIG. 32 is a graph showing results of Test III in which a ferroptosis inducer BSO and a test compound were coadded to Leigh syndrome patient cells (KCMC10) and evaluated for a suppressive effect on cell death induced by BSO. In the drawing, A depicts the results obtained using compounds D8, D9, D10, D18, D20, D26, and D36, and B depicts the results obtained using compounds D37, D38, D39, D40, D41, D42, and D43. In the drawing, the abscissa depicts test compounds, and the ordinate depicts the cell viability (%) of each treated plot when the number of live cells in a control non-supplemented with BSO is defined as 100%. The values in the drawing represent mean±standard deviation.
Figure 32:
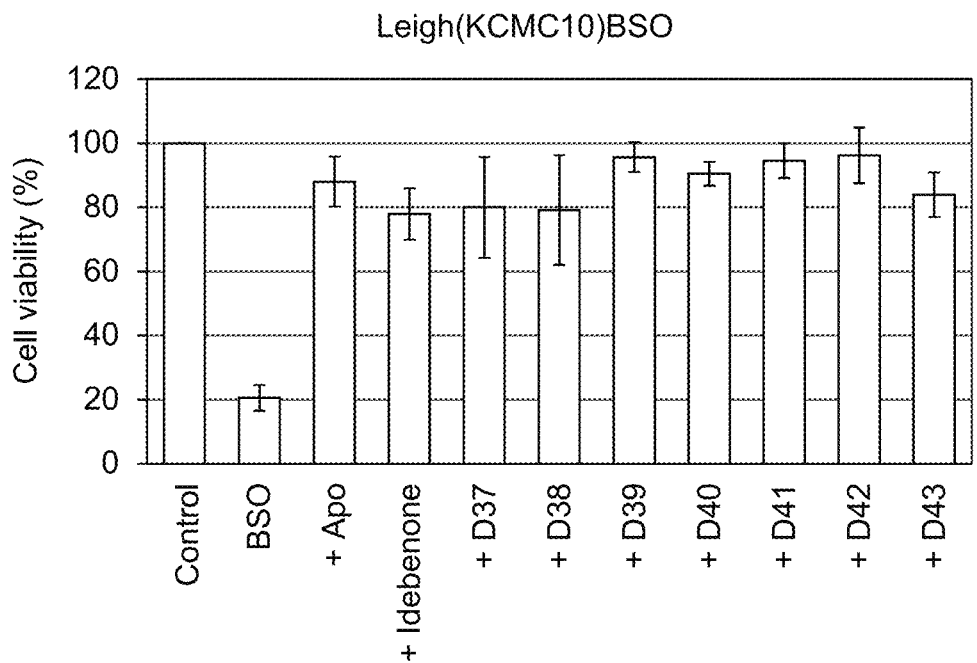

The ferroptosis inducer BSO and each test compound were coadded to Leigh syndrome patient cells (KCMC10) and evaluated for a suppressive effect on cell death induced by BSO. The results are shown in FIG. 32. In the drawing, A depicts the results obtained using compounds D8, D9, D10, D18, D20, D26, and D36, and B depicts the results obtained using compounds D37, D38, D39, D40, D41, D42, and D43. In the drawing, the abscissa depicts test compounds, and the ordinate depicts the cell viability (%) of each treated plot when the number of live cells in a control non-supplemented with BSO is defined as 100%. The values in the drawing represent mean±standard deviation. In relation to the test compounds, "Control" represents a control non-supplemented with BSO, "BSO" represents a control supplemented with 100 μM BSO and non-supplemented with the test compounds, and "+Apo" and "+idebenone" represent controls supplemented with BSO and supplemented with apomorphine or idebenone, and "+D8" or the like represents the coaddition of BSO and the compound D8 or the like.

Figure 33:
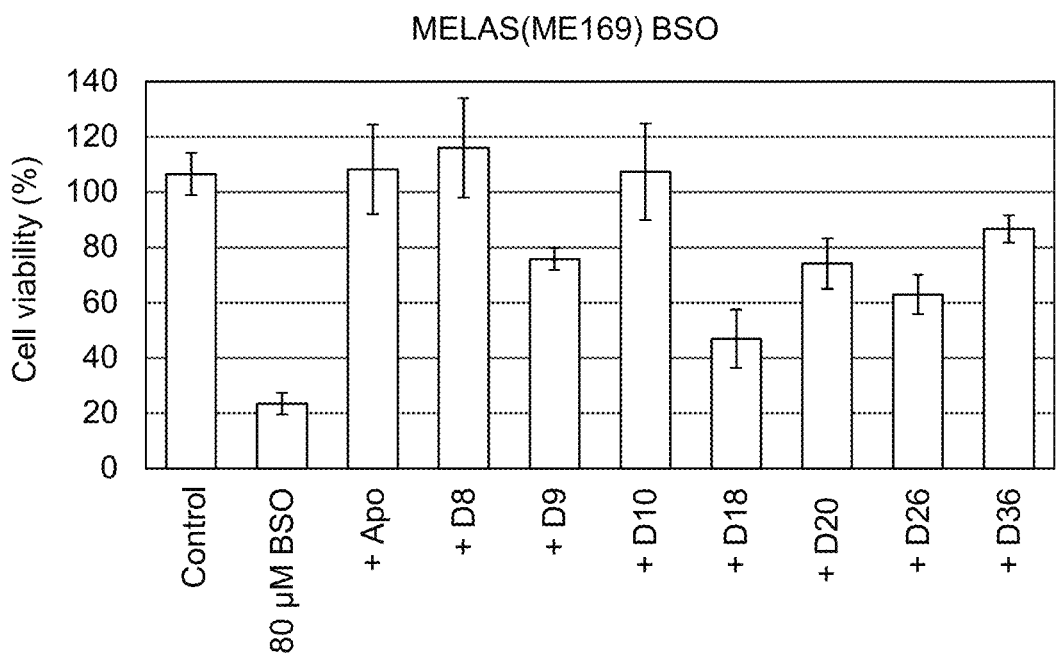
FIG. 33 is a graph showing results of Test III in which a ferroptosis inducer BSO and a test compound were coadded to MELAS patient cells (ME169) and evaluated for a suppressive effect on cell death induced by BSO. In the drawing, A depicts the results obtained using compounds D8, D9, D10, D18, D20, D26, and D36, and B depicts the results obtained using compounds D37, D38, D39, D40, D41, D42, and D43. In the drawing, the abscissa depicts test compounds, and the ordinate depicts the cell viability (%) of each treated plot when the number of live cells in a control non-supplemented with BSO is defined as 100%. The values in the drawing represent mean±standard deviation.
Figure 33:
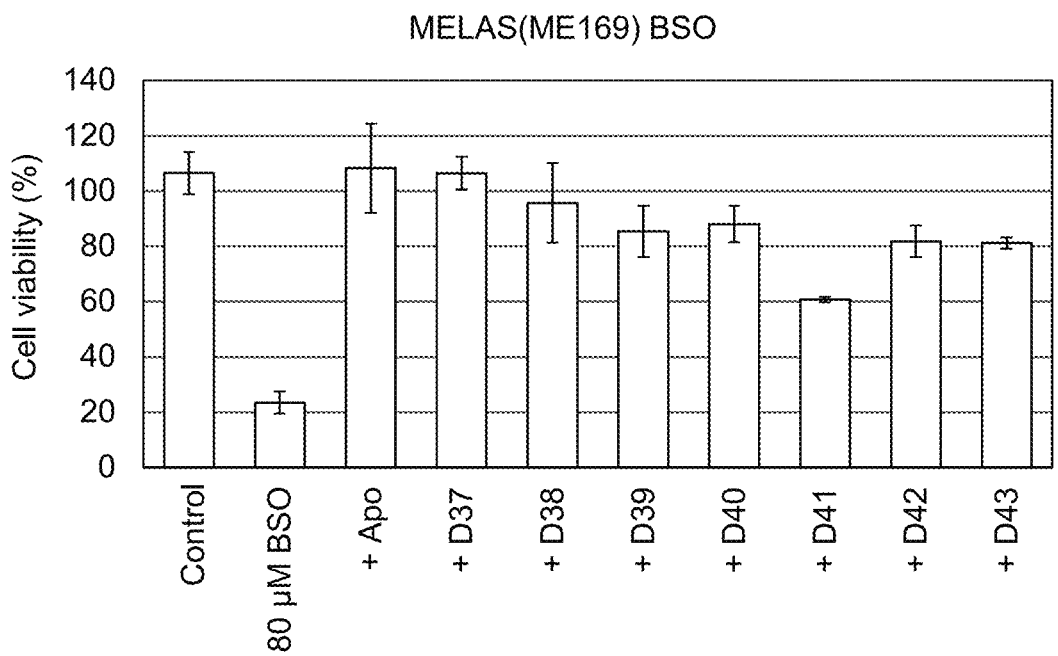

The ferroptosis inducer BSO and each test compound were coadded to MELAS patient cells (ME169) and evaluated for a suppressive effect on cell death induced by BSO. The results are shown in FIG. 33. In the drawing, A depicts the results obtained using compounds D8, D9, D10, D18, D20, D26, and D36, and B depicts the results obtained using compounds D37, D38, D39, D40, D41, D42, and D43. In the drawing, the abscissa depicts test compounds, and the ordinate depicts the cell viability (%) of each treated plot when the number of live cells in a control non-supplemented with BSO is defined as 100%. The values in the drawing represent mean±standard deviation. In relation to the test compounds, "Control" represents a control non-supplemented with BSO, "BSO" represents a control supplemented with 80 μM BSO and non-supplemented with the test compounds, and "+Apo" represents a control supplemented with BSO and supplemented with apomorphine, and "+D8" or the like represents the coaddition of BSO and the compound D8 or the like.

Figure 34:
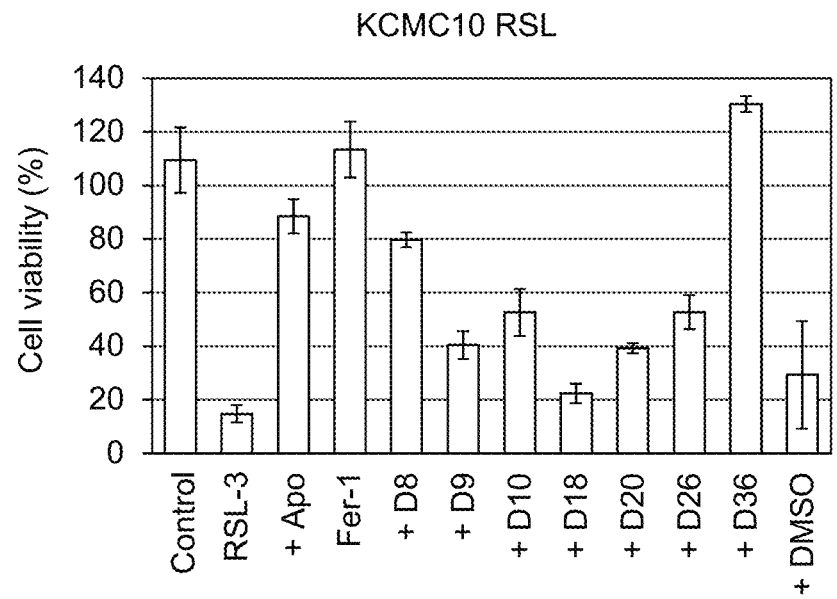
FIG. 34 is a graph showing results of Test III in which a ferroptosis inducer RSL-3 and a test compound were coadded to Leigh syndrome patient cells (KCMC10) and evaluated for a suppressive effect on cell death induced by RSL-3. In the drawing, A depicts the results obtained using compounds D8, D9, D10, D18, D20, D26, and D36, and B depicts the results obtained using compounds D37, D38, D39, D40, D41, D42, and D43. In the drawing, the abscissa depicts test compounds, and the ordinate depicts the cell viability (%) of each treated plot when the number of live cells in a control non-supplemented with RSL-3 is defined as 100%. The values in the drawing represent mean±standard deviation.
Figure 34:
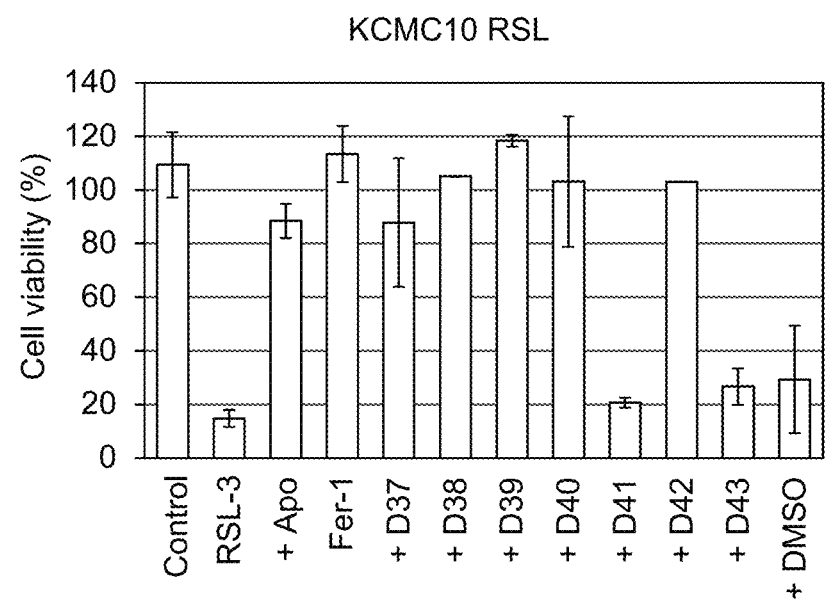

The ferroptosis inducer RSL-3 and each test compound were coadded to Leigh syndrome patient cells (KCMC10) and evaluated for a suppressive effect on cell death induced by RSL-3. The results are shown in FIG. 34. In the drawing, A depicts the results obtained using compounds D8, D9, D10, D18, D20, D26, and D36, and B depicts the results obtained using compounds D37, D38, D39, D40, D41, D42, and D43. In the drawing, the abscissa depicts test compounds, and the ordinate depicts the cell viability (%) of each treated plot when the number of live cells in a control non-supplemented with RSL-3 is defined as 100%. The values in the drawing represent mean±standard deviation. In relation to the test compounds, "Control" represents a control non-supplemented with RSL-3, "100 nM RSL-3" represents a control supplemented with 100 nM RSL-3 and non-supplemented with the test compounds, and "+Apo" and "+Fer-1" represent controls supplemented with RSL-3 and supplemented with apomorphine or Fer-1, and "+D8" or the like represents the coaddition of RSL-3 and the compound D8 or the like.

Figure 35:
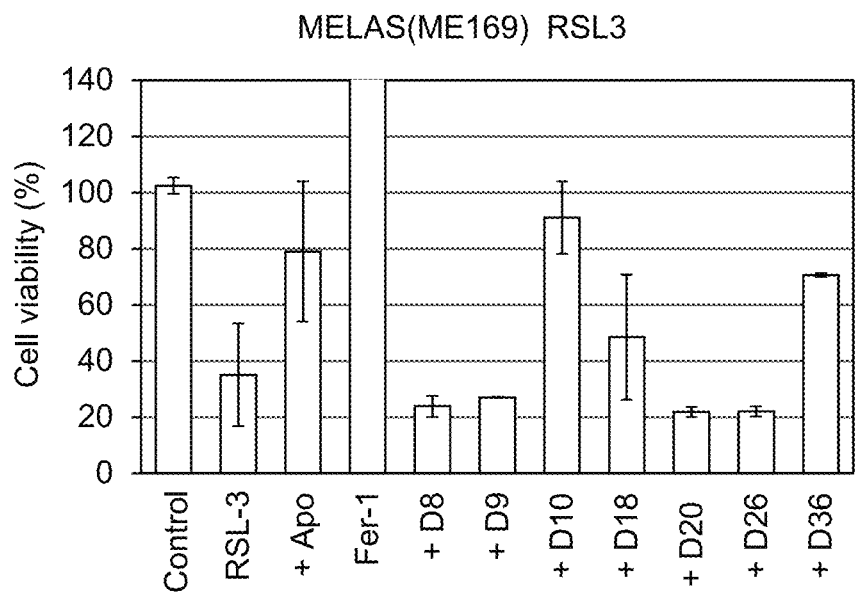
FIG. 35 is a graph showing results of Test III in which a ferroptosis inducer RSL-3 and a test compound were coadded to MELAS patient cells (ME169) and evaluated for a suppressive effect on cell death induced by RSL-3. In the drawing, A depicts the results obtained using compounds D8, D9, D10, D18, D20, D26, and D36, and B depicts the results obtained using compounds D37, D38, D39, D40, D41, D42, and D43. In the drawing, the abscissa depicts test compounds, and the ordinate depicts the cell viability (%) of each treated plot when the number of live cells in a control non-supplemented with RSL-3 is defined as 100%. The values in the drawing represent mean±standard deviation.
Figure 35:
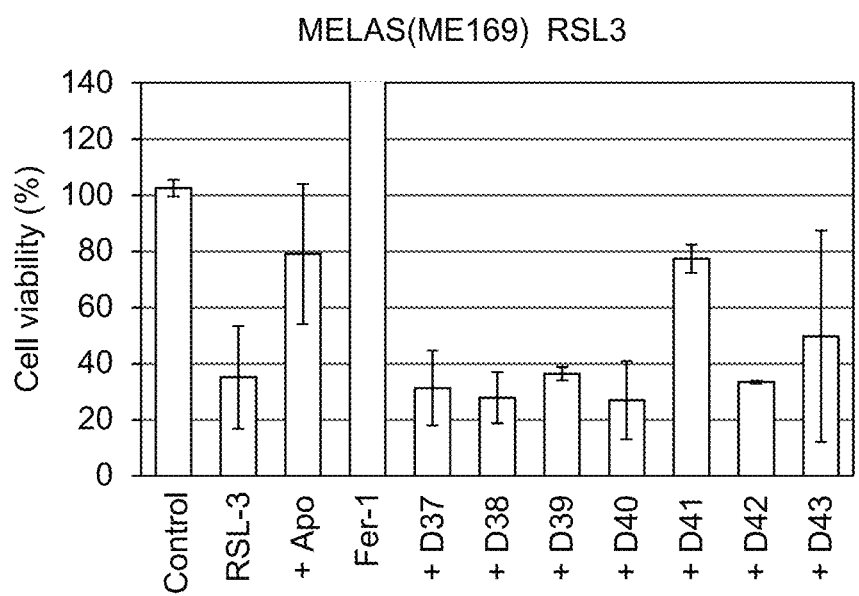

The ferroptosis inducer RSL-3 and each test compound were coadded to MELAS patient cells (ME169) and evaluated for a suppressive effect on cell death induced by RSL-3. The results are shown in FIG. 35. In the drawing, A depicts the results obtained using compounds D8, D9, D10, D18, D20, D26, and D36, and B depicts the results obtained using compounds D37, D38, D39, D40, D41, D42, and D43. In the drawing, the abscissa depicts test compounds, and the ordinate depicts the cell viability (%) of each treated plot when the number of live cells in a control non-supplemented with RSL-3 is defined as 100%. The values in the drawing represent mean±standard deviation. In relation to the test compounds, "Control" represents a control non-supplemented with RSL-3, "100 nM RSL-3" represents a control supplemented with 100 nM RSL-3 and non-supplemented with the test compounds, and "+Apo" and "+Fer-1" represent controls supplemented with RSL-3 and supplemented with apomorphine or Fer-1, and "+D8" or the like represents the coaddition of RSL-3 and the compound D8 or the like.

As shown in FIGS. 32 and 33, all the compounds D8, D9, D10, D18, D20, D26, and D36 markedly suppressed cell death ascribable to ferroptosis induced by BSO in the Leigh syndrome patient cells (KCMC10) and the MELAS patient cells (ME169). As shown in FIGS. 34 and 35, these compounds also suppressed cell death ascribable to ferroptosis induced by RSL-3 in the Leigh syndrome patient cells (KCMC10) and the MELAS patient cells (ME169).

Table 3 shows the 50% effective concentrations of the suppressive effects of the compounds D8, D9, D10, D18, D20, D26, D36, D37, D38, D39, D40, D41, D42, D43, D45, D47, D48, D50, D54, and D55 on cell death ascribable to ferroptosis induced by BSO in the Leigh syndrome patient cells (KCMC10).

TABLE 3

| Test compound | EC50 (nM) |
|---|---|
| D8 | 180 |
| D9 | 393 |
| D10 | 750 |
| D18 | 492 |
| D20 | 798 |
| D26 | 289 |
| D36 | 123 |
| D37 | 186 |
| D38 | 165 |
| D39 | 259 |
| D40 | 55 |
| D41 | 648 |
| D42 | 167 |
| D43 | 223 |
| D45 | 96 |
| D47 | 124 |
| D48 | 128 |
| D50 | 207 |
| D54 | 497 |
| D55 | 4 |

As shown in Table 3, the compounds D55, D40, D45, D36, D47, D48, D38, D42, D8, and D37 exhibited a particularly low $EC_{50}$ value and were therefore found to have a particularly high ferroptosis inhibitory effect.

<Test IV: Dopamine D2 Receptor Binding Activity of Novel Ferroptosis Inhibitor>

In this test, the dopamine D2 receptor binding activity of each test compound was measured using GeneBLAzer D2-Gqo5-NEAT-bla CHO-K1 Cell-based Assay (Thermo Fisher Scientific, Inc.). The CHO cells are designed such that a signal transduction pathway is activated by addition of a drug to express a reporter gene (P lactamase). By the action of the expressed R lactamase, a Forster resonance energy transfer (FRET) substrate shifts from green fluorescence (520 nm) to blue fluorescence (447 nm). Therefore, the binding activity of the test compound can be measured by measuring a blue fluorescence/green fluorescence ratio. The CHO cells were inoculated at 10,000 cells/well to a 384-well plate and cultured for 16 to 20 hours in a $CO_2$ incubator. Serially diluted solutions of each of the test compound and an agonist (apomorphine) were added to the cells, which were then cultured for 5 hours in a $CO_2$ incubator. A substrate mix was added to the cells and incubated at room temperature for 2 hours. Then, green fluorescence and blue fluorescence were measured using Multimode Plate Reader EnVision 2105 (Perkin Elmer, Inc.), and a blue fluorescence/green fluorescence ratio was calculated. The respective $EC_{50}$ values of the test compounds were determined from the measured fluorescence ratios using GraphPad Prism 8.

Table 4 shows the dopamine D2 receptor binding activity of the test compounds used. In the table, "++" in activity intensity represents the same level as the EC50 value of the binding activity of apomorphine, "±" represents that weak binding activity was confirmed, and "−" represents that no binding activity was confirmed.

TABLE 4

| | Dopamine D2 receptor binding activity | |
|---|---|---|
| Test compound | EC50 (nM) | Activity intensity |
| Apomorphine | 35.1 | ++ |
| D8 | | − |
| D9 | | − |
| D10 | | − |
| D18 | | − |
| D20 | | − |
| D26 | | − |
| D36 | | − |
| D37 | | − |
| D38 | | ± |
| D39 | | − |
| D40 | | − |
| D41 | | − |
| D42 | | − |
| D43 | | − |
| D45 | | ± |
| D47 | | − |
| D48 | | − |
| D50 | | − |
| D54 | | − |
| D55 | | − |

As shown in Table 4, all the compounds D8, D9, D10, D18, D20, D26, D36, D37, D38, D39, D40, D41, D42, D43, D45, D47, D48, D50, D54, and D55 were confirmed to have no or little dopamine D2 receptor binding activity.

Apomorphine serves as a dopamine receptor agonist and has been approved and clinically used as a therapeutic drug for off periods of Parkinson's disease. However, apomorphine, when used as a therapeutic drug for a mitochondrial disease, might be accompanied by adverse reactions such as emetic action caused by the dopamine receptor agonist activity. By contrast, the test compounds described above have no dopamine D2 receptor binding activity and as such, can presumably be used as an active ingredient for a medicament having few adverse reactions such as the emetic action.

<Test V: Ferroptosis Inhibitory Effect of Apomorphine Derivative in Liver Cancer Cell System>

In this test, a suppressive effect on cell death induced by a ferroptosis inducer was evaluated in a liver cancer cell system. The ferroptosis inducer used was RSL-3. Apomorphine (Apo) and ferrostatin-1 (Fer-1) were used as control drugs.

A human liver cancer cell line (Huh7) to be used in the test was inoculated to a 96-well plate for cell culture and cultured in a carbon dioxide incubator (37° C., 5% $CO_2$). The maintenance medium used was a medium containing DMEM and 10% FBS, and the medium for the test used was a serum-free DMEM medium. At the stage where 70% confluency was attained, the medium was replaced with the medium for the test, and DMSO or each test compound (final concentration of GSK872: 5 µM, and final concentration of the other compounds: 1 µM) was added to the cells in each well, which were then cultured for 1 hour. Then, the ferroptosis inducer (final concentration: 0.5 µM) was added to the cells in each well, which were then cultured for 24 hours. After the completion of culture, cell death suppressive activity was measured with lactate dehydrogenase (LDH) activity as an index while cell proliferation and cell viability were measured with activity of reducing yellow tetrazolium salt (MTT) into formazan as an index.

Table 5 shows the LDH activity and MTT values of the test compounds used. The values in the table are relative values when the LDH activity and MTT value of a control non-supplemented with RSL-3 are each defined as 1.

TABLE 5

| Test compound | LDH | MTT |
| --- | --- | --- |
| Control | 1 | 1 |
| RSL-3 | 10.67 | 0.45 |
| GSK872 | 10.84 | 0.38 |
| v-VAD | 11.80 | 0.41 |
| Fer-1 | 2.50 | 0.86 |
| Apo | 1.82 | 0.67 |
| D8 | 2.46 | 0.56 |
| D26 | 4.85 | 0.58 |
| D36 | 0.91 | 0.81 |
| D37 | 0.85 | 0.80 |
| D38 | 1.66 | 0.81 |
| D39 | 1.15 | 0.80 |
| D40 | 1.15 | 0.84 |
| D42 | 1.55 | 0.82 |
| D43 | 6.52 | 0.49 |
| D45 | 0.43 | 0.77 |
| D47 | 0.39 | 0.71 |
| D48 | 0.44 | 0.78 |
| D50 | 0.43 | 0.60 |
| D54 | 0.43 | 0.68 |
| D55 | 0.44 | 0.78 |

As shown in Table 5, cell death was induced by the addition of RSL-3 whereas this cell death was suppressed by not only the coaddition of RSL-3 and Fer-1 or Apo but the coaddition of RSL-3 and the apomorphine derivative.

<Test VI: Inhibitory Effect of Apomorphine Derivative on Respiratory Chain Complex I Inhibitor (Rotenone)-Induced Neuronal Death>

Human neuroblastoma-derived cell line SH-SY5Y cells were inoculated, and a respiratory chain complex I inhibitor rotenone (final concentration: 1 µM) and apomorphine (Apo) (final concentration: 0.1 nM, 1 nM, 10 nM, 100 nM, 1 µM, or 10 µM) or each apomorphine derivative (10 nM, 100 nM, 1 µM, or 10 µM) were coadded to the cells, which were then cultured for 48 hours. After the completion of culture, rotenone-induced cell death was measured using Cytotoxicity LDH Assay Kit-WST (Dojindo Laboratories). In the test, the case of exhibiting a cell death inhibitory effect of 10% or more at the most effective concentration was determined as having an inhibitory effect. The test was conducted twice, and the case where a concentration-dependent inhibitory effect on rotenone-induced cell death was able to be confirmed twice was rated as (++). If the inhibitory effect was confirmed in one of the two tests and no inhibitory effect was confirmed in the other test, the third test was conducted. In the third test, the case where the concentration-dependent inhibitory effect was able to be confirmed was rated as (+), and the case where no concentration-dependent inhibitory effect was able to be confirmed was rated as (±). The case where any inhibitory effect on rotenone-induced cell death was able to be confirmed in none of the two tests was rated as (−). The results are shown in Table 6.

TABLE 6

| Test compound | Inhibitory effect |
| --- | --- |
| Apo | ± |
| D8 | ++ |
| D26 | ± |
| D36 | ++ |
| D37 | ++ |
| D38 | ++ |
| D39 | + |
| D40 | + |
| D42 | + |
| D43 | − |
| D45 | ++ |
| D47 | ++ |
| D48 | ++ |
| D50 | ++ |
| D54 | − |
| D55 | + |

The present invention is not limited by the examples described above and includes various modifications. For example, the examples described above describe the details of the present invention for clear understanding, and the present invention is not necessarily limited by the inclusion of all the described configurations. As for a partial configuration of each example, addition of other configurations, deletion, and/or substitution may be performed.

All publications, patents, and patent applications cited herein are incorporated herein by reference in their entirety.

The invention claimed is:

1. A compound represented by the formula (I-1):

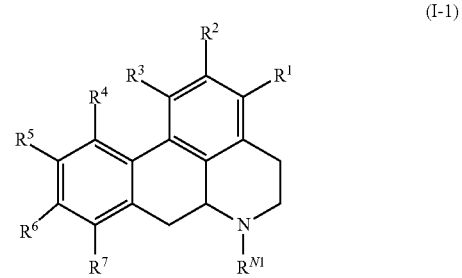

wherein
R^{N1} is methyl,
R^1 is hydrogen,
both R^2 and R^3 are hydrogen,
R^4 is hydroxyl,
R^5 is selected from the group consisting of unsubstituted $C_1$ to $C_9$ alkoxy, $C_1$ to $C_9$ alkoxy substituted by at least one monovalent group selected from the group consisting of halogen, hydroxyl, and carboxyl, unsubstituted $C_7$ to $C_{20}$ arylalkyloxy, and $C_7$ to $C_{20}$ arylalkyloxy substituted by at least one monovalent group selected from the group consisting of halogen, hydroxyl, and carboxyl, with the proviso that methoxy and benzyloxy are excluded from $R^5$, and both $R^6$ and $R^7$ are hydrogen,
or a salt thereof, or a solvate of the compound or the salt.

2. The compound according to claim 1 or a salt thereof, or a solvate of the compound or the salt, wherein $R^5$ is ethoxy, n-butyloxy, 2-phenylethoxy, 3-phenylpropyloxy, 4-phenylbutyloxy, 3,3-biphenylpropyloxy, 3-hydroxylpropyloxy, 3-chloropropyloxy, n-propyloxy, n-nonyloxy, or 4-trifluorobutyloxy.

3. A ferroptosis inhibitor comprising the compound according to claim 1 or a pharmaceutically acceptable salt thereof, or a pharmaceutically acceptable solvate of the compound or the salt as an active ingredient.

4. A ferroptosis inhibitor comprising the compound according to claim 2 or a pharmaceutically acceptable salt thereof, or a pharmaceutically acceptable solvate of the compound or the salt as an active ingredient.

5. A medicament for use in the prevention or treatment of one or more symptoms, diseases, or disorders related to ferroptosis selected from the group consisting of Leigh syndrome, mitochondrial encephalopathy, lactic acidosis, and stroke-like episodes (MELAS), Leber's disease, mitochondrial cardiomyopathy, mitochondrial hepatopathy, chronic progressive external ophthalmoplegia (CPEO), Parkinson's disease, Alzheimer's disease, Huntington's disease, amyotrophic lateral sclerosis, angina, myocardial infarction, acute heart failure, chronic heart failure, cardiomyopathy, diabetic cardiomyopathy, cardiomegaly, ischemia-reperfusion injury, hemorrhagic stroke, diabetes mellitus, cerebral infarction, kidney damage, acute renal failure, liver damage, hepatic fibrosis, chronic obstructive pulmonary disease, urinary tract infection, polycystic kidney disease, sepsis-induced cardiac injury, and sepsis, comprising the compound according to claim 1 or a pharmaceutically acceptable salt thereof, or a pharmaceutically acceptable solvate of the compound or the salt as an active ingredient.

6. A medicament for use in the prevention or treatment of one or more symptoms, diseases, or disorders related to ferroptosis selected from the group consisting of Leigh syndrome, mitochondrial encephalopathy, lactic acidosis, and stroke-like episodes (MELAS), Leber's disease, mitochondrial cardiomyopathy, mitochondrial hepatopathy, chronic progressive external ophthalmoplegia (CPEO), Parkinson's disease, Alzheimer's disease, Huntington's disease, amyotrophic lateral sclerosis, angina, myocardial infarction, acute heart failure, chronic heart failure, cardiomyopathy, diabetic cardiomyopathy, cardiomegaly, ischemia-reperfusion injury, hemorrhagic stroke, diabetes mellitus, cerebral infarction, kidney damage, acute renal failure, liver damage, hepatic fibrosis, chronic obstructive pulmonary disease, urinary tract infection, polycystic kidney disease, sepsis-induced cardiac injury, and sepsis, comprising the compound according to claim 2 or a pharmaceutically acceptable salt thereof, or a pharmaceutically acceptable solvate of the compound or the salt as an active ingredient.

7. The compound according to claim 2 or a salt thereof, or a solvate of the compound or the salt, wherein $R^5$ is ethoxy.

8. A compound of claim 1, wherein the compound of Formula I-1 is:

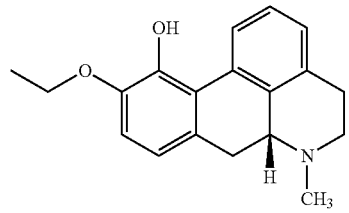

or a salt thereof, or a solvate of thereof.

9. A method for the treatment of one or more symptoms, diseases, or disorders related to mitochondrial encephalopathy, lactic acidosis, and stroke-like episodes (MELAS), comprising administering an effective amount of the compound according to claim 1 or a pharmaceutically acceptable salt thereof, or a pharmaceutically acceptable solvate of the compound or the salt as an active ingredient to a subject in need of treatment of the symptoms, disease or disorder.

10. The method of claim 9, wherein the compound is wherein the compound of Formula I-1 is:

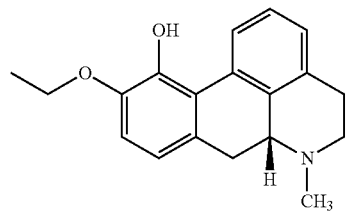 [SMILES: CCOc1ccc2c(c1O)-c1cccc3c1[C@@H](C2)N(C)CC3]

or a salt thereof, or a solvate of thereof.

11. The compound of claim 1, wherein the halogen is fluorine, chlorine, bromine, or iodine.

12. The method of claim 9, wherein the liver damage is non-alcoholic steatohepatitis.

13. The medicament of claim 6, wherein the liver damage is non-alcoholic steatohepatitis.

* * * * *